US012598241B2

(12) United States Patent
Azuolas et al.

(10) Patent No.: US 12,598,241 B2
(45) Date of Patent: Apr. 7, 2026

(54) SYSTEMS, APPARATUS AND METHODS FOR TOPIC EXTRACTION FROM DIGITAL MEDIA AND REAL-TIME DISPLAY OF DIGITAL CONTENT RELATING TO ONE OR MORE EXTRACTED TOPICS

(71) Applicant: SportsCastr, Inc., Las Vegas, NV (US)

(72) Inventors: Peter Azuolas, Las Vegas, NV (US); Kevin April, Lake Forest, IL (US)

(73) Assignee: SportsCastr, Inc., Las Vegas, NV (US)

( * ) Notice: Subject to any disclaimer, the term of this patent is extended or adjusted under 35 U.S.C. 154(b) by 0 days.

(21) Appl. No.: 18/446,221

(22) Filed: Aug. 8, 2023

(65) Prior Publication Data

US 2024/0284014 A1      Aug. 22, 2024

Related U.S. Application Data

(63) Continuation of application No. PCT/US2022/015713, filed on Feb. 8, 2022.

(Continued)

(51) Int. Cl.
*G06F 15/16* (2006.01)
*G06Q 50/34* (2012.01)
(Continued)

(52) U.S. Cl.
CPC ............. *H04L 67/60* (2022.05); *G06Q 50/34* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 5,251,294 A | 10/1993 | Abelow | |
| 5,999,908 A | 12/1999 | Abelow | |

(Continued)

FOREIGN PATENT DOCUMENTS

| | | | |
|---|---|---|---|
| AU | 2015222869 B2 | 7/2019 | |
| CA | 2304286 A1 | 10/2001 | |

(Continued)

OTHER PUBLICATIONS

Genius Sports launches In-Play Multi Bet for the next generation of same game parlay bets Genius Sports Press, Oct. 5, 2022, 3 pages.
(Continued)

*Primary Examiner* — Phuoc H Nguyen
(74) *Attorney, Agent, or Firm* — Smith Baluch LLP

(57) ABSTRACT

A webpage or an application view of an app displayed on a viewer device includes primary digital content. A request from the viewer device is transmitted and received, via at least one webserver, to embed secondary digital content in a topic extraction platform (TEP) unit on the displayed webpage or application view. The secondary digital content relates to a topic present in and extracted from the primary digital content, and is derived from topic information about the topic retrieved via a control server from a topic information provider. A persistent connection is established between the viewer device and a dedicated socket of a socket server coupled to the control server to push updated secondary digital content to the viewer device for embedding in the TEP unit. One example of primary digital content includes a news article about a sports team, for which secondary digital content including betting information regarding an upcoming event involving the sports team may be embedded in the TEP unit.

21 Claims, 36 Drawing Sheets

Related U.S. Application Data

(60) Provisional application No. 63/147,131, filed on Feb. 8, 2021.

(51) Int. Cl.
  *H04L 67/02* (2022.01)
  *H04L 67/60* (2022.01)

(56) References Cited

U.S. PATENT DOCUMENTS

| | | |
|---|---|---|
| 6,434,621 B1 | 8/2002 | Pezzillo et al. |
| 6,529,146 B1 | 3/2003 | Kowalski et al. |
| 6,606,744 B1 | 8/2003 | Mikurak |
| 6,701,383 B1 | 3/2004 | Wason et al. |
| 6,834,371 B1 | 12/2004 | Jensen et al. |
| 6,839,059 B1 | 1/2005 | Anderson et al. |
| 6,922,702 B1 | 7/2005 | Jensen et al. |
| 7,133,834 B1 | 11/2006 | Abelow |
| 7,228,349 B2 | 6/2007 | Barone, Jr. et al. |
| 7,386,870 B2 | 6/2008 | Lu |
| 7,458,093 B2 | 11/2008 | Dukes et al. |
| 7,490,169 B1 | 2/2009 | Ogdon et al. |
| 7,729,940 B2 | 6/2010 | Harvey et al. |
| 7,882,533 B2 | 2/2011 | Alao et al. |
| 8,000,993 B2 | 8/2011 | Harvey et al. |
| 8,002,618 B1 | 8/2011 | Lockton et al. |
| 8,010,986 B2 | 8/2011 | Dakss et al. |
| 8,112,301 B2 | 2/2012 | Harvey et al. |
| 8,128,503 B1 | 3/2012 | Haot et al. |
| 8,149,530 B1 | 4/2012 | Lockton et al. |
| 8,214,429 B2 | 7/2012 | Chidel et al. |
| 8,341,662 B1 | 12/2012 | Bassett et al. |
| 8,376,855 B2 | 2/2013 | Lockton et al. |
| 8,549,574 B2 | 10/2013 | Perlman et al. |
| 8,555,313 B2 | 10/2013 | Newnam et al. |
| 8,595,186 B1 | 11/2013 | Mandyam et al. |
| 8,656,042 B2 | 2/2014 | Glasser et al. |
| 8,677,420 B2 | 3/2014 | Cromarty et al. |
| 8,738,694 B2 | 5/2014 | Huske et al. |
| 8,752,113 B1 | 6/2014 | Good et al. |
| 8,774,018 B1 | 7/2014 | Burnette |
| 8,775,501 B2 | 7/2014 | Chidel et al. |
| 8,813,112 B1 | 8/2014 | Cibula et al. |
| 8,813,125 B2 | 8/2014 | Reisman |
| 8,850,053 B2 | 9/2014 | Basso et al. |
| 8,858,313 B1 | 10/2014 | Selfors |
| 8,870,639 B2 | 10/2014 | Lockton et al. |
| 8,874,778 B2 | 10/2014 | Xu et al. |
| 8,880,719 B2 | 11/2014 | Cooper |
| 9,055,271 B2 | 6/2015 | Verna et al. |
| 9,065,984 B2 | 6/2015 | Arseneau et al. |
| 9,066,153 B2 | 6/2015 | Pfeffer |
| 9,100,461 B2 | 8/2015 | Lemmons et al. |
| 9,106,607 B1 | 8/2015 | Lepeska et al. |
| 9,106,934 B2 | 8/2015 | Horen et al. |
| 9,143,565 B2 | 9/2015 | Hensgen et al. |
| 9,149,682 B2 | 10/2015 | Dornbush et al. |
| 9,246,613 B2 | 1/2016 | McKee et al. |
| 9,246,965 B1 | 1/2016 | Stoica et al. |
| 9,251,852 B2 | 2/2016 | Burns |
| 9,266,017 B1 | 2/2016 | Parker et al. |
| 9,288,278 B2 | 3/2016 | Panje et al. |
| 9,350,780 B2 | 5/2016 | Good et al. |
| 9,357,246 B2 | 5/2016 | Wright et al. |
| 9,392,314 B1 | 7/2016 | Lewis et al. |
| 9,393,485 B2 | 7/2016 | Sullivan |
| 9,456,230 B1 | 9/2016 | Bota et al. |
| 9,509,793 B2 | 11/2016 | Brown et al. |
| 9,511,287 B2 | 12/2016 | Lockton et al. |
| 9,516,390 B2 | 12/2016 | Lau et al. |
| 9,584,858 B2 | 2/2017 | Vinson et al. |
| 9,591,054 B2 | 3/2017 | Thornburgh et al. |
| 9,641,566 B1 | 5/2017 | Hiremath |
| 9,654,844 B2 | 5/2017 | Kim et al. |
| 9,692,800 B2 | 6/2017 | Gaunt et al. |
| 9,706,443 B2 | 7/2017 | Oyman et al. |
| 9,716,903 B2 | 7/2017 | Cardona |
| 9,716,918 B1 | 7/2017 | Lockton et al. |
| 9,878,243 B2 | 1/2018 | Lockton et al. |
| 9,905,082 B2 | 2/2018 | Dengler et al. |
| 9,919,210 B2 | 3/2018 | Lockton |
| 9,954,646 B1 | 4/2018 | Marcin et al. |
| 9,973,785 B1 | 5/2018 | Yang et al. |
| 10,015,224 B1 | 7/2018 | Shen et al. |
| 10,105,596 B1 | 10/2018 | Mann |
| 10,116,989 B1 | 10/2018 | Shen et al. |
| 10,129,310 B1 | 11/2018 | Brunning |
| 10,150,030 B2 | 12/2018 | Perlman et al. |
| 10,226,698 B1 | 3/2019 | Lockton et al. |
| 10,243,694 B1 | 3/2019 | Marcin et al. |
| 10,313,412 B1 | 6/2019 | Hall et al. |
| 10,326,814 B1 | 6/2019 | Hall et al. |
| 10,327,040 B1 | 6/2019 | Shen et al. |
| 10,397,291 B1 | 8/2019 | Hall et al. |
| 10,425,697 B2 | 9/2019 | April et al. |
| 10,437,551 B1 | 10/2019 | Stanek et al. |
| 10,462,524 B2 | 10/2019 | Barnett et al. |
| 10,484,730 B1 | 11/2019 | Li et al. |
| 10,484,743 B2 | 11/2019 | Cox |
| 10,535,177 B2 | 1/2020 | Cornell |
| 10,554,324 B1 | 2/2020 | Lim et al. |
| 10,601,914 B2 | 3/2020 | Birrer et al. |
| 10,630,746 B1 | 4/2020 | Shen et al. |
| 10,681,398 B1 | 6/2020 | Marcin et al. |
| 10,715,860 B1 | 7/2020 | Bartlett et al. |
| 10,721,543 B2 | 7/2020 | Huske et al. |
| 10,735,783 B1 | 8/2020 | Shen et al. |
| 10,740,305 B2 | 8/2020 | Barthel et al. |
| 10,742,699 B1 | 8/2020 | Shen et al. |
| 10,805,687 B2 | 10/2020 | April et al. |
| 10,848,792 B2 | 11/2020 | Evans |
| 10,855,763 B2 | 12/2020 | Birrer et al. |
| 10,970,904 B1 | 4/2021 | Kosmiskas |
| 11,039,102 B1 | 6/2021 | Marcin et al. |
| 11,039,218 B1 | 6/2021 | April et al. |
| 11,048,764 B2 * | 6/2021 | Wexler ............... G06F 16/9535 |
| 11,051,049 B2 | 6/2021 | Bustamante et al. |
| 11,076,111 B1 | 7/2021 | Ni et al. |
| 11,076,188 B1 | 7/2021 | Purushe |
| 11,146,834 B1 | 10/2021 | Shen et al. |
| 11,153,581 B1 | 10/2021 | Purushe |
| 11,157,233 B1 | 10/2021 | Stanek et al. |
| 11,159,851 B2 | 10/2021 | Stern et al. |
| 11,178,447 B1 | 11/2021 | Panter et al. |
| 11,356,742 B2 * | 6/2022 | Azuolas ............... H04L 65/611 |
| 11,405,658 B2 | 8/2022 | Masterson |
| 11,418,845 B2 | 8/2022 | Wong et al. |
| 11,425,178 B1 | 8/2022 | Shen et al. |
| 11,425,219 B1 | 8/2022 | Lee et al. |
| 11,445,246 B1 | 9/2022 | Eatedali |
| 11,451,883 B2 | 9/2022 | Huske et al. |
| 11,457,245 B1 | 9/2022 | Bhatia et al. |
| 11,470,361 B2 | 10/2022 | Bustamante et al. |
| 11,490,132 B2 | 11/2022 | Bustamante et al. |
| 11,533,543 B1 | 12/2022 | Suh et al. |
| 11,658,822 B1 | 5/2023 | Engers et al. |
| 11,770,591 B2 | 9/2023 | April et al. |
| 11,792,444 B2 | 10/2023 | Bustamante et al. |
| 11,871,088 B2 | 1/2024 | Azuolas et al. |
| 12,389,080 B2 | 8/2025 | April et al. |
| 2001/0001160 A1 | 5/2001 | Shoff et al. |
| 2001/0039209 A1 | 11/2001 | DeWeese et al. |
| 2002/0145621 A1 | 10/2002 | Nguyen |
| 2004/0003101 A1 | 1/2004 | Roth et al. |
| 2004/0039788 A1 | 2/2004 | Lim et al. |
| 2004/0177002 A1 | 9/2004 | Abelow |
| 2006/0177200 A1 | 8/2006 | Deutmeyer et al. |
| 2006/0224761 A1 | 10/2006 | Howarth et al. |
| 2007/0033531 A1 | 2/2007 | Marsh |
| 2007/0043632 A1 | 2/2007 | Abelow |
| 2007/0192794 A1 | 8/2007 | Curtis et al. |
| 2007/0204321 A1 | 8/2007 | Shen et al. |
| 2008/0022347 A1 | 1/2008 | Cohen |
| 2008/0052751 A1 | 2/2008 | Cromarty et al. |

(56)                    References Cited

U.S. PATENT DOCUMENTS

| | | |
|---|---|---|
| 2008/0062318 A1 | 3/2008 | Ellis et al. |
| 2008/0082922 A1 | 4/2008 | Biniak et al. |
| 2008/0168493 A1 | 7/2008 | Allen et al. |
| 2009/0049496 A1 | 2/2009 | Morton |
| 2009/0144785 A1 | 6/2009 | Walker et al. |
| 2009/0183215 A1 | 7/2009 | McCartie et al. |
| 2009/0222754 A1 | 9/2009 | Phillips et al. |
| 2010/0070345 A1 | 3/2010 | Abelow |
| 2010/0274848 A1 | 10/2010 | Altmaier et al. |
| 2010/0299703 A1 | 11/2010 | Altman |
| 2011/0083144 A1 | 4/2011 | Bocharov et al. |
| 2011/0086144 A1 | 4/2011 | Arampongpun et al. |
| 2011/0090960 A1 | 4/2011 | Leontaris et al. |
| 2011/0126236 A1 | 5/2011 | Arrasvuori et al. |
| 2011/0138429 A1 | 6/2011 | Schade et al. |
| 2011/0138433 A1 | 6/2011 | Whiteing |
| 2011/0213655 A1 | 9/2011 | Henkin et al. |
| 2011/0247044 A1 | 10/2011 | Jacoby |
| 2011/0252156 A1 | 10/2011 | Basso et al. |
| 2011/0280540 A1 | 11/2011 | Woodman |
| 2012/0005224 A1* | 1/2012 | Ahrens ................. H04L 51/212 |
| | | 707/769 |
| 2012/0011267 A1 | 1/2012 | Ma et al. |
| 2012/0058808 A1 | 3/2012 | Lockton |
| 2012/0069131 A1 | 3/2012 | Abelow |
| 2012/0072845 A1 | 3/2012 | John et al. |
| 2012/0210348 A1 | 8/2012 | Verna et al. |
| 2012/0295686 A1 | 11/2012 | Lockton |
| 2013/0086278 A1 | 4/2013 | Schmidt |
| 2013/0194431 A1 | 8/2013 | O'Connor et al. |
| 2013/0198044 A1 | 8/2013 | O'Connor et al. |
| 2013/0198769 A1 | 8/2013 | Bountour |
| 2013/0218942 A1 | 8/2013 | Willis et al. |
| 2013/0222597 A1 | 8/2013 | Brink et al. |
| 2013/0225285 A1 | 8/2013 | Lockton |
| 2013/0227596 A1 | 8/2013 | Pettis et al. |
| 2013/0297706 A1 | 11/2013 | Arme et al. |
| 2013/0297721 A1 | 11/2013 | Chen et al. |
| 2013/0311595 A1 | 11/2013 | Milatinovici et al. |
| 2014/0040010 A1* | 2/2014 | Garcia-Martinez .... G06Q 50/01 |
| | | 709/204 |
| 2014/0052540 A1* | 2/2014 | Rajaram ............. G06Q 30/0269 |
| | | 705/14.66 |
| 2014/0108534 A1 | 4/2014 | Good |
| 2014/0129680 A1 | 5/2014 | Mukherjee |
| 2014/0129942 A1 | 5/2014 | Rathod |
| 2014/0161412 A1 | 6/2014 | Chase et al. |
| 2014/0229992 A1 | 8/2014 | Ellis et al. |
| 2014/0245365 A1 | 8/2014 | Axelrod |
| 2014/0281007 A1 | 9/2014 | Lemmons et al. |
| 2014/0282677 A1 | 9/2014 | Mantell et al. |
| 2014/0359075 A1 | 12/2014 | Amidei et al. |
| 2015/0067505 A1* | 3/2015 | Metcalf ................. G06F 16/958 |
| | | 707/751 |
| 2015/0127845 A1 | 5/2015 | Phillips et al. |
| 2015/0131845 A1 | 5/2015 | Forouhar et al. |
| 2015/0163379 A1 | 6/2015 | Herzog |
| 2015/0163562 A1 | 6/2015 | Leventhal et al. |
| 2015/0295726 A1 | 10/2015 | Bland |
| 2015/0341812 A1 | 11/2015 | Dion et al. |
| 2016/0006817 A1 | 1/2016 | Mitic et al. |
| 2016/0036910 A1 | 2/2016 | Spivey |
| 2016/0037215 A1 | 2/2016 | Cardona |
| 2016/0086108 A1 | 3/2016 | Abelow |
| 2016/0191493 A1 | 6/2016 | Bowman et al. |
| 2016/0193530 A1 | 7/2016 | Parker et al. |
| 2016/0249108 A1 | 8/2016 | Sexton |
| 2016/0255403 A1 | 9/2016 | Gomes et al. |
| 2016/0261927 A1 | 9/2016 | Smolic et al. |
| 2016/0271493 A1 | 9/2016 | Perlman |
| 2016/0294906 A1 | 10/2016 | Levinson et al. |
| 2016/0316262 A1 | 10/2016 | Chen |
| 2016/0360261 A1 | 12/2016 | Makhlouf |
| 2016/0366464 A1 | 12/2016 | Rouady et al. |
| 2016/0381109 A1 | 12/2016 | Barnett et al. |
| 2016/0381408 A1 | 12/2016 | Triano et al. |
| 2017/0026671 A1 | 1/2017 | Neumeier et al. |
| 2017/0034237 A1 | 2/2017 | Silver |
| 2017/0041686 A1 | 2/2017 | Park et al. |
| 2017/0099516 A1 | 4/2017 | Barbulescu et al. |
| 2017/0142200 A1* | 5/2017 | Kodner ................... H04W 4/21 |
| 2017/0185601 A1* | 6/2017 | Qin ........................ G06Q 50/01 |
| 2017/0185666 A1* | 6/2017 | Pasternack ............ G06F 16/951 |
| 2017/0188054 A1 | 6/2017 | Ma et al. |
| 2017/0250882 A1 | 8/2017 | Kellicker |
| 2017/0264961 A1 | 9/2017 | Lockton |
| 2017/0374241 A1 | 12/2017 | Nunes et al. |
| 2018/0025586 A1 | 1/2018 | Lockton |
| 2018/0139260 A1 | 5/2018 | Houle et al. |
| 2018/0167427 A1 | 6/2018 | Kedenburg, III |
| 2018/0176621 A1 | 6/2018 | Grubbs et al. |
| 2018/0213266 A1 | 7/2018 | Kwak et al. |
| 2018/0307383 A1 | 10/2018 | Faulkner et al. |
| 2018/0367820 A1 | 12/2018 | Abulikemu |
| 2020/0021892 A1 | 1/2020 | April et al. |
| 2020/0098228 A1 | 3/2020 | Amaitis et al. |
| 2020/0111325 A1 | 4/2020 | Lockton et al. |
| 2020/0162796 A1 | 5/2020 | Azuolas et al. |
| 2020/0245017 A1* | 7/2020 | Ganschow ......... H04N 21/4312 |
| 2021/0160584 A1 | 5/2021 | April et al. |
| 2021/0168462 A1 | 6/2021 | April et al. |
| 2021/0397847 A1 | 12/2021 | Jayaram et al. |
| 2022/0254379 A1 | 8/2022 | Chang et al. |
| 2022/0327830 A1 | 10/2022 | Chang et al. |
| 2022/0335720 A1 | 10/2022 | Chang et al. |
| 2023/0379531 A1 | 11/2023 | Azuolas et al. |
| 2024/0022796 A1 | 1/2024 | April et al. |
| 2024/0284014 A1 | 8/2024 | Azuolas et al. |
| 2024/0414412 A1 | 12/2024 | Azuolas et al. |

FOREIGN PATENT DOCUMENTS

| | | |
|---|---|---|
| EP | 2127320 A2 | 12/2009 |
| EP | 2920708 A1 | 9/2015 |
| EP | 3063945 B1 | 9/2016 |
| WO | 1991012583 A1 | 8/1991 |
| WO | 2011149558 A3 | 3/2012 |
| WO | 2022170281 A1 | 8/2022 |

OTHER PUBLICATIONS

Genius Sports Live Sports Data Integration, GeniusSports Wiki, Jul. 5, 2022, 2 pages.

Genius Sports Live Sports Data Pull APIs, GeniusSports Wiki, Jul. 5, 2022, 2 pages.

Genius Sports Live Sports Data Push API via ably, GeniusSports Wiki, Nov. 28, 2022, 7 pages.

Genius Sports slashes cost and lowers latencies for last-mile live sports data delivery, Ably, Aug. 9, 2022, 8 pages.

Geniussports, Genius Sports Agrees to Official Data, Trading & LiveStreaming Partnership with Bally's Interactive, Aug. 25, 2022, 3 pages.

GL-Video-v2, GeniusSports Explorer API Website; accessed Mar. 10, 2023, 28 pages.

GL-Video-v3, Swagger, Feb. 2023, 9 pages.

Ha, Major League Baseball's "At Bat" App Gets updated to Supported Expanded Instant Replay. TechCrunch Mar. 31, 2014. Accessed at https://techcrunch.com/2014/03/31/mlb-at-bat-expanded-instant-replay/. 4 pages.

Halpin Introducing Extensions: A Streaming Revolution, Twitch, Aug. 31, 2017, 5 pages, obtain at website: https://blog.twitch.tv/en/2017/08/31/introducing-extensions-a-streaming-revolution-c31762addcd9/ on Jun. 7, 2023, 5 pages.

Hashemizadehnaeini, Transcoding H.264 Video via FFMPEG encoder. Corso di Laurea Magistrale in Ingegneria delle Telecomunicazioni Politecnico Di Milano. Thesis, 2015, p. 1-100.

How Genius Sports delivers realtime data to their customers' frontend at speed and at scale, Webinar, May 2021, Ably, 3 pages.

How to Integrate It, GeniusSports Drop & Play Integration Guide, Nov. 28, 2022, 5 pages.

(56)                    References Cited

OTHER PUBLICATIONS

In-Play MultiBet Unlock new in-play revenues, GeniusSports Website, Mar. 13, 2023, 4 pages.
Integration Guide - Genius Live Player, GeniusSports Drop & Play Integration Guide, Nov. 28, 2022, 1 page.
Integration Schema—Integration Process GeniusSports Wiki, May 29, 2023, 4 pages.
Integration Schema—Integration Service—Interface, GeniusSports Wiki, Dec. 16, 2020, 2 pages.
Integration Schema—Integration Service GeniusSports Wiki, Apr. 13, 2022, 16 pages.
Integration Schema—Service Reliability and Availability, GeniusSports, Mar. 29, 2023, 2 pages.
Integration Schema GeniusSports Wiki, Oct. 11, 2019, 2 pages.
International Search Report and Written Opinion in International Patent Application No. PCT/US2017/045801 mailed Oct. 30, 2019, 18 pages.
International Search Report and Written Opinion in International Patent Application No. PCT/US2018/033016 mailed Aug. 6, 2018, 29 pages.
International Search Report and Written Opinion in International Patent Application No. PCT/US2022/015713 mailed Jun. 2, 2022, 14 pages.
International Search Report and Written Opinion mailed May 13, 2022 in International application No. PCT/US2022/014999 22 pages.
Introducing Drop and Play (Medium container), BetGenius Website, Jul. 5, 2022, 3 pages.
LA Techwatch, LA Startup Maestro Just Raised $3M to Broadcast eSports at Scale. LA TechWatch Sep. 19, 2017. Accessed at https://www.latechwatch.com/2017/09/la-startup-maestro-just-raised-3m-broadcast-esports-scale/. 13 pages.
Lemire "Sportradar Launches Real-Time Data Product for Media Companies" Sports Business Journal, Oct. 27, 2020, 1 page.
Live Sports Data Integration—API Explorer for Genius Ably Push Feeds, GeniusSports Wiki , Mar. 20, 2023, 5 pages.
Live Sports Data Integration—Authenticating against Genius Sports APIs, GeniusSports Wiki, Aug. 12, 2022, 2 pages.
Live Sports Data Integration—Match State Platform Access Control API, GeniusSports Wiki, Aug. 12, 2022, 3 pages.
Live Sports Data Integration—Statistics API, GeniusSports Wiki, Aug. 18, 2022, 5 pages.
LiveStats Version 7—Data Streaming, Dec. 5, 2020 GeniusSports Support Centre, 3 pages.
Livestream—READ—FAQs, GeniusSports Developer Center Website, Jul. 31, 2017, 4 pages.
Menmuir Betgenius Launces 'Next Level' Sportbook Streaming Service, SBCNews, Oct. 8, 2019, 2 pages.
MLB App. MLB 2021. Accessed at https://www.mlb.com/apps/mlb-app on Apr. 21, 2021. 1 page.
Multibet Back-End Integration—Market Lifetime, GeniusSports Wiki, Feb. 13, 2023, 2 pages.
Multibet Back-End Integration—Multibet API, GeniusSports Wiki, Mar. 15, 2023, 10 pages.
Multibet Back-End Integration, GeniusSports Wiki, Feb. 13, 2023, 4 pages.
Multibet Back-End Integration, Multibet Sportsbook Integration (V3), GeniusSports Wiki, Feb. 13, 2023, 5 pages.
Multibet Front-End Integration—Authenticating User-SessionUsing a Proxy Service, GeniusSports Wiki, Feb. 13, 2023, 2 pages.
Multibet Front-End Integration—UI Widget Customization, GeniusSports Wiki, Feb. 13, 2023, 4 pages.
Multibet Front-End Integration, GeniusSports Wiki, Feburary 13, 2023, 2 pages.
Perez, Live Video Viewing up 86% over last year in MLB's At Bat app, thanks for Addition of multitasking. TechCrunch Apr. 15, 2016. Accessed at https://techcrunch.com/2016/04/15/live-video-viewing-up-86-over-last-year-in-mlbs-at-bat-app-thanks-to-addition-of-multitasking/. 4 pages.

Perez, MLB.com At Bat and NHL are first to Launch Personalized App Icons on iOS 10.3. TechCrunch Mar. 28, 2017. Accessed at https://techcrunch.com/2017/03/28/mlb-com-at-bat-and-nhl-are-first-to-launch-personalized-app-icons-on-ios-10-3/. 5 pages.
Read-Read a stream of live game events. GeniusSports Developer Centre Website, Nov. 2, 2016, 28 pages.
References, GeniusSports Drop & Play Integration Guide, Nov. 28, 2022, 1 page.
Risk Services Integration, GeniusSports Wiki , Mar. 20, 2023, 10 pages.
SmartStream Integrations, GeniusSports Wiki, Oct. 26, 2022, 4 pages.
Sportradar—Data Services 2019, accessed at waybackmachine https://www.sportradar.com/rights-holder-solutions/ data-services/ on Jun. 4, 2019, 3 pages.
SPORTRADAR "Sportradar Accelerates Data and Video on AWS, Launches Simulated Reality Innovation in 11 Days" Dec. 2, 2020, accessed at https://aws.amazon.com/solutions/case-studies/sportradar-case-study/ on Dec. 20, 2020, 5 pages.
Sportradar Group AG and Sportradar AG's Invalidity Contentions Exhibit C-20, May 6, 2024, Case No. 2:23-cv-00472-JRG, *Sportscastr Inc. (dba Panda Interactive)* v. *Sportradar Group AG and Sportradar AG*, 161 pages (SRAD-EX-C-20-Kaazing).
Sportradar Group AG and Sportradar AG's Invalidity Contentions Exhibit C-21, May 6, 2024, Case No. 2:23-cv-00472-JRG, *Sportscastr Inc. (dba Panda Interactive)* v. *Sportradar Group AG and Sportradar AG*, 294 pages (SRAD-EX-C-21-WebRTC).
Sportradar Group AG and Sportradar AG's Invalidity Contentions Exhibit C-22, May 6, 2024, Case No. 2:23-cv-00472-JRG, *Sportscastr Inc. (dba Panda Interactive)* v. *Sportradar Group AG and Sportradar AG*, 276 pages (SRAD-EX-C-22-RTP).
Sportradar Group AG and Sportradar AG's Invalidity Contentions Exhibit C-23, May 6, 2024, Case No. 2:23-cv-00472-JRG, *Sportscastr Inc. (dba Panda Interactive)* v. *Sportradar Group AG and Sportradar AG*, 299 pages (SRAD-EX-C-23-WebSocket).
Sportradar Group AG and Sportradar AG's Invalidity Contentions Exhibit C-24, May 6, 2024, Case No. 2:23-cv-00472-JRG, *Sportscastr Inc. (dba Panda Interactive)* v. *Sportradar Group AG and Sportradar AG*, 166 pages (SRAD-EX-C-24-AppleHLS).
Sportradar Group AG and Sportradar AG's Invalidity Contentions Exhibit C-25, May 6, 2024, Case No. 2:23-cv-00472-JRG, *Sportscastr Inc. (dba Panda Interactive)* v. *Sportradar Group AG and Sportradar AG*, 171 pages (SRAD-EX-C-25-Betstream).
Sportradar Group AG and Sportradar AG's Invalidity Contentions Exhibit C-26, May 6, 2024, Case No. 2:23-cv-00472-JRG, *Sportscastr Inc. (dba Panda Interactive)* v. *Sportradar Group AG and Sportradar AG*, 65 pages (SRAD-EX-C-26-FacebookLive).
Sportradar Group AG and Sportradar AG's Invalidity Contentions Exhibit C-27, May 6, 2024, Case No. 2:23-cv-00472-JRG, *Sportscastr Inc. (dba Panda Interactive)* v. *Sportradar Group AG and Sportradar AG*, 76 pages (SRAD-EX-C-27-MLBAtBat).
Sportradar Group AG and Sportradar AG's Invalidity Contentions Exhibit C-28, May 6, 2024, Case No. 2:23-cv-00472-JRG, *Sportscastr Inc. (dba Panda Interactive)* v. *Sportradar Group AG and Sportradar AG*, 66 pages (SRAD-EX-C-28-OneTwoSee).
Sportradar Group AG and Sportradar AG's Invalidity Contentions Exhibit D-01, May 6, 2024, Case No. 2:23-cv-00472-JRG, *Sportscastr Inc. (dba Panda Interactive)* v. *Sportradar Group AG and Sportradar AG*, 100 pages (SRAD-EX-D-01-Lu).
Sportradar Group AG and Sportradar AG's Invalidity Contentions Exhibit D-02, May 6, 2024, Case No. 2:23-cv-00472-JRG, *Sportscastr Inc. (dba Panda Interactive)* v. *Sportradar Group AG and Sportradar AG*, 257 pages (SRAD-EX-D-02-Dukes).
Sportradar Group AG and Sportradar AG's Invalidity Contentions Exhibit D-03, May 6, 2024, Case No. 2:23-cv-00472-JRG, *Sportscastr Inc. (dba Panda Interactive)* v. *Sportradar Group AG and Sportradar AG*, 182 pages (SRAD-EX-D-03-Mandyam).
Sportradar Group AG and Sportradar AG's Invalidity Contentions Exhibit D-04, May 6, 2024, Case No. 2:23-cv-00472-JRG, *Sportscastr Inc. (dba Panda Interactive)* v. *Sportradar Group AG and Sportradar AG*, 136 pages (SRAD-EX-D-04-Cromarty).
Sportradar Group AG and Sportradar AG's Invalidity Contentions Exhibit D-05, May 6, 2024, Case No. 2:23-cv-00472-JRG, *Sportscastr

(56) References Cited

OTHER PUBLICATIONS

*Inc.* (*dba Panda Interactive*) v. *Sportradar Group AG and Sportradar AG*, 115 pages (SRAD-EX-D-05-Cooper).

Sportradar Group AG and Sportradar AG's Invalidity Contentions Exhibit D-06, May 6, 2024, Case No. 2:23-cv-00472-JRG, *Sportscastr Inc.* (*dba Panda Interactive*) v. *Sportradar Group AG and Sportradar AG*, 139 pages (SRAD-EX- D-06-Basso).

Sportradar Group AG and Sportradar AG's Invalidity Contentions Exhibit D-07, May 6, 2024, Case No. 2:23-cv-00472-JRG, *Sportscastr Inc.* (*dba Panda Interactive*) v. *Sportradar Group AG and Sportradar AG*, 116 pages (SRAD-EX-D-07-Sullivan).

Sportradar Group AG and Sportradar AG's Invalidity Contentions Exhibit D-08, May 6, 2024, Case No. 2:23-cv-00472-JRG, *Sportscastr Inc.* (*dba Panda Interactive*) v. *Sportradar Group AG and Sportradar AG*, 121 pages (SRAD-EX-D-08-Bota).

Sportradar Group AG and Sportradar AG's Invalidity Contentions Exhibit D-09, May 6, 2024, Case No. 2:23-cv-00472-JRG, *Sportscastr Inc.* (*dba Panda Interactive*) v. *Sportradar Group AG and Sportradar AG*, 80 pages (SRAD-EX-D-09-Dengler).

Sportradar Group AG and Sportradar AG's Invalidity Contentions Exhibit D-10, May 6, 2024, Case No. 2:23-cv-00472-JRG, *Sportscastr Inc.* (*dba Panda Interactive*) v. *Sportradar Group AG and Sportradar AG*, 117 pages (SRAD-EX-D-10-Ma).

Sportradar Group AG and Sportradar AG's Invalidity Contentions Exhibit D-11, May 6, 2024, Case No. 2:23-cv-00472-JRG, *Sportscastr Inc.* (*dba Panda Interactive*) v. *Sportradar Group AG and Sportradar AG*, 68 pages (SRAD-EX-D-11-Mukherjee).

Sportradar Group AG and Sportradar AG's Invalidity Contentions Exhibit D-12, May 6, 2024, Case No. 2:23-cv-00472-JRG, *Sportscastr Inc.* (*dba Panda Interactive*) v. *Sportradar Group AG and Sportradar AG*, 74 pages (SRAD-EX-D-12-Ellis).

Sportradar Group AG and Sportradar AG's Invalidity Contentions Exhibit D-13, May 6, 2024, Case No. 2:23-cv-00472-JRG, *Sportscastr Inc.* (*dba Panda Interactive*) v. *Sportradar Group AG and Sportradar AG*, 170 pages (SRAD-EX-D-13-Herzog).

Sportradar Group AG and Sportradar AG's Invalidity Contentions Exhibit D-14, May 6, 2024, Case No. 2:23-cv-00472-JRG, *Sportscastr Inc.* (*dba Panda Interactive*) v. *Sportradar Group AG and Sportradar AG*, 290 pages (SRAD-EX-D-14-Mitic).

Sportradar Group AG and Sportradar AG's Invalidity Contentions Exhibit D-15, May 6, 2024, Case No. 2:23-cv-00472-JRG, *Sportscastr Inc.* (*dba Panda Interactive*) v. *Sportradar Group AG and Sportradar AG*, 163 pages (SRAD-EX-D-15-Spivey).

Sportradar Group AG and Sportradar AG's Invalidity Contentions Exhibit D-16, May 6, 2024, Case No. 2:23-cv-00472-JRG, *Sportscastr Inc.* (*dba Panda Interactive*) v. *Sportradar Group AG and Sportradar AG*, 480 pages (SRAD-EX-D-16-Levinson).

Sportradar Group AG and Sportradar AG's Invalidity Contentions Exhibit D-17, May 6, 2024, Case No. 2:23-cv-00472-JRG, *Sportscastr Inc.* (*dba Panda Interactive*) v. *Sportradar Group AG and Sportradar AG*, 207 pages (SRAD-EX-D-17-Park).

Sportradar Group AG and Sportradar AG's Invalidity Contentions Exhibit D-18, May 6, 2024, Case No. 2:23-cv-00472-JRG, *Sportscastr Inc.* (*dba Panda Interactive*) v. *Sportradar Group AG and Sportradar AG*, 149 pages (SRAD-EX-D-18-Abulikemu).

Sportradar Group AG and Sportradar AG's Invalidity Contentions Exhibit D-20, May 6, 2024, Case No. 2:23-cv-00472-JRG, *Sportscastr Inc.* (*dba Panda Interactive*) v. *Sportradar Group AG and Sportradar AG*, 169 pages (SRAD-EX-D-20-Kaazing).

Sportradar Group AG and Sportradar AG's Invalidity Contentions Exhibit D-21, May 6, 2024, Case No. 2:23-cv-00472-JRG, *Sportscastr Inc.* (*dba Panda Interactive*) v. *Sportradar Group AG and Sportradar AG*, 406 pages (SRAD-EX-D-21-WebRTC).

Sportradar Group AG and Sportradar AG's Invalidity Contentions Exhibit D-22, May 6, 2024, Case No. 2:23-cv-00472-JRG, *Sportscastr Inc.* (*dba Panda Interactive*) v. *Sportradar Group AG and Sportradar AG*, 244 pages (SRAD-EX-D-22-RTP).

Sportradar Group AG and Sportradar AG's Invalidity Contentions Exhibit D-23, May 6, 2024, Case No. 2:23-cv-00472-JRG, *Sportscastr Inc.* (*dba Panda Interactive*) v. *Sportradar Group AG and Sportradar AG*, 283 pages (SRAD-EX-D-23-WebSocket).

Sportradar Group AG and Sportradar AG's Invalidity Contentions Exhibit D-24, May 6, 2024, Case No. 2:23-cv-00472-JRG, *Sportscastr Inc.* (*dba Panda Interactive*) v. *Sportradar Group AG and Sportradar AG*, 220 pages (SRAD-EX-D-24-AppleHLS).

Sportradar Group AG and Sportradar AG's Invalidity Contentions Exhibit D-25, May 6, 2024, Case No. 2:23-cv-00472-JRG, *Sportscastr Inc.* (*dba Panda Interactive*) v. *Sportradar Group AG and Sportradar AG*, 385 pages (SRAD-EX-D-25-Betstream).

Sportradar Group AG and Sportradar AG's Invalidity Contentions Exhibit D-26, May 6, 2024, Case No. 2:23-cv-00472-JRG, *Sportscastr Inc.* (*dba Panda Interactive*) v. *Sportradar Group AG and Sportradar AG*, 69 pages (SRAD-EX-D-26-FacebookLive).

Sportradar Group AG and Sportradar AG's Invalidity Contentions Exhibit D-27, May 6, 2024, Case No. 2:23-cv-00472-JRG, *Sportscastr Inc.* (*dba Panda Interactive*) v. *Sportradar Group AG and Sportradar AG*, 81 pages (SRAD-EX-D-27-MLBAtBat).

Sportradar Group AG and Sportradar AG's Invalidity Contentions Exhibit D-28, May 6, 2024, Case No. 2:23-cv-00472-JRG, *Sportscastr Inc.* (*dba Panda Interactive*) v. *Sportradar Group AG and Sportradar AG*, 69 pages (SRAD-EX-D-28-OneTwoSee).

Sportradar Group AG and Sportradar AG's p.r. 3-3 AND 3-4 Invalidity Contentions, in Case No. 2:23-cv-00472-JRG, *Sportscastr Inc.* (*dba Panda Interactive*) v. *Sportradar Group AG and Sportradar AG*, filed May 6, 2024, 66 pages.

Twitch Blog (Aug. 10, 2015), https://blog.twitch.tv/en/2015/08/10/top-games-for-july-2015-rocket-league-editionf278d248476a/, 4 pages (Twitch_Blog_Aug_10_2015).

Vanessa Wang et al., The Definitive Guide to HTML5 Websocket (2013), 200 pages (Wang_SRAD_00009135).

Webrtc, Tutorials Point (2015), 34 pages (WebRTC_tutorials_point_2015).

Genius Sports LTD's Initial Invalidity and Subject-Matter Eligibility Contentions Exhibit A-13, Mar. 14, 2024, Case No. 2:23-cv-00471-JRG, *Sportscastr Inc.* (*dba Panda Interactive*) v. *Genius Sports LTD*, 177 pages (Ex_A_13_NPL).

Genius Sports LTD's Initial Invalidity and Subject-Matter Eligibility Contentions Exhibit A-14, Mar. 14, 2024, Case No. 2:23-cv-00471-JRG, *Sportscastr Inc.* (*dba Panda Interactive*) v. *Genius Sports LTD*, 238 pages (Ex_A_14_NPL).

Genius Sports LTD's Initial Invalidity and Subject-Matter Eligibility Contentions Exhibit B-01, Mar. 14, 2024, Case No. 2:23-cv-00471-JRG, *Sportscastr Inc.* (*dba Panda Interactive*) v. *Genius Sports LTD*, 208 pages (Ex_B-01_npl).

Genius Sports LTD's Initial Invalidity and Subject-Matter Eligibility Contentions Exhibit B-02, Mar. 14, 2024, Case No. 2:23-cv-00471-JRG, *Sportscastr Inc.* (*dba Panda Interactive*) v. *Genius Sports LTD*, 408 pages (Ex_B-02_npl).

Genius Sports LTD's Initial Invalidity and Subject-Matter Eligibility Contentions Exhibit B-03, Mar. 14, 2024, Case No. 2:23-cv-00471-JRG, *Sportscastr Inc.* (*dba Panda Interactive*) v. *Genius Sports LTD*, 210 pages (Ex_B-03_npl).

Genius Sports LTD's Initial Invalidity and Subject-Matter Eligibility Contentions Exhibit B-04, Mar. 14, 2024, Case No. 2:23-cv-00471-JRG, *Sportscastr Inc.* (*dba Panda Interactive*) v. *Genius Sports LTD*, 456 pages (Ex_B-04_npl).

Genius Sports LTD's Initial Invalidity and Subject-Matter Eligibility Contentions Exhibit B-05, Mar. 14, 2024, Case No. 2:23-cv-00471-JRG, *Sportscastr Inc.* (*dba Panda Interactive*) v. *Genius Sports LTD*, 218 pages (Ex_B-05_npl).

Genius Sports LTD's Initial Invalidity and Subject-Matter Eligibility Contentions Exhibit B-06, Mar. 14, 2024, Case No. 2:23-cv-00471-JRG, *Sportscastr Inc.* (*dba Panda Interactive*) v. *Genius Sports LTD*, 132 pages (Ex_B-06_npl).

Genius Sports LTD's Initial Invalidity and Subject-Matter Eligibility Contentions Exhibit B-07, Mar. 14, 2024, Case No. 2:23-cv-00471-JRG, *Sportscastr Inc.* (*dba Panda Interactive*) v. *Genius Sports LTD*, 193 pages (Ex_B-07_npl).

Genius Sports LTD's Initial Invalidity and Subject-Matter Eligibility Contentions Exhibit B-08, Mar. 14, 2024, Case No. 2:23-cv-00471-JRG, *Sportscastr Inc.* (*dba Panda Interactive*) v. *Genius Sports LTD*, 237 pages (Ex_B-08_npl).

(56) References Cited

OTHER PUBLICATIONS

Genius Sports LTD's Initial Invalidity and Subject-Matter Eligibility Contentions Exhibit B-09, Mar. 14, 2024, Case No. 2:23-cv-00471-JRG, *Sportscastr Inc. (dba Panda Interactive)* v. *Genius Sports LTD*, 152 pages (Ex_B-09_npl).

Genius Sports LTD's Initial Invalidity and Subject-Matter Eligibility Contentions Exhibit B-10, Mar. 14, 2024, Case No. 2:23-cv-00471-JRG, *Sportscastr Inc. (dba Panda Interactive)* v. *Genius Sports LTD*, 476 pages (Ex_B-10_npl).

Genius Sports LTD's Initial Invalidity and Subject-Matter Eligibility Contentions Exhibit B-11, Mar. 14, 2024, Case No. 2:23-cv-00471-JRG, *Sportscastr Inc. (dba Panda Interactive)* v. *Genius Sports LTD*, 371 pages (Ex_B-11_npl).

Genius Sports LTD's Initial Invalidity and Subject-Matter Eligibility Contentions Exhibit B-12, Mar. 14, 2024, Case No. 2:23-cv-00471-JRG, *Sportscastr Inc. (dba Panda Interactive)* v. *Genius Sports LTD*, 492 pages (Ex_B-12_npl).

Genius Sports LTD's Initial Invalidity and Subject-Matter Eligibility Contentions Exhibit B-13, Mar. 14, 2024, Case No. 2:23-cv-00471-JRG, *Sportscastr Inc. (dba Panda Interactive)* v. *Genius Sports LTD*, 119 pages (Ex_B-13_npl).

Genius Sports LTD's Initial Invalidity and Subject-Matter Eligibility Contentions Exhibit B-14, Mar. 14, 2024, Case No. 2:23-cv-00471-JRG, *Sportscastr Inc. (dba Panda Interactive)* v. *Genius Sports LTD*, 192 pages (Ex_B-14_npl).

Genius Sports LTD's Initial Invalidity and Subject-Matter Eligibility Contentions Exhibit C-01, Mar. 14, 2024, Case No. 2:23-cv-00471-JRG, *Sportscastr Inc. (dba Panda Interactive)* v. *Genius Sports LTD*, 477 pages (Ex_C-01_npl).

Genius Sports Website—Integrate on Native Apps Using a Webview, 62 pages (GS_00000014).

Genius Sports Website—Virtuals, 1 page (GS_00000081).

Halcyon Digital, Twitch Streaming Through OBS + How to get your stream key | Tutorial, Jul. 16, 2014, https://www.youtube.com/watch?v=KS3HNFV5dYs, 1 page (GS_00003658).

Hisayuki Ohmata et al., Hybridcast: A New Media Experience by Integration of broadcasting and Broadband, ITU KALEIDOSCOPE (2013), 8 pages (GS_00002813).

How Does Twitch Keep a Persistent Video Window over Several Pages, STACK OVERFLOW, https://stackoverflow.com/questions/41286748/how-does-twitch-keep-a-persistent-video• window-over-several-pages. 3 pages (GS_00002169).

How Facebook Live Streams to 800,000 Simultaneous Viewers, High Scalability (Jun. 27, 2016), https://highscalability.com/how-facebook-live-streams-to-800000-simultaneous• viewers/, 11 pages (GS_00002088).

How to Create a WebSocket Server, WowzABLOG (Jun. 23, 2016), https://web.archive.org/web/20170926004104/ https://www.wowza.com/docs/how-to-creat••-a-websocket-server, 14 pages (GS_00003188).

How to Stream to Facebook Live, TELESTREAM, https://www.telestream.net/telestream• support/wire-cast/how-to-stream-to-facebook-live.htm, 16 pages (GS_00002117).

HTML5 Chat is Live!, Twitch Blog (Jun. 30, 2015), https://blog.twitch.tv/en/2015/06/30/html5-chat-is-live-345782edded0/, 4 pages (GS_00002139).

Tan Sherr, Videogames Become a Spectator Sport, Wall St. J. (Nov. 24, 2013), http://online.wsj.com/article/SB10001424052702304607104579210140721840928.html, 4 pages (GS_00003164).

Ida-Maria Tunturipuro, Building a Low-Cost Streaming System, May 14, 2015, Bachelor's Thesis, Helsinki Metropolia University of Applied Science, 84 pages (GS_00002937).

Ireview4youri, Updated MLB At Bate 2011 iPhone App Review, iPhone App Review, YOUTUBE Apr. 18, 2011; https://www.youtube.com/watch?v=6S0PM9iflp0, 1 page (GS_00003650).

Jake Smith, Facebook Rolls Out Live Video Streaming to All iPhone Users Across US, Zdnet (Jan. 28, 2016), https://web.archive.org/web/2016012909100 I/http://www.zdnet.com/article/facebook-rolls• out-live-streaming-to-all-iphone-users-across-us/, 1 page (GS_00002057).

James Cook, Twitch Founder: We Turned a 'Terrible Idea' into a Billion-Dollar Company, Bus. INSIDER (Oct. 20, 2014), 15 pages (GS_00002918).

James Trew, MLB At Bat 2012 App Update Brings New Stats Overlay, Ford SYNC integration and more, ENGADGET (Sep. 3, 2012), https://www.engadget.com/2012-09-03- mlb-at-bat-2012-app-update-brings-new-stats-overlay.html, 1 page (GS_00002765).

Jan Ozer, Usstream, Justin.Iv, Livestream, and Bambuster: Streaming Unplugged, Streaming Media (Jun. 2012), web.archive.org/web/20131010063326/https:/www.streamingmedia.com/ Articles/ReadArticle.aspx, 18 pages (GS_00002865).

Jan Ozer, Ustream Review: Strong Customization, but a Weak Embedded Player, Streaming Media (Feb. 24, 2012), https://www.streamingmedia.com/Articles/ReadArticle.aspx?ArticleID=80899, 7 pages (GS_00003150).

Jason Cipriani, How to Start a Facebook Live Video, CNET (Jul. 8, 2016), https://www.cnet.com/tech/services-and-software/how-to-use-facebooks-live-video-feature/, 7 pages (GS_00002110).

Jason Maestas, Top Games for Jul. 2015—Rocket League Edition, Twitch Blog (Aug. 10, 2015), https://blog.twitch.tv/en/2015/08/10/top-games-for-july-2015-rocket-league-edition. f278d248475a, 4 pages (GS_00002933).

Jeff Baumgartner, Comcast's XI Blends Sports with Interactivity, Multichannel News (Jun. 19, 2015), https://www.nexttv.com/news/comcast-s-xl-blends-sports-interactivity-391773, 10 pages (GS_00001494).

Jie Deng et al., Behind the Game: Exploring the Twitch Streaming Platform, IEEE 14rn Int'l Work. Shop on Network and Sys. Support for Games (2015), 6 pages (GS_00001441).

Jillian D'Onfro, Facebookjust proved how serious it is about live video with a huge product update, Business Insider (Apr. 6, 2016), https://www.businessinsider.com/facebook-live• video-update-2016-4, 12 pages (GS_00002020).

John C. Tang et al., Meerkat and Periscope: I Stream, You Stream, Apps Stream for Live Streams, 4770 CHI (2016), 11 pages (GS_00002716).

John Constine, Facebook Launches "Live" Streaming Video Feature, But Only for Celebrities, TECHCRUNCH (Aug. 5, 2015), https://techcrunch.com/2015/08/05/facescope/, 16 pages (GS_00002004).

Jordan Golson, MLB At Bat Goes Live for 2012 with Improved Pricing Scheme, MACRUMORS (Feb. 29, 2012), https://web.archive.org/web/20120302182806/http://www.macrumors.com:80/2012/02/29 /mlb-at-bat-goes-live-for-2012-with-improved-pricing-scheme, 6 pages (GS_00002769).

Jordan Golson, MLB At Bat Updated for the 2013 Season, Local Game Video Still Blacked Out, MACRUMORS (Feb. 21, 2013), https://web.archive.org/web/20130225104539/http://www.macrumors.com:80/2013/02/21/ml b-at-bat-updated-dor-the-2013-season-local-game-video-still-blacked-out/, 9 pages (GS_00002775).

Joshua Carroll, How to Live Stream a Sporting Event, INSTRUCTABLES (Nov. 22, 2015), http://www.instructables.com/id/How-to-live-stream-a-sporting-event-using-equipmen/, 6 pages (GS_00002133).

Julia Greenberg, Zuckerberg Really Wants You to Stream Live Video on Facebook, WIRED (Apr. 6, 2016), https://www.wired.com/2016/04/facebook-really-really-wants-broadcas•• watch-live-video/, 15 pages (GS_00003620).

Julianna Reyes, How OneTwoSee's Baseball App is Getting in front of Millions of Comcast Subscribers, Technical. LY (Jun. 30, 2015), https://technical.ly/startups/comast-mlb• baseball-onetwosee/, 2 pages (GS_00002894).

Justin.tv's Live Video Broadcasting Architecture, High Scalability (Mar. 16, 2010), https://highscalability.com/justintvs-live-video-broadcasting-architecture/, 17 pages (GS_00002176).

Karine Pires & Gwendal Simon, YouTube Live and Twitch: A Tour of User-Generated Live Streaming Systems, 225 MMSYS (2015), 6 pages (GS_00003590).

Kate Abrosimova, What Technology Powers Periscope's Live Video Stream?, MEDIUM (Jun. 5, 2016), https://web. archive.org/web/

(56) References Cited

OTHER PUBLICATIONS

20170116004851/hhttps://medium.com/yalanti•• mobile/what-technology-powers-periscopes-live-video-stream-1de663a13ebd, 8 pages (GS_00003176).

Katie Collins, Periscope CEO: 'our app is just not very good at piracy,' WIRED (Jul. 3, 2015), https://web.archive.org/web/20160807230614/http://www.wired.co.uk:80/article/periscope• ceo-kayvon-beykpour-wimbledon-game-of-thrones, 8 pages (GS_00002825).

Sportscastr Inc. (Patent Owner) Preliminary Response In IPR-2024-01310 served Dec. 20, 2024, 84 pages (IPR-2024-01310_Sportcastr_Prelim_Res_12-20-24).

Sportscastr Inc. (Patent Owner) Preliminary Response In IPR-2024-01311 served Dec. 20, 2024, 87 pages (IPR-2024-01311_Sportcastr_Prelim_Resp_12-20-24).

Sportscastr Inc. (Patent Owner) Preliminary Response, IPR2024-01305, served Dec. 19, 2024, 81 pages (IPR-2024-01305_Sportcastr_Prelim_Res_12-19-24), 2 parts.

SportsCastr's Disclosure of Asserted Claims and Preliminary Infringement Contentions, filed Jan. 18, 2024, 638 pages (SPORTSCASTR_Infring_Con_01-18-2024), 18 parts.

Stuart Dredge, What is Twitch, and why does Google want it? The Guardian (May 19, 2014) https://www.theguardian.com/technology/2014/Maymay/19/twitch-youtube-live-games-google-acquisition-pokemon (Stuart_Dredge_GS_0022430), 3 pages.

Twitch 2015 Retrospective, https://webarchive.org/web/20160607170832/htt;://twitch.tv/year/2015, 28 pages (twitch-2015_GS 00022391).

Twitch Announces Open Developer Program with New Tools to Enable Gameplay Highlight, Discover, Creation, and Sharing. BUSINESSWIRE (Jun. 10, 2013) https//www.businesswire.com/news/home/201306100005347/en/Twitch-Announces-Open -Developer-Program-With-New-Tools-To-Enable-Gameplay-Highlight-Discovery-Creation-and-Sharing (Twitch_Announces_GS_00022453), 3 pages.

Twitch on the App Store, https://web.archive.org/web/20160530200407/htt;//itunes.apple.com/us/app/twitchtv/id460177396, (Twitch_app_GS_00022535), 2 pages.

Twitch's API documentation, including TWITCH_0000001-000291, published online at https://github.com/justintv/Twitch-API, (Twitch_API_Documentation_291pages), 4 parts.

Twitch's customer help documentation, production Nos. GS_00022456-22534, published online https://help.twitch.tv/, (TWITCH_Customer_help_doc_79pages).

Twitch's public-facing website, production Nos. GS-00022433-2245, published online at http://www.twitch.tv/, 23 pages (Twitch_Public-facing_website_23p_npl).

U. Rauschenbach, "A scalable interactive TV service supporting synchronized delivery over broadcast and broadband. Networks." IBC 2004 Conference, (Sep. 2004), https://www.rauschenbach.net/Publications/docs/paper-IBC04-SAVANT-rauschenbach_et_al.pdf, 8 pages (Rauschenbach_et_al_Scalable_IBC_2004).

56 Bit Sportradar Case Study, Sportradar Time System 2022 accessed at https://www.56bit.com/case-studies/sportradar-time-system on Feb. 16, 2023, 5 pages.

Analyze & Optimize. Maestro 2020. Accessed at https://info.maestro.io/analyze-and-optimize on Apr. 21, 2021. 2 pages.

API Feed Overview and Documentation, Jan. 31, 2022, GeniusSport Support Centre, 3 pages.

Around-the-clock action for you sportsbook. BetGenius Brochure. Accessed at https://geniussports.com/sportsbook/content/streaming/ on Mar. 19, 2021. 1 page.

Betbuilder Architecture, GeniusSports, Oct. 13, 2022, 5 pages.

BetBuilder evolves to provide the ultimate pre-match experience, GeniusSports Website Sep. 18, 2019, 3 pages.

Betbuilder Integration - Prebuilt bets GeniusSports Wiki, May 25, 2021, 2 pages.

Betbuilder Integration, GeniusSports, Oct. 13, 2022, 1 page.

Betgenius Adds Live Streaming to Tipsport Deal, Gaming Intelligence, Sep. 23, 2020, 1 page.

Betgenius Launches Live Streaming Service for Sportsbooks, Genius Sports, Oct. 8, 2019, 3 pages.

Betgenius Streaming, Bring your sportsbook to Life-Right Around the Clock, Dec. 3, 2020, 2 pages.

Betradar 10 Benefits of our New Audio Visual Player—Jul. 10, 2019, accessed at https://www.betradar.com/news-archive/the-top-10-benefits-of-our-new-audio-visual-player/ on Feb. 24, 2023, 1 page.

Betradar Audio-Visual Brochure 2022, 8 pages.

Betradar Audio-Visual Brochure 2023, 9 pages.

Betradar Brochure—MTS SDK .NET Integration Guide—Oct. 2020 accessed at https://sdk.sportradar.com/mts/net/file?g=ab6006f6-f554-482f-92db-26af416eec92 on Feb. 17, 2023, 14 pages.

Betradar Brochure Live Scouting & Live Odds Services, 24/7 Live Betting Coverage from the market leader, 2015, 12 pages.

Betradar Brochure Live-Data Service 2022 accessed at https://www.betradar.com/wp-content/uploads/sites/4/2022/11/Live-Data-Brochure-2022.pdf, 5 pages.

Betradar Brochure MTS SDK Java Integration Guide—May 2019 accessed at https://sdk.sportradar.com/mts/java/file?g=998cd241-1182-4c30-9f54-697e6cadad7b on Feb. 18, 2023, 14 pages.

Betradar CTRL User Manual, Jul. 2019 accessed at https://insidectrl.com/wp-content/uploads/2019/09/Betradar_Ctrl_Manual_17_July_2019.pdf, on Feb. 16, 2023, 88 pages.

Betradar CTRL User Manual, Mar. 2021 access at https://insidectrl.com/help-manual/ on Feb. 16, 2023, 102 pages.

Betradar Live Channel Online, Dec. 31, 2022, 3 page.

Betradar Live Channel Trading, Dec. 31, 2022, 2 page.

Betradar Live Data Service-Efficiently Operate Your Own In-running trading, Dec. 30, 2022, accessed at https://www.betradar.com/betting-services/live-data-service/ on Feb. 16, 2023, 3 page.

Betradar Live Streaming Brochure 2019, accessed at https://betradar.com/wp-content/uploads/sites/4/2015/07/Live_Channel_Brochure_2019.pdf on Feb. 24, 2023, 7 pages.

Betradar Live Streaming Brochure 2021. Accessed at https://www.betradar.com/wp-content/uploads/sites/4/2014/11/Betradar-Live-Streaming-Brochure.pdf on Apr. 29, 2021. 7 pages.

Betradar Market Leading Sports Betting Product Brochure 2021. Accessed at https://www.betradar.com/wp-content/uploads/sites/4/2021/02/Betradar-Product-Brochure-2021.pdf on Apr. 29, 2021. 24 pages.

Betradar Market-leading Sports Betting Services Product Brochure 2022, 23 pages.

Betradar Product Brochure 2015, 27 pages.

Betradar Product Brochure 2016, 29 pages.

Betradar Product Brochure 2018, 15 pages.

Betradar Product Brochure 2019, 36 pages.

Betradar Top Reasons to Use the New AV API, Jul. 31, 2019, accessed at https://www.betradar.com/news-archive/61-reasons-to-use-the-new-av-api/ on Feb. 24, 2023, 2 pages.

Betradar Unified Odds Feed—Quick Start Guide, May 16, 2018, accessed at https://insidectrl.com/wp-content/uploads/2018/05/UOF-Start-Guide.pdf on Apr. 13, 2023, 5 pages.

Betradar Unified Odds Feed—Quick Start Guide, May 30, 2022, accessed at https://iodocs.betradar.com/unifiedsdk/UOF_Start_Guide.pdf on Feb. 17, 2023, 6 pages.

Betradar Unified Odds-Integration Information for Development, Mar. 27, 2019 accessed at https://iodocs.betradar.com/unifiedsdk/Betradar_Unified-Odds_Developer_Integration.pdf on Feb. 16, 2023, 137 pages.

Betradar Unified Odds-Integration Information for Development, Oct. 11, 2017 accessed at https://insidectrl.com/wp-content/uploads/2017/10/2017-10-11_Betradar_Unified-Odds_Developer_Integration-1.pdf on Feb. 16, 2023, 80 pages.

BETRADAR. Sportradar. Accessed at https://www.betradar.com/ on Apr. 21, 2021. 2 pages.

Betradar's Live Channels. Betrader Brochure 2017, 7 pages.

BOOLABUS, Bring it to life with Betstream, Feb. 2011, 22 pages.

Common Match State Platform APIs GeniusSports Wiki Jul. 5, 2022, 2 pages.

Customize & Control. Maestro 2020. Accessed at https://info.maestro.io/customize-and-control on Apr. 21, 2021. 2 pages.

(56)　　　　　References Cited

OTHER PUBLICATIONS

Empson, Baseball's Digital Trifecta and How America's Pastime is Setting the Pace for Sports Online. TechCrunch Nov. 4, 2013. Accessed at https://techcrunch.com/2013/11/04/baseballs-digital-trifecta-and-how-americas-pastime-is-setting-the-pace-for-sports-online/. 10 pages.
Engage & Monetize. Maestro 2020. Accessed at https://info.maestro.io/engage-and-monetize on Apr. 21, 2021. 3 pages.
Esports - Take your fan experience to the next level and build community. Maestro 2020. Accessed at https://info.maestro.io/esports on Apr. 21, 2021. 4 pages.
Gammastack-Betradar Integration Architecture, Dec. 29, 2022 accessed at https://www.gammastack.com/betradar-integration/ on Feb. 16, 2023, 7 pages.
GammaStack-Betradar Integration Services, Betradar Software, Dec. 29, 2022, accessed at https://www.gammastack.com/betradar-integration-services/ on Feb. 17, 2023, 6 pages.
Genius Play Integration Guide, Drop and Play, GeniusSports Wike Website, Jul. 19, 2021, 7 pages.
Genius Sports Expands Partnership with NFL to Provide Watch & Bet Video Streams For the 2022 Season, Starting with Caesars Entertainment, BusinessWire, Dec. 5, 2022, 2 pages.
Genius Sports Group Analyst Day Presentation Jan. 2021. Accessed at https://s27.q4cdn.com/552951210/files/doc_downloads/GSG_Analyst_Day_Presentation_January_2021_vFF_2.pdf on Apr. 29, 2021. 52 pages.
Genius Sports Group Investor Presentation Oct. 2020. Accessed at https://news.geniussports.com/wp-content/uploads/2020/10/GSG-Investor-Presentation.pdf on Apr. 29, 2021. 29 pages.
Genius Sports LTD's First Supplemental Invalidity and Subject-Matter Eligibility Contentions Exhibit D-4, Jul. 29, 2024, Case No. 2:23-cv-00471-JRG, *Sportscastr Inc. (dba Panda Interactive)* v. *Genius Sports LTD*, 25 pages (Ex_D-4_088_npl).
Genius Sports LTD's First Supplemental Invalidity and Subject-Matter Eligibility Contentions Exhibit E-1, Jul. 29, 2024, Case No. 2:23-cv-00471-JRG, *Sportscastr Inc. (dba Panda Interactive)* v. *Genius Sports LTD*, 212 pages (Ex_E-01_088_npl).
Genius Sports LTD's First Supplemental Invalidity and Subject-Matter Eligibility Contentions Exhibit E-10, Jul. 29, 2024, Case No. 2:23-cv-00471-JRG, *Sportscastr Inc. (dba Panda Interactive)* v. *Genius Sports LTD*, 311 pages (Ex_E-10_088_npl).
Genius Sports LTD's First Supplemental Invalidity and Subject-Matter Eligibility Contentions Exhibit E-11, Jul. 29, 2024, Case No. 2:23-cv-00471-JRG, *Sportscastr Inc. (dba Panda Interactive)* v. *Genius Sports LTD*, 372 pages (Ex_E-11_088_npl).
Genius Sports LTD's First Supplemental Invalidity and Subject-Matter Eligibility Contentions Exhibit E-12, Jul. 29, 2024, Case No. 2:23-cv-00471-JRG, *Sportscastr Inc. (dba Panda Interactive)* v. *Genius Sports LTD*, 85 pages (Ex_E-12_088_npl).
Genius Sports LTD's First Supplemental Invalidity and Subject-Matter Eligibility Contentions Exhibit E-13, Jul. 29, 2024, Case No. 2:23-cv-00471-JRG, *Sportscastr Inc. (dba Panda Interactive)* v. *Genius Sports LTD*, 114 pages (Ex_E-13_088_npl).
Genius Sports LTD's First Supplemental Invalidity and Subject-Matter Eligibility Contentions Exhibit E-14, Jul. 29, 2024, Case No. 2:23-cv-00471-JRG, *Sportscastr Inc. (dba Panda Interactive)* v. *Genius Sports LTD*, 140 pages (Ex_E-14_088_npl).
Genius Sports LTD's First Supplemental Invalidity and Subject-Matter Eligibility Contentions Exhibit E-15, Jul. 29, 2024, Case No. 2:23-cv-00471-JRG, *Sportscastr Inc. (dba Panda Interactive)* v. *Genius Sports LTD*, 205 pages (Ex_E-15_088_npl).
Genius Sports LTD's First Supplemental Invalidity and Subject-Matter Eligibility Contentions Exhibit E-16, Jul. 29, 2024, Case No. 2:23-cv-00471-JRG, *Sportscastr Inc. (dba Panda Interactive)* v. *Genius Sports LTD*, 247 pages (Ex_E-16_088_npl).
Genius Sports LTD's First Supplemental Invalidity and Subject-Matter Eligibility Contentions Exhibit E-17, Jul. 29, 2024, Case No. 2:23-cv-00471-JRG, *Sportscastr Inc. (dba Panda Interactive)* v. *Genius Sports LTD*, 423 pages (Ex_E-17_088_npl).

Genius Sports LTD's First Supplemental Invalidity and Subject-Matter Eligibility Contentions Exhibit E-18, Jul. 29, 2024, Case No. 2:23-cv-00471-JRG, *Sportscastr Inc. (dba Panda Interactive)* v. *Genius Sports LTD*, 408 pages (Ex_E-18_088_npl).
Genius Sports LTD's First Supplemental Invalidity and Subject-Matter Eligibility Contentions Exhibit E-19, Jul. 29, 2024, Case No. 2:23-cv-00471-JRG, *Sportscastr Inc. (dba Panda Interactive)* v. *Genius Sports LTD*, 177 pages (Ex_E-19_088_npl).
Genius Sports LTD's First Supplemental Invalidity and Subject-Matter Eligibility Contentions Exhibit E-2, Jul. 29, 2024, Case No. 2:23-cv-00471-JRG, *Sportscastr Inc. (dba Panda Interactive)* v. *Genius Sports LTD*, 453 pages (Ex_E-02_088_npl).
Genius Sports LTD's First Supplemental Invalidity and Subject-Matter Eligibility Contentions Exhibit E-20, Jul. 29, 2024, Case No. 2:23-cv-00471-JRG, *Sportscastr Inc. (dba Panda Interactive)* v. *Genius Sports LTD*, 233 pages (Ex_E-20_088_npl).
Genius Sports LTD's First Supplemental Invalidity and Subject-Matter Eligibility Contentions Exhibit E-21, Jul. 29, 2024, Case No. 2:23-cv-00471-JRG, *Sportscastr Inc. (dba Panda Interactive)* v. *Genius Sports LTD*, 204 pages (Ex_E-21_088_npl).
Genius Sports LTD's First Supplemental Invalidity and Subject-Matter Eligibility Contentions Exhibit E-22, Jul. 29, 2024, Case No. 2:23-cv-00471-JRG, *Sportscastr Inc. (dba Panda Interactive)* v. *Genius Sports LTD*, 181 pages (Ex_E-22_088_npl).
Genius Sports LTD's First Supplemental Invalidity and Subject-Matter Eligibility Contentions Exhibit E-23, Jul. 29, 2024, Case No. 2:23-cv-00471-JRG, *Sportscastr Inc. (dba Panda Interactive)* v. *Genius Sports LTD*, 192 pages (Ex_E-23_088_npl).
Genius Sports LTD's First Supplemental Invalidity and Subject-Matter Eligibility Contentions Exhibit E-24, Jul. 29, 2024, Case No. 2:23-cv-00471-JRG, *Sportscastr Inc. (dba Panda Interactive)* v. *Genius Sports LTD*, 184 pages (Ex_E-24_088_npl).
Genius Sports LTD's First Supplemental Invalidity and Subject-Matter Eligibility Contentions Exhibit E-25, Jul. 29, 2024, Case No. 2:23-cv-00471-JRG, *Sportscastr Inc. (dba Panda Interactive)* v. *Genius Sports LTD*, 236 pages (Ex_E-25_088_npl).
Genius Sports LTD's First Supplemental Invalidity and Subject-Matter Eligibility Contentions Exhibit E-26, Jul. 29, 2024, Case No. 2:23-cv-00471-JRG, *Sportscastr Inc. (dba Panda Interactive)* v. *Genius Sports LTD*, 329 pages (Ex_E-26_088_npl).
Genius Sports LTD's First Supplemental Invalidity and Subject-Matter Eligibility Contentions Exhibit E-3, Jul. 29, 2024, Case No. 2:23-cv-00471-JRG, *Sportscastr Inc. (dba Panda Interactive)* v. *Genius Sports LTD*, 245 pages (Ex_E-03_088_npl).
Genius Sports LTD's First Supplemental Invalidity and Subject-Matter Eligibility Contentions Exhibit E-4, Jul. 29, 2024, Case No. 2:23-cv-00471-JRG, *Sportscastr Inc. (dba Panda Interactive)* v. *Genius Sports LTD*, 602 pages (Ex_E-04_088_npl).
Genius Sports LTD's First Supplemental Invalidity and Subject-Matter Eligibility Contentions Exhibit E-5, Jul. 29, 2024, Case No. 2:23-cv-00471-JRG, *Sportscastr Inc. (dba Panda Interactive)* v. *Genius Sports LTD*, 76 pages (Ex_E-05_088_npl).
Genius Sports LTD's First Supplemental Invalidity and Subject-Matter Eligibility Contentions Exhibit E-6, Jul. 29, 2024, Case No. 2:23-cv-00471-JRG, *Sportscastr Inc. (dba Panda Interactive)* v. *Genius Sports LTD*, 183 pages (Ex_E-06_088_npl).
Genius Sports LTD's First Supplemental Invalidity and Subject-Matter Eligibility Contentions Exhibit E-7, Jul. 29, 2024, Case No. 2:23-cv-00471-JRG, *Sportscastr Inc. (dba Panda Interactive)* v. *Genius Sports LTD*, 53 pages (Ex_E-07_088_npl).
Genius Sports LTD's First Supplemental Invalidity and Subject-Matter Eligibility Contentions Exhibit E-8, Jul. 29, 2024, Case No. 2:23-cv-00471-JRG, *Sportscastr Inc. (dba Panda Interactive)* v. *Genius Sports LTD*, 68 pages (Ex_E-08_088_npl).
Genius Sports LTD's First Supplemental Invalidity and Subject-Matter Eligibility Contentions Exhibit E-9, Jul. 29, 2024, Case No. 2:23-cv-00471-JRG, *Sportscastr Inc. (dba Panda Interactive)* v. *Genius Sports LTD*, 237 pages (Ex_E-09_088_npl).
Genius Sports LTD's First Supplemental Invalidity and Subject-Matter Eligibility Contentions served on Jul. 29, 2024, in U.S. District Court, Eastern Division of Texas Marshall Division, Case

(56) References Cited

OTHER PUBLICATIONS

No. 2:23-cv-00471-JRG, *Sportscastr Inc.* (*dba Panda Interactive*) v. *Genius Sports LTD*, 58 pages (2024-07-29_Genius_Supp_Cont_ npl).

Genius Sports LTD's Initial Invalidity and Subject-Matter Eligibility Contentions Exhibit C-10, Mar. 14, 2024, Case No. 2:23-cv-00471-JRG, *Sportscastr Inc.* (*dba Panda Interactive*) v. *Genius Sports LTD*, 980 pages (Ex_C-10_218_npl).

Genius Sports LTD's Initial Invalidity and Subject-Matter Eligibility Contentions Exhibit C-11, Mar. 14, 2024, Case No. 2:23-cv-00471-JRG, *Sportscastr Inc.* (*dba Panda Interactive*) v. *Genius Sports LTD*, 777 pages (Ex_C-11_218_npl).

Genius Sports LTD's Initial Invalidity and Subject-Matter Eligibility Contentions Exhibit C-12, Mar. 14, 2024, Case No. 2:23-cv-00471-JRG, *Sportscastr Inc.* (*dba Panda Interactive*) v. *Genius Sports LTD*, 1206 pages (Ex_C-12_218_npl).

Genius Sports LTD's Initial Invalidity and Subject-Matter Eligibility Contentions Exhibit C-13, Mar. 14, 2024, Case No. 2:23-cv-00471-JRG, *Sportscastr Inc.* (*dba Panda Interactive*) v. *Genius Sports LTD*, 321 pages (Ex_C-13_218_npl).

Genius Sports LTD's Initial Invalidity and Subject-Matter Eligibility Contentions Exhibit C-14, Mar. 14, 2024, Case No. 2:23-cv-00471-JRG, *Sportscastr Inc.* (*dba Panda Interactive*) v. *Genius Sports LTD*, 401 pages (Ex_C-14_218_npl).

Genius Sports LTD's Initial Invalidity and Subject-Matter Eligibility Contentions Exhibit C-2, Mar. 14, 2024, Case No. 2:23-cv-00471-JRG, *Sportscastr Inc.* (*dba Panda Interactive*) v. *Genius Sports LTD*, 925 pages (Ex_C-02_218_npl).

Genius Sports LTD's Initial Invalidity and Subject-Matter Eligibility Contentions Exhibit C-3, Mar. 14, 2024, Case No. 2:23-cv-00471-JRG, *Sportscastr Inc.* (*dba Panda Interactive*) v. *Genius Sports LTD*, 627 pages (Ex_C-03_218_npl).

Genius Sports LTD's Initial Invalidity and Subject-Matter Eligibility Contentions Exhibit C-4, Mar. 14, 2024, Case No. 2:23-cv-00471-JRG, *Sportscastr Inc.* (*dba Panda Interactive*) v. *Genius Sports LTD*, 1339 pages (Ex_C-04_218_npl).

Genius Sports LTD's Initial Invalidity and Subject-Matter Eligibility Contentions Exhibit C-5, Mar. 14, 2024, Case No. 2:23-cv-00471-JRG, *Sportscastr Inc.* (*dba Panda Interactive*) v. *Genius Sports LTD*, 458 pages (Ex_C-05_218_npl).

Genius Sports LTD's Initial Invalidity and Subject-Matter Eligibility Contentions Exhibit C-6, Mar. 14, 2024, Case No. 2:23-cv-00471-JRG, *Sportscastr Inc.* (*dba Panda Interactive*) v. *Genius Sports LTD*, 345 pages (Ex_C-06_218_npl).

Genius Sports LTD's Initial Invalidity and Subject-Matter Eligibility Contentions Exhibit C-7, Mar. 14, 2024, Case No. 2:23-cv-00471-JRG, *Sportscastr Inc.* (*dba Panda Interactive*) v. *Genius Sports LTD*, 438 pages (Ex_C-07_218_npl).

Genius Sports LTD's Initial Invalidity and Subject-Matter Eligibility Contentions Exhibit C-8, Mar. 14, 2024, Case No. 2:23-cv-00471-JRG, *Sportscastr Inc.* (*dba Panda Interactive*) v. *Genius Sports LTD*, 500 pages (Ex_C-08_218_npl).

Genius Sports LTD's Initial Invalidity and Subject-Matter Eligibility Contentions Exhibit C-9, Mar. 14, 2024, Case No. 2:23-cv-00471-JRG, *Sportscastr Inc.* (*dba Panda Interactive*) v. *Genius Sports LTD*, 326 pages (Ex_C-09_218_npl).

Genius Sports LTD's Initial Invalidity and Subject-Matter Eligibility Contentions Exhibit D-1, Mar. 14, 2024, Case No. 2:23-cv-00471-JRG, *Sportscastr Inc.* (*dba Panda Interactive*) v. *Genius Sports LTD*, 22 pages (Ex_D-01_687_Patent_npl).

Genius Sports LTD's Initial Invalidity and Subject-Matter Eligibility Contentions Exhibit D-2, Mar. 14, 2024, Case No. 2:23-cv-00471-JRG, *Sportscastr Inc.* (*dba Panda Interactive*) v. *Genius Sports LTD*, 25 pages (Ex_D-02_697_Patent_npl).

Genius Sports LTD's Initial Invalidity and Subject-Matter Eligibility Contentions Exhibit D-3, Mar. 14, 2024, Case No. 2:23-cv-00471-JRG, *Sportscastr Inc.* (*dba Panda Interactive*) v. *Genius Sports LTD*, 20 pages (Ex_D-03_218_Patent_npl).

Real-Time Second Screen Connectivity, http:///www.kaazing.com/solutions/real-time-second-screen/connectivity/ (Nov. 10, 2016) (GS_00012474) (Second Screen Connectivity), 1 page.

Arini, ST, MT, ch 6 Multimedia Distribution, https://www.slideserve.com/tassos/ch-6-multimedia-distribution (Oct. 11, 2024), (ARINI_CH-6_2014) 37 pages.

Brian Snelson, CloudFlare Now Supports WebSockets (Aug. 5, 2014), (Brian_Snelson_Cloudflare_2014) 14 pages.

Christian Hessleman, et al., "Sharing Enriched Multimedia Experiences accross Heterogeneous Network Infrastructures" IEEE Communications Magazine 48.6 (2010): 54-65, (Hessleman_et_al_Sharing_IEEE_2010).

Comparison of the Declaration of Dr. Omid Kia, PhD. (Feb. 11, 25) with Wicker Declaration (Dec. 6, 24) 232 pages (Comparison_Kia_Wicker_232-pages), 4 parts.

Comparison of the KIA Declaration dated Dec. 6, 2024 to WICKER Declaration dated Aug. 22, 2024, 508 pages (Comparison_KIA_WICKER).

Curriculum Vitae of Dr. Omid Kia, Ph.D., 13 pages (KIA_CV).

Declaration of D. Omid Kia, Ph.D., Feb. 11, 2025, 224 pages (Kia_Decl_02-11-2025_224page), 4 parts.

Declaration of Dr. Omid Kia, Ph.D., for U.S. Pat. Nos. 10,425,697 and 10,805,687, dated Dec. 13, 2024, 392 pages (Kia_Dec_re_10425697_and_10805687_12-13-24_392_pg).

Declaration of Dr. Omid Kia, Ph.D.for IPR Nos. 2025-00265, 2025-00266, 2025-00268, 2025-00269, 2025-00273, 2025-00275 dated Dec. 6, 2024, 502 pages (Kia_Decl_12-6-24).

EX-2001 to Patent Owners Preliminary Responses dated Dec. 19, 2024 and Dec. 20, 2024 IPRs 2024-01305, 01307, 01310 and 01311, Declaration of Rubin, Ph.D., 167 pages (POPR-Ex-2001).

EX-2002 to Patent Owners Preliminary Responses dated Dec. 19, 2024 and Dec. 20, 2024 in IPRs 2024-01305, 01307, 01310 and 01311—Curriculum vitae of Aviel Rubin, Ph.D., 24 pages (POPR-Ex-2002).

EX-2003 to Patent Owners Preliminary Responses dated Dec. 19, 2024 and Dec. 20, 2024 in IPRs 2024-01305, 01307, 01310 and 01311—Joint Claim Construction Statement, Dkt. 69, 24 pages (POPR-Ex-2003).

EX-2004 to Patent Owners Preliminary Responses dated Dec. 19, 2024 and Dec. 20, 2024 in IPRs 2024-01305, 01307, 01310 and 01311—Declaration of Dr. Stephen Wicker, Sep. 13, 2024, 121 pages (POPR-Ex-2004_QC) 7 parts.

EX-2005 to Patent Owners Preliminary Responses dated Dec. 19, 2024 and Dec. 20, 2024 in IPRs 2024-01305, 01307, 01310 and 01311—Yahoo Finance Tanner Simkins, Apr. 20, 2017, 3 pages (POPR-Ex-2005).

EX-2006 to Patent Owners Preliminary Responses dated Dec. 19, 2024 and Dec. 20, 2024 in IPRs 2024-01305, 01307, 01310 and 01311—NBA.com, Steve Ashbumer Apr. 27, 2017 Article, 5 pages (POPR-Ex-2006).

EX-2007 to Patent Owners Preliminary Responses dated Dec. 19, 2024 and Dec. 20, 2024 in IPRs 2024-01305, 01307, 01310 and 01311—Sportstechie, Robert Roble, Apr. 22, 2017, 9 pages (POPR-Ex-2007).

EX-2008 to Patent Owners Preliminary Responses dated Dec. 19, 2024 and Dec. 20, 2024 in IPRs 2024-01305, 01307, 01310 and 01311—Sports Tech Tokyo Award; 2019 Yahoo! Sports Tech Awards; Sports Business Awards, 6 pages (POPR-Ex-2008_QC).

EX-2009 to Patent Owners Preliminary Responses dated Dec. 19, 2024 and Dec. 20, 2024 in IPRs 2024-01305, 01307, 01310 and 01311—Various Media Reports on the Patented Invention, 28 pages (POPR-Ex-2009_QC).

EX-2010 to Patent Owners Preliminary Responses dated Dec. 19, 2024 and Dec. 20, 2024 in IPRs 2024-01305, 01307, 01310 and 01311—CNBC, Dec. 20, 2018, 1 page (POPR-Ex-2010_QC).

EX-2011 to Patent Owners Preliminary Responses dated Dec. 19, 2024 and Dec. 20, 2024 in IPRs 2024-01305, 01307, 01310 and 01311—https://sportscastr.com/about, 3 pages (POPR-Ex-2011).

EX-2012 to Patent Owners Preliminary Responses dated Dec. 19, 2024 and Dec. 20, 2024 in IPRs 2024-01305, 01307, 01310 and 01311—https://pandainteractive.com/patents, 9 pages (POPR-Ex-2012_QC).

(56) References Cited

OTHER PUBLICATIONS

EX-2013 to Patent Owners Preliminary Responses dated Dec. 19, 2024 and Dec. 20, 2024 in IPRs 2024-01305, 01307, 01310 and 01311—https://sportscastr.com, 2 pages (POPR-Ex-2013).
EX-2014 to Patent Owners Preliminary Responses dated Dec. 19, 2024 and Dec. 20, 2024 in IPRs 2024-01305, 01307, 01310 and 01311—https://studiopanda.live/, 1 page (POPR-Ex-2014).
EX-2015 to Patent Owners Preliminary Responses dated Dec. 19, 2024 and Dec. 20, 2024 in IPRs 2024-01305, 01307, 01310 and 01311—Genius Sports Feb. 24, 18 Email, 3 pages (POPR-Ex-2015).
EX-2016 to Patent Owners Preliminary Responses dated Dec. 19, 2024 and Dec. 20, 2024 in IPRs 2024-01305, 01307, 01310 and 01311—Genius Sports May 7, 18 Email, 3 pages (POPR-Ex-2016).
EX-2017 to Patent Owners Preliminary Responses dated Dec. 19, 2024 and Dec. 20, 2024 in IPRs 2024-01305, 01307, 01310 and 01311—'687 Patent Genius Sports Infringement Claim Chart, 50 pages (POPR-Ex-2017).
EX-2018 to Patent Owners Preliminary Responses dated Dec. 19, 2024 and Dec. 20, 2024 in IPRs 2024-01305, 01307, 01310 and 01311—https://www.opensourceforu.com/2015/03/a-guide-to-using-raw-sockets, 10 pages (POPR-Ex-2018).
EX-2019 to Patent Owners Preliminary Responses dated Dec. 19, 2024 and Dec. 20, 2024 in IPRs 2024-01305, 01307, 01310 and 01311—https://learn.microsoft.com/en-US/windows/win32/winsock/tcp-ip-raw-sockets-2, 5 pages (POPR-Ex-2019).
EX-2020 to Patent Owners Preliminary Responses dated Dec. 19, 2024 and Dec. 20, 2024 in IPRs 2024-01305, 01307, 01310 and 01311 Oracle documentation in 2011: Anatomy of the Client/Server Model. https://docs.oracle.com/cd/E13203_01/tuxedo/tux80/atmi/intbas3.htm, 3 pages (POPR-Ex-2020).
EX-2021 to Patent Owners Preliminary Responses dated Dec. 19, 2024 and Dec. 20, 2024 in IPRs 2024-01305, 01307, 01310 and 01311—Peng, Gang. "CDN: Content distribution network." arXiv preprint cs/0411069 (2004) https://arxiv.org/pdf/cs/0411069, 26 pages (POPR-Ex-2021.
EX-2022 to Patent Owners Preliminary Responses dated Dec. 19, 2024 and Dec. 20, 2024 in IPRs 2024-01305, 01307, 01310 and 01311—The History of Streaming Media. https://boyetblog.s3.amazonaws.com/PCPlus/324.Streaming.pdf, 3 pages (POPR-Ex-2022).
EX-2023 to Patent Owners Preliminary Responses dated Dec. 19, 2024 and Dec. 20, 2024 in IPRs 2024-01305, 01307, 01310 and 01311—RFC 2326: Real Time Streaming Protocol (RTSP) https://www.ietf.org/rfc/rfc2326.txt, 72 pages (POPR-Ex-2023).
EX-2024 to Patent Owners Preliminary Responses dated Dec. 19, 2024 and Dec. 20, 2024 in IPRs 2024-01305, 01307, 01310 and 01311—Adobe's Real Time Messaging Protocol https://rtmo.veriskooe.com/pdf/rtmp specification1.0.pdf, 52 pages (POPR-Ex-2024).
EX-2025 to Patent Owners Preliminary Responses dated Dec. 19, 2024 and Dec. 20, 2024 in IPRs 2024-01305, 01307, 01310 and 01311—WebRTC 1.0: Real time Communication Between Browsers https://www.w3.org/TR/2011/WD-webrtc-20111027/, 28 pages (POPR-Ex-2025).
EX-2026 to Patent Owners Preliminary Responses dated Dec. 19, 2024 and Dec. 20, 2024 in IPRs 2024-01305, 01307, 01310 and 01311—HTTP Live Streaming: draft-pantos-http-live-streaming-01 https://datatracker.ietf.org/doc/html/draft-pantos-http-live-streaming-01, 17 pages (POPR-Ex-2026).
EX-2027 to Patent Owners Preliminary Responses dated Dec. 19, 2024 and Dec. 20, 2024 in IPRs 2024-01305, 01307, 01310 and 01311—Microsoft to Add Smooth Streaming in IIS7 https://virtualizationreview.com/articles/2008/11/04/microsoft-to-add-smooth-streaming-in-iis7.aspx, 4 pages (POPR-Ex-2027).
EX-2028 to Patent Owners Preliminary Responses dated Dec. 19, 2024 and Dec. 20, 2024 in IPRs 2024-01305, 01307, 01310 and 01311—HTTP Dynamic Streaming. (Archived May 14, 2010) https://web.archive.org/web/20100514170442/http://www.adobe.com/products/httpdynamicstreaming/, 2 pages (POPR-Ex-2028).

EX-2029 to Patent Owners Preliminary Responses dated Dec. 19, 2024 and Dec. 20, 2024 in IPRs 2024-01305, 01307, 01310 and 01311—MPEG ratifies its draft standard for DASH. (Archived Dec. 14, 2011) https://web.archive.org/web/20111214104626/http://mpeg.chiari glione.org/meetings/geneva11-1/Geneva_press.htm, 4 pages (POPR-Ex-2029).
EX-2030 to Patent Owners Preliminary Responses dated Dec. 19, 2024 and Dec. 20, 2024 in IPRs 2024-01305, 01307, 01310 and 01311—Mogulus Rebrands With A Killer Domain: Livestream.com https://techcrunch.com/2009/05/18/mogulus-gets-a-killer-domain-for-rebranding-livestreamcom/, 6 pages (POPR-Ex-2030).
EX-2031 to Patent Owners Preliminary Responses dated Dec. 19, 2024 and Dec. 20, 2024 in IPRs 2024-01305, 01307, 01310 and 01311—How to watch Obama's inauguration (and the parties) online https://www.cnet.com/tech/tech-industry/how-to-watch-obamas-inauguration-and-the-parties-online/, 6 pages (POPR-Ex-2031).
EX-2032 to Patent Owners Preliminary Responses dated Dec. 19, 2024 and Dec. 20, 2024 in IPRs 2024-01305, 01307, 01310 and 01311—Twitch is 4th in Peak US Internet Traffic, https://blog.twitch.tv/en/2014/02/05/twitch-is-4th-in-peak-us-internet-traffic-90b1295af358/, 4 pages (POPR-Ex-2032).
EX-2033 to Patent Owners Preliminary Responses dated Dec. 19, 2024 and Dec. 20, 2024 in IPRs 2024-01305, 01307, 01310 and 01311—Twitch Engineering: An Introduction and Overview, https://blog.twitch.tv/en/2015/12/18/twitch-engineering-an-introduction-and-overview-a23917b71a25/, 8 pages (POPR-Ex-2033).
EX-2034 to Patent Owners Preliminary Responses dated Dec. 19, 2024 and Dec. 20, 2024 in IPRs 2024-01305, 01307, 01310 and 01311—Proceedings of the 25th ACM workshop on network and operating systems support for digital audio and video, pp. 55-60, 2015 https://arxiv.org/ndf/1502.04666, 7 pages (POPR-Ex-2034_QC).
Francesco Cricri, Sujeet Mate, Igor D.D. Cucio, and Moncef Gabbouj, "Mobile and Interactive Social Television - A Virtual TV Room" 2009 IEEE International Symposium on a World of Wireless, Mobile and Multimedia Networks & Workshops. IEEE, 2009, 7 pages (Francesco_Cricri_Mobile_IEEE_2009).
Genius Sports' 2nd Supp. Invalidity Contentions, Ex A-01S, Dec. 9, 2024, 20 pages (GEN-Ex-A-01S_12-9-24).
Genius Sports' 2nd Supp. Invalidity Contentions, Ex A-02S, Dec. 9, 2024, 20 pages (GEN-Ex-A-02S_12-9-24).
Genius Sports' 2nd Supp. Invalidity Contentions, Ex A-03S, Dec. 9, 2024, 20 pages (GEN-Ex-A-03S_12-9-24).
Genius Sports' 2nd Supp. Invalidity Contentions, Ex A-04S, Dec. 9, 2024, 20 pages (GEN-Ex-A-04S_12-9-24).
Genius Sports' 2nd Supp. Invalidity Contentions, Ex A-05S, Dec. 9, 2024, 20 pages (GEN-Ex-A-05S_12-9-24).
Genius Sports' 2nd Supp. Invalidity Contentions, Ex A-06S, Dec. 9, 2024, 20 pages (GEN-Ex-A-06S_12-9-24).
IPR 2025-00251 and 00252 (Dec. 6, 24) Exhibit 1058, "ARINI" 37 pages (IPR2025-00251_EX_1058_37_p_12-06-2024_npl).
IPR 2025-00251 and 00252 (Dec. 6, 24) Exhibit 1059, "Sportscastr 2nd Am. Comp" 173 pages (IPR2025-00251_EX_1059_173_p) 4 parts.
James F. Kurose and Keither W. Ross, Computer Networking: A Top-Down Approach (Michale Hirsch et al. eds, 6th ed 2013), 889 pages.
Lancerica et al., MITv—A solution for an Interactive TV based on IP Multicast over Satellite, 2004 IEEE Int'l Conf. on Multimedia and Expo (ICME) (Jun. 27-30, 2004) https://ieeexplore.ieee.org/document/1394696, 4 pages (Lancerica_et_al_MITv_IEEE_2004).
Luigi Lo Iacono and Silvia Santano Guillen, Web-native, Video Live Streaming, WEB 2014: The Second International Conference on Building and Exploring Web Based Environments, Apr. 2014, 7 pages.
NerdOrDie, Going live on Twitch with OBS Studio, YOUTUBE (Apr. 15, 2016) https://www.youtube?v=aOHhxOolre&list=PLT3Ure7_kYHwj80T3AV-pZ4_r7yp6mDg-&index=13 (GS_00022420_w_transcription), document provided natively, transcript provided, 4 pages.
NerdOrDie, Scenes in OBS Studio, YOUTUBE (Apr. 13, 2015) https://www.youtube.com/watch?v=hbjQIxyLBCE&list=PLT3Ure7_

(56)　　　　　References Cited

OTHER PUBLICATIONS kYHwj80T3AV-pZ4_r7yp6mDg-&index+9 (GS_00022421_w_transcription), document provided natively, transcript provided, 14 pages.

NerdOrDie, Setting Up Twitch Account and Nightbot Before We Streem, YOUTUBE (Apr. 15, 2015) https://www.youtube.com/watch?v=789sp75dYyk&list=PLT3Ure7_kYHwj80T2AV-pZ4_r7yp6mDg-&index=12 (GS_00022419_w_transcription), document provided natively, transcript provided, 12 pages.

NerdOrDie, what Twitch Alert system Should You Use? YOUTUBE (Apr. 13, 2016) https://www.youtube.com/watch?v=SJt0NW41dOc&list=PLT3Ure7_kYHwj80T3AV-pZ4_r7yp6mDg-&index=11 (GS_00022423_w_transcription) document provided natively, transcript provided, 11 pages.

Pantos et al., "HTTP Live Streaming," ("Pantos") published Apr. 4, 2016, 33 pages (PANTOS_04-04-2016_33_pg).

Pantos, Wayback Machine Archive dated Apr. 4, 2016, 1 page (PANTOS_Wayback_Machine_04-Apr. 2026).

Petition for Inter Partes Review of U.S. Pat. No. 10,425,697 (IPR 2025-00265), filed Dec. 11, 2024, 98 pages (IPR2025-00265_Petition_12-11-2024).

Petition for Inter Partes Review of U.S. Pat. No. 10,425,697 (IPR 2025-00266), filed Dec. 11, 2024, 101 pages (IPR2025-00266_Petition_12-11-2024).

Petition for Inter Partes Review of U.S. Pat. No. 10,425,697 (IPR 2025-00313), filed Dec. 14, 2024, 95 pages (IPR2025-00313_Petition_12-14-2024).

Petition for Inter Partes Review of U.S. Pat. No. 10,425,697 (IPR 2025-00314), filed Dec. 14, 2024, 90 pages (IPR2025-00314_Petition_12-14-2024).

Petition for Inter Partes Review of U.S. Pat. No. 10,805,687 (IPR 2025-00268), filed Dec. 11, 2024, 100 pages (IPR2025-00268_Petition_12-11-2024).

Petition for Inter Partes Review of U.S. Pat. No. 10,805,687 (IPR 2025-00269), filed Dec. 11, 2024, 102 pages (IPR2025-00269_Petition_12-11-2024).

Petition for Inter Partes Review of U.S. Pat. No. 10,805,687 (IPR 2025-00315), filed Dec. 14, 2024, 95 pages (IPR2025-00315_Petition_12-14-2024).

Petition for Inter Partes Review of U.S. Pat. No. 10,805,687 (IPR 2025-00316), filed Dec. 14, 2024, 86 pages (IPR2025-00316_Petition_12-14-2024).

Petition for Inter Partes Review of U.S. Pat. No. 11,039,218 (IPR 2025-00273), filed Dec. 11, 2024, 101 pages (IPR2025-00273_Petition_12-11-2024).

Petition for Inter Partes Review of U.S. Pat. No. 11,039,218 (IPR 2025-00275), filed Dec. 11, 2024, 102 pages (IPR2025-00275_Petition_12-11-2024).

Petition for Inter Partes Review of U.S. Pat. No. 11,871,088 (IPR 2025-00251), filed Dec. 6, 2024, 106 pages (IPR2025-00251_Petition_12-11-2024).

Petition for Inter Partes Review of U.S. Pat. No. 11,871,088 (IPR 2025-00252), filed Dec. 6, 2024, (IPR2024-00252_Petition_12-6-2024) 104 pages.

Petition for Inter Partes Review of U.S. Pat. No. 11,871,088 (IPR 2025-00634), filed Feb. 24, 2025, (IPR2025-00634_Petition_2-24-2025) 102 pages.

Petition for Inter Partes Review of U.S. Pat. No. 11,871,088 (IPR 2025-00635), filed Feb. 24, 2025, (IPR2025-00635_Petition_2-24-2025) 100 pages.

Petitioner Showing of Good Cause for Parallel Petitions of U.S. Pat. No. 10,425,697 (IPR 2025-00265), filed Dec. 11, 2024, 7 pages (IPR2025-00265_Petitioner_Showing_Cause_12-11-2024).

Petitioner Showing of Good Cause for Parallel Petitions of U.S. Pat. No. 10,425,697 (IPR 2025-00266), filed Dec. 11, 2024, 7 pages(IPR2025-00266_Petitioner_Showing_Cause_12-11-2024).

Petitioner Showing of Good Cause for Parallel Petitions of U.S. Pat. No. 10,425,697 (IPR 2025-00313), filed Dec. 14, 2024, 6 pages (IPR2024-00313_Petitioner_Showing_Cause_12-14-2024).

Petitioner Showing of Good Cause for Parallel Petitions of U.S. Pat. No. 10,425,697 (IPR 2025-00314), filed Dec. 14, 2024, 6 pages (IPR2025-00314_Petitioner_Showing_Cause_12-14-2024).

Petitioner Showing of Good Cause for Parallel Petitions of U.S. Pat. No. 10,805,687 (IPR 2025-00268), filed Dec. 11, 2024, 7 pages(IPR2025-00268_Petitioner_Showing_Cause_12-11-2024).

Petitioner Showing of Good Cause for Parallel Petitions of U.S. Pat. No. 10,805,687 (IPR 2025-00269), filed Dec. 11, 2024, 7 pages(IPR2025-00269_Petitioner_Showing_Cause_12-11-2024).

Petitioner Showing of Good Cause for Parallel Petitions of U.S. Pat. No. 10,805,687 (IPR 2025-00315), filed Dec. 14, 2024, 6 pages (IPR2025-00315_Petitioner_Showing_Cause_12-14-2024).

Petitioner Showing of Good Cause for Parallel Petitions of U.S. Pat. No. 10,805,687 (IPR 2025-00316), filed Dec. 14, 2024, 6 pages (IPR2025-00316_Petitioner_Showing_Cause_12-14-2024).

Petitioner Showing of Good Cause for Parallel Petitions of U.S. Pat. No. 11,039,218 (IPR 2025-00273), filed Dec. 11, 2024, 6 pages(IPR2025-00273_Petitioner_Showing_Cause_12-11-2024).

Petitioner Showing of Good Cause for Parallel Petitions of U.S. Pat. No. 11,039,218 (IPR 2025-00275), filed Dec. 11, 2024, 6 pages(IPR2025-00275_Petitioner_Showing_Cause_12-11-2024).

Petitioner Showing of Good Cause for Parallel Petitions of U.S. Pat. No. 11,871,088 (IPR 2025-00634), filed Feb. 24, 2025, 6 pages (IPR2025-00634_Petitioner_Showing_Cause_2-24-2025).

Petitioner Showing of Good Cause for Parallel Petitions of U.S. Pat. No. 11,871,088 (IPR 2025-00635), filed Feb. 24, 2025, 6 pages (IPR2025-00635_Petitioner_Showing_Cause_2-24-2025).

Petitioners' Reasons for Parallel Petitioners and Petition Ranking, (IPR 2025-00251), filed Dec. 6, 2024, 6 pages (IPR2025-00251_Pet_Reasons_Parallel_Petitions_12-6-2024).

Petitioners' Reasons for Parallel Petitions and Petition Ranking in IPR 2025-00252, filed Dec. 6, 2024, 6 pages (IPR2025-00252_Peti_Reasons_Parallel_Petitions_12-6-2024).

Ptzoptics, Live Streaming Video Game Contest to Twitch—League of Legends, YOUTUBE (Dec. 16, 2015) https://www.youtube.com/watch?v=9bGADGoK3is (GS_00022425_w_transcription) document provided natively, transcript provided, 7 page.

Publish-Subscribe Systems, CloudAMQP, cited in Exhibit A-35 of Genius Contentions (identified in Exhibit as GS_00021220-21247) dated Dec. 19, 2024, 28 pages (CloudAMQP).

Publish-Subscribe Systems, PubNub, cited in Exhibit A-35 of Genius Contentions (identified in Exhibit as GS_00021272-GS_21539) dated Dec. 19, 2024, 261 pages (PubNub), 3 parts.

Publish-Subscribe Systems, Pusher, cited in Exhibit A-35 of Genius Contentions (identified in Exhibit as GS_00021540-GS_21722) dated Dec. 19, 2024, 183 pages (Pusher), 2 parts.

Publish-Subscribe Systems, RabbitMQ, cited in Exhibit A-35 of Genius Contentions (identified in Exhibit as GS_00021723-22229) dated Dec. 19, 2024, 262 pages (RabbitMQ), 4 parts.

Publish-Subscribe Systems, Redis, cited in Exhibit A-35 of Genius Contentions (identified in Exhibit as GS_00022291-22314) dated Dec. 19, 2024, 23 pages (Redis).

Publish-Subscribe Systems, Socket. IO, cited in Exhibit A-35 of Genius Contentions (identified in Exhibit as GS_00022315-22387) dated Dec. 19, 2024, 73 pages (SocketIO).

Publish-Subscribe Systems, ZeroMQ, cited in Exhibit A-35 of Genius Contentions (identified in Exhibit as GS_00022612-24285) dated Dec. 19, 2024, 502 pages (ZeroMQ), 9 parts.

Sportradar AG and Sportradar Group AG's Amended Invalidity Contentions in United States District Court for Eastern District of Texas, Case No. 2:23-cv-00472, served Dec. 9, 2024, 80 pages (SRAD_Am_Cont_12-6-2024), 2 parts.

Sportradar and Sportradar Group AG Amended Invalidity Contentions, Ex A-01, Dec. 9, 2024, 213 pages (SRAD_Ex-A-01_12-9-24).

Sportradar and Sportradar Group AG Amended Invalidity Contentions, Ex A-02, Dec. 9, 2024, 444 pages (SRAD_Ex-A-02_12-9-24), 8 parts.

Kinji Matsumura et al., Personalization of Broadcast Programs using Synchronized Internet Content, ICCE (2010), 2 pages (GS_00002714).

Lexsan, Twitch and Youtube Settings Guide, XENFORO (Mar. 5, 2015), 3 pages (GS_00003021).

(56) References Cited

OTHER PUBLICATIONS

Live Betting in 2009? Just a Warm up for 2010, Boolabus Blog (Jan. 2, 2010), https://web.archive.org/web/20140122054545/http://www.boolabus.com:80/2010/01/live, 4 pages (GS_00001462).

Livestream Platform Tech Specs, https://web.archive.org/web/20160530045226/http://livestream.com:80/platform/tech, 6 pages (GS_00002193).

Livestream, Livestream Broadcaster Pro User Manual (2015), 219 pages (GS_00002238).

Livestream, New Livestream, 6 pages (GS_00002807).

Livestream, Studio Live Production Switcher User Manual for Livestream Studio Version 1.1, 39 pages (GS_00002199).

Livestream, Studio Surface User Manual (2015) (GS_00002457).

Lourdes Beloqui Yuste & Hugh Melvin, Client-side Multisource Media Streams Multiplexing/or HbbTV, 2NDINT'L Conf. on Consumerelecs (2012), 5 pages (GS_00003596).

Lourdes Beloqui Yuste & Hugh Melvin, Enhanced IPTV Services Through Time Synchronisation, 14th Int'l Symp on Consumer Elecs (ISCE) (2010), 10 pages (GS_00003601).

Lourdes Beloqui Yuste et al., Effective Synchronisation of Hybrid Broadcast and Broadband Tv, Int'l Conf. on Consumer Elecs. (2012), 2 pages (GS_00003611).

M. Michalko et al., Building Video Streaming Platform for Educational Content Delivery, 331 ICETA (2014), 6 pages (GS_00002727).

Mari Smith, Facebook Live: What Marketers Need to Know, Soc. MEDIAEXAM'R (Jan. 4, 2016), https://www. socialmediaexaminer.com/facebook-live-what-marketers-need-to-know/, 19 pages (GS_00002038).

Mario Marques Da Silva, Multimedia Communications and Networking (2012), 494 pages (GS_00001504).

Mark Newman, MLB.com At Bat launches into Spring, MLB (Feb. 25, 2014), https://www/mlb.com/news/mlbcom-at-bat-launches-into-spring/c-68295956, 4 pages (GS_00002784).

Marketline, Betgenius Acquires Boolabus (2011), 1 page (GS_00001447).

Matthew Panzarino, MLB At Bat for iOS brings Live Overlay of Gameday Data onto TV Broadcasts and More, Next Web (Aug. 31, 2012), https://thenextweb.com/news/mlb-at-bat-ios-updates-ford-syn•• integration-social-sharing-highlight-videos, 3 pages (GS_00002766).

Maury Brown, MLB Approves New Digital Media Company Spin-Off That Will Create Billions in New Revenues, FORBES (Aug. 13, 2015), https://www.forbes.com/ sites/maurybrown/2015/08/13/mlb-approves-new-digital-medi••company-spin-off-that-will-create-billions-in-new-revenues/?sh=6d1ba6ce315d, 2 pages (GS_00002763).

Miroslav Michalko et al., Protected Streaming of Video Content to Mobile Devices, JSAT 1 (2014), 7 pages (GS_00002733).

Nick Wingfield, In E-Sports, Video Gamers Draw Real Crowds and Big Money, N.Y. Times (Aug. 30, 2014), https://www.nytimes.com/2014/08/31/technology/esports-explosionbring•• opportunity-riches-for-video-gamers.html, 8 pages (GS_00002148).

Nick Wingfield, Julia Child Marathon to Stream on Twitch as Gaming Site Widens Focus, N.Y. Times (Mar. 15, 2016), https://www.nytimes.com/2016/03/16/technology/julia-chil•• marathon-tostream-on-twitch-in-bet-on-prerecorded-content.html, 4 pages (GS_00002172).

Nick Wingfield, What's Twitch? Gamers Know, and Amazon Is Spending $1 Billion on It, N.Y. Times (Aug. 25, 2014), https://www.nytimes.com/2014/08/26/technology/amazo•• nears-a-dealfor-twitch.html, 4 pages (GS_00003184).

Noreen T.M., HTML5 Video Player Beta Begins Today, Twitch Blog (Jul. 14, 2016), https://blog.twitch.tv/en/2016/07/14/html5-video-player-beta-begins-today-135dlb7baa65/, 5 pages (GS_00002143).

Omar Bladonado & Paul Saab, Networking@Scale, May 2016-Recap, Eng'g Meta (May 24, 2016), https://engineering.fb.com/2016/05/24/networking-traffic/networking-scale-may- 2016-recap/?ref=highscalability.com, 13 pages (GS_00002794).

OneTwoSee Provides Licensed, White-labeled Products that Help Some of the Biggest Names in Sports Engage and Monetize Their Audiences Through any Screen, ONETWOSEE (Jul. 6, 2016), https://web.archive.org/web/20160706140110/http://onetwosee.com:80/, 4 pages (GS_00002821).

Periscope CEO on success and controversy of streaming app, https://www.youtube.com/watch?v=smXt58LrjRM, 2015, 1 page (GS_00003636).

Periscope Versus Meerkat, Bus. INSIDER (Mar. 2015), https://web.archive.org/web/20150328235030/http://www.businessinsider.com:80/periscop••-versus-meerkat-2015-03, 24 pages (GS_00002835).

Peter Stewart, the Periscope Bible (2015), 61 pages (GS_00003077).

Philly NewTech, Jan. 2015: OneTwoSee—Chris Reynolds, Jason Angelides, Jan. 22, 2015, https://www.youtube.com/watch?v=054cf8_i7JU, 1 page (GS_00003662).

Preston Smalley, Comcast Bolsters Sports Technology Team with Acquisition of OneTwoSee, COMCASTVOICES (Mar. 7, 2016), https://web.archive.org/web/20160415093127/http://corporate.comcast.com:80/comcast• voices/comcast-bolsters-sports-technology-team-with-acquisition-of-onetwosee, 4 pages (GS_00001490).

Preston Smalley, Watch a Game Like Never Before with New Baseball Extras for the XI Platform, Comcast Voices (Jun. 29, 2015), https://web.archive.org/web/20150630175059/http://corporate.comcast.com:80/comcast•voices/watch-a-game-like-never-before-with-new-baseball-extras-for-the-x 1-platform, 3 pages (GS_00003168).

Rhys Hiltner, Go's March to Low-latency GC, Twitch Blog (Jul. 5, 2016), https://blog.twitch.tv/en/2016/07/05/gos-march-to-low-latency-gc-a6fa96f06eb7/, 13 pages (GS_00002061).

Rich McCormick, Periscope Users Can Now Save Their Live-streamed Broadcasts Forever, TECHCRUNCH (May 5, 2016), https://www.theverge.com/2016/5/5/11595244/how-to-sav•• periscopes-live-streams, 2 pages (GS_00002833).

Rich McCormick, Periscope Users Can Now Save Their Live-streamed Broadcasts Forever, TECHCRUNCH (May 5, 2016), https://www.theverge.com/2016/5/5/11595244/how-to-saveperiscopes-live-streams, 1 page (GS_00002883).

Richard Nieva, Facebook Live-streaming Brings the Love and the Wow, with a Side of Sepia, CNET (Apr. 6, 2016), https://www.cnet.com/tech/mobile/facebook-live-streaming-tool-adds• filters-and-reactions/, 6 pages (GS_00002032).

Rip Empson, Baseball's Digital Trifecta and How America's Pastime is Setting the Pace for Sports Online, TECHCRUNCH (Nov. 4, 2013), https://web.archive.org/web/20131110013907/http://techcrunch.com:80/2013/11/04/baseballs-digital-trifecta-and-how-americas-pastime-is-setting-the-pace-for-sports-online/, 15 pages (GS_00001426).

Shalini Kurian, High Performing Native Chat on Twitch, Twitch Blog (Jul. 15, 2016), https://blog.twitch.tv/en/2016/07/15/high-performing-native-chat-on-twitch-79c1492eca06/, 14 pages (GS_00002074).

Skybet Go Live with the Betstream Advanced Football Module, Boolabus Blog (Oct. 12, 2015), https://web.archive.org/web/20151023033718/http://www.boolabus.com/2010/10/skybet-live-football/, 4 pages (GS_00001458).

Sportingbet in:play, Boolabus Blog (Apr. 5, 2010), https://web.archive.org/web/20151023063447/http://www.boolabus.com/2010/04/sportingbet -inplay/, 3 pages (GS_00001474).

Steve Kovach, Stream Live Baseball Games to Your iPad with MLB At Bat, Bus. INSIDER (Mar. 31, 2011), https://www.businessinsider.com/stream-live-baseball-games-with-mlb-at• bat-2011-3, 23 pages (GS_00002740).

Streaming Engine Documentation, WowzAMEDIA SYS., https://web.archive.org/web/20150311225020/http://www.wowza.com:SO/products/streaming-engine/documentation, 3 pages (GS_00003202).

Swagger—GL-Video-v3—https://exployer.api.geniussports.com/video/v3/PRODPRM/swagger.v3.1.0.json, 13 pages (GS_00000224).

Swagger—Statistics API—/swagger/v2/swagger.json, 11 pages (GS_00000213).

(56) References Cited

OTHER PUBLICATIONS

The Backbone of Periscope: Wowza Streaming Engine, WowzA BLOG (Nov. 17, 2015), https://web.archive.org/web/2017031416431/https://www.wowza.com/blog/the-backbone-of•-periscope-wowza-streaming-engine, 4 pages (GS_00002896).
The Beginner's Guide to Periscope for Bloggers, Fabulous Blogging, https://www.fabulousblogging.com/2015/08/the-beginners-guide-to-periscope-for-bloggers/, 18 pages (GS_00002900).
Twitch API Overview, Twitch Dev (2017), https://web.archive.org/web/20170325170124/https://dev.twitch.tv/docs, 4 pages (GS_00003024).
Twitch Engineering: An Introduction and Overview, Twitch Blog (Dec. 18, 2015), https://blog.twitch.tv/en/2015/12/18/twitch-engineering-an-introduction-and-overvie•• a23917b71a25/, 9 pages (GS_00003039).
Twitch Engineering: An Introduction and Overview, Twitch Blog (Dec. 18, 2015), https://blog.twitch.tv/en/2015/12/18/twitch-engineering-an-introduction-and-overviewa23917b71a25/., 6 pages (GS_00001365).
Twitch iOS 9 Multitasking Support Is Here!, Twitch Blog (Oct. 14, 2015), https://blog.twitch.tv/en/2015/10/14/twitch-ios-9-multitasking-support-is-her•• a6364debed5 f/ 5 pages (GS_00003048).
Twitch Live Annotations FAQ, Twitch Blog (Jul. 1, 2014), https://blog.twitch.tv/en/2014/07/01/twitch-live-annotations-faq-6db54fadeede/, 6 pages (GS_00003053).
Genius Sports' 2nd Supp. Invalidity Contentions, Ex A-07S, Dec. 9, 2024, 20 pages (GEN-Ex-A-07S_12-9-24).
Genius Sports' 2nd Supp. Invalidity Contentions, Ex A-08S, Dec. 9, 2024, 21 pages (GEN-Ex-A-08S_12-9-24).
Genius Sports' 2nd Supp. Invalidity Contentions, Ex A-09S, Dec. 9, 2024, 20 pages (GEN-Ex-A-09S_12-9-24).
Genius Sports' 2nd Supp. Invalidity Contentions, Ex A-10S, Dec. 9, 2024, 20 pages (GEN-Ex-A-10S_12-9-24).
Genius Sports' 2nd Supp. Invalidity Contentions, Ex A-11S, Dec. 9, 2024, 20 pages (GEN-Ex-A-11S_12-9-24).
Genius Sports' 2nd Supp. Invalidity Contentions, Ex A-12S, Dec. 9, 2024, 21 pages (GEN-Ex-A-12S_12-9-24).
Genius Sports' 2nd Supp. Invalidity Contentions, Ex A-13S, Dec. 9, 2024, 21 pages (GEN-Ex-A-13S_12-9-24).
Genius Sports' 2nd Supp. Invalidity Contentions, Ex A-14S, Dec. 9, 2024, 21 pages (GEN-Ex-A-14S_12-9-24).
Genius Sports' 2nd Supp. Invalidity Contentions, Ex A-15, Dec. 9, 2024, 57 pages (GEN-Ex-A-15_12-9-24).
Genius Sports' 2nd Supp. Invalidity Contentions, Ex A-16, Dec. 9, 2024, 61 pages (GEN-Ex-A-16_12-9-24).
Genius Sports' 2nd Supp. Invalidity Contentions, Ex A-18, Dec. 9, 2024, 58 pages (GEN-Ex-A-18_12-9-24).
Genius Sports' 2nd Supp. Invalidity Contentions, Ex A-20, Dec. 9, 2024, 54 pages (GEN-Ex-A-20_12-9-24).
Genius Sports' 2nd Supp. Invalidity Contentions, Ex A-21, Dec. 9, 2024, 55 pages (GEN-Ex-A-21_12-9-24).
Genius Sports' 2nd Supp. Invalidity Contentions, Ex A-22, Dec. 9, 2024, 52 pages (GEN-Ex-A-22_12-9-24).
Genius Sports' 2nd Supp. Invalidity Contentions, Ex A-23, Dec. 9, 2024, 54 pages (GEN-Ex-A-23_12-9-24).
Genius Sports' 2nd Supp. Invalidity Contentions, Ex A-24, Dec. 9, 2024, 53 pages (GEN-Ex-A-24_12-9-24).
Genius Sports' 2nd Supp. Invalidity Contentions, Ex A-25, Dec. 9, 2024, 63 pages (GEN-Ex-A-25_12-9-24).
Genius Sports' 2nd Supp. Invalidity Contentions, Ex A-26, Dec. 9, 2024, 57 pages (GEN-Ex-A-26_12-9-24).
Genius Sports' 2nd Supp. Invalidity Contentions, Ex A-27, Dec. 9, 2024, 59 pages (GEN-Ex-A-27_12-9-24).
Genius Sports' 2nd Supp. Invalidity Contentions, Ex A-28, Dec. 9, 2024, 58 pages (GEN-Ex-A-28_12-9-24).
Genius Sports' 2nd Supp. Invalidity Contentions, Ex A-29, Dec. 9, 2024, 55 pages (GEN-Ex-A-29_12-9-24).
Genius Sports' 2nd Supp. Invalidity Contentions, Ex A-30, Dec. 9, 2024, 68 pages (GEN-Ex-A-30_12-9-24).
Genius Sports' 2nd Supp. Invalidity Contentions, Ex A-31, Dec. 9, 2024, 55 pages (GEN-Ex-A-31_12-9-24).
Genius Sports' 2nd Supp. Invalidity Contentions, Ex A-32, Dec. 9, 2024, 53 pages (GEN-Ex-A-32_12-9-24).
Genius Sports' 2nd Supp. Invalidity Contentions, Ex A-33, Dec. 9, 2024, 59 pages (GEN-Ex-A-33_12-9-24).
Genius Sports' 2nd Supp. Invalidity Contentions, Ex A-34, Dec. 9, 2024, 54 pages (GEN-Ex-A-34_12-9-24).
Genius Sports' 2nd Supp. Invalidity Contentions, Ex A-35, Dec. 9, 2024, 55 pages (GEN-Ex-A-35_12-9-24).
Genius Sports' 2nd Supp. Invalidity Contentions, Ex B-01S, Dec. 9, 2024, 127 pages (GEN-Ex-B-01S_12-9-24).
Genius Sports' 2nd Supp. Invalidity Contentions, Ex B-02S, Dec. 9, 2024, 183 pages (GEN-Ex-B-02S_12-9-24).
Genius Sports' 2nd Supp. Invalidity Contentions, Ex B-03S, Dec. 9, 2024, 164 pages (GEN-Ex-B-03S_12-9-24).
Genius Sports' 2nd Supp. Invalidity Contentions, Ex B-04S, Dec. 9, 2024, 276 pages (GEN-Ex-B-04S_12-9-24).
Genius Sports' 2nd Supp. Invalidity Contentions, Ex B-05S, Dec. 9, 2024, 219 pages (GEN-Ex-B-05S_12-9-24).
Genius Sports' 2nd Supp. Invalidity Contentions, Ex B-06S, Dec. 9, 2024, 137 pages (GEN-Ex-B-06S_12-9-24).
Genius Sports' 2nd Supp. Invalidity Contentions, Ex B-07S, Dec. 9, 2024, 145 pages (GEN-Ex-B-07S_12-9-24).
Genius Sports' 2nd Supp. Invalidity Contentions, Ex B-08S, Dec. 9, 2024, 74 pages (GEN-Ex-B-08S_12-9-24).
Genius Sports' 2nd Supp. Invalidity Contentions, Ex B-09S, Dec. 9, 2024, 107 pages (GEN-Ex-B-09S_12-9-24).
Genius Sports' 2nd Supp. Invalidity Contentions, Ex B-10S, Dec. 9, 2024, 281 pages (GEN-Ex-B-10S_12-9-24).
Genius Sports' 2nd Supp. Invalidity Contentions, Ex B-11S, Dec. 9, 2024, 105 pages (GEN-Ex-B-11S_12-9-24).
Genius Sports' 2nd Supp. Invalidity Contentions, Ex B-12S, Dec. 9, 2024, 344 pages (GEN-Ex-B-12S_12-9-24).
Genius Sports' 2nd Supp. Invalidity Contentions, Ex B-13S, Dec. 9, 2024, 37 pages (GEN-Ex-B-13S_12-9-24).
Genius Sports' 2nd Supp. Invalidity Contentions, Ex B-14S, Dec. 9, 2024, 110 pages (GEN-Ex-B-14S_12-9-24).
Genius Sports' 2nd Supp. Invalidity Contentions, Ex B-15, Dec. 9, 2024, 122 pages (GEN-Ex-B-15_12-9-24).
Genius Sports' 2nd Supp. Invalidity Contentions, Ex B-16, Dec. 9, 2024, 224 pages (GEN-Ex-B-16_12-9-24).
Genius Sports' 2nd Supp. Invalidity Contentions, Ex B-18, Dec. 9, 2024, 203 pages (GEN-Ex-B-18_12-9-24).
Genius Sports' 2nd Supp. Invalidity Contentions, Ex B-20, Dec. 9, 2024, 84 pages (GEN-Ex-B-20_12-9-24).
Genius Sports' 2nd Supp. Invalidity Contentions, Ex B-21, Dec. 9, 2024, 82 pages (GEN-Ex-B-21_12-9-24).
Genius Sports' 2nd Supp. Invalidity Contentions, Ex B-22, Dec. 9, 2024, 84 pages (GEN-Ex-B-22_12-9-24).
Genius Sports' 2nd Supp. Invalidity Contentions, Ex B-23, Dec. 9, 2024, 81pages (GEN-Ex-B-23_12-9-24).
Genius Sports' 2nd Supp. Invalidity Contentions, Ex B-24, Dec. 9, 2024, 82 pages (GEN-Ex-B-24_12-9-24).
Genius Sports' 2nd Supp. Invalidity Contentions, Ex B-25, Dec. 9, 2024, 189 pages (GEN-Ex-B-25_12-9-24).
Sportradar Aspera, Live Streaming of Sports Content with FASPStream to International Online Platforms, 2017, assessed at https://www.ibm.com/aspera/pdfs/Sportradar_AsperaCS_2017.pdf on Feb. 24, 2023, 2 pages.
Sportradar Bookmaker SDK Deployment Guide, Jul. 3, 2014, 5 pages.
Sportradar Bookmaker SDK Developer Guide Sep. 7, 2015, accessed at https://sdk.sportradar.com/bookmaker/java/file?g=1aae9f9b-9e0b-40af-869b-380eede8806d on Feb. 17, 2023, 11 pages.
Sportradar brochure "Unified Odds Feed Integration Process" Oct. 15, 2021, accessed at https://iodocs.betradar.com/unifiedsdk/UOF_Integration_Process.pdf on Feb. 17, 2023, 14 pages.
Sportradar Drive Fan Behavior with Insights 2021 accessed at WaybackMachines https://sportradar.us/sports-media/insights/ on Apr. 14, 2021, 4 pages.

(56)  References Cited

OTHER PUBLICATIONS

Sportradar Live Streaming of Sports Content with FASPStream to International Online Platforms, 2017, accessed at https://www.ibm.com/aspera/pdfs/Sportradar_AsperaCS_2017.pdf on Feb. 16, 2023, 2 pages.
Sportradar Live-Score Setup Document Apr. 2021, 8 pages.
Sportradar Nfl V7 US Api Portal, Feb. 7, 2023, 5 pages.
Sportradar Sports Data API Dec. 23, 2022, accessed at https://sportradar.com/sports-entertainment/content/sports-data-api/?lang=en-us on Feb. 16, 2023, 3 pages.
Sportradar Streams Live Data for Australian Open Broadcasts on Aspera, Digital Media World, accessed at WayBack Machines https://www.digitalmediaworld.tv/disrupt/2375-sportradar-streams-live-data-for-australian-open-broadcases-on-aspera on May 16, 2021, (2019) 3 pages.
Sportradar Supercharge Your OTT Solution with the Power of Data, accessed at Wayback Machine https://sportradar.us/sports-media/OTT on May 13, 2020, 3 pages.
Sportradar U.S. SEC Amendment No. 2 to Registration Statement, filed Sep. 7, 2021, Registration No. 333-258882 accessed at SEC Home » Search the Next-Generation EDGAR System» CompanySearch» on Feb. 16, 2023, 336 pages.
Sports—Personalized fan-first experiences that go beyond the field. Maestro 2020. Accessed at https://info.maestro.io/sports on Apr. 21, 2021. 3 pages.
Sports Betting. Sportradar. Accessed at https://sportradar.us/betting-services/ on Apr. 21, 2021. 4 pages.
Streaming, Grab Attention With Video, Genius Sports Website, 2022, accessed Apr. 13, 2023, 4 pages.
Streaming. BetGenius Product Deck. Accessed on Dec. 3, 2020. 2 pages.
Styling Genius Live Player, GeniusSports Drop & Play Integration Guide, Nov. 28, 2022, 2 pages.
Understanding Match State, GeniusSports Wiki, Mar. 24, 2023, 2 pages.
Video Integration and Player User Guide Feb. 25, 2021, Genius Sports Wiki Website, 1 page.
Video Streaming API, GeniusSports Wiki Website, Mar. 24, 2021, 1 page.
Video Streaming Genius Sports Wiki Website, Mar. 26, 2021, 1 page.
Video-Streaming-v1, Swagger, Apr. 2019, 3 pages.
Video-V2, Swagger, Apr. 2019, 4 pages.
Virtuals, GeniusSports Drop & Play Integration Guide, Nov. 28, 2022, 1 page.
Wallstreet, John, Genius Sports-Caesars NFL Betting Live Stream Validates Vision, Dec. 21, 2022, Sportico, 4 pages.
Warehouse—Read Stream API Documentation—American Football!, GeniusSports Developer Centre Website, May 12, 2021, 14 pages.
Warehouse—Read Stream API Documentation—Basketball, GeniusSports Developer Centre Website, Jul. 30, 2017, 27 pages.
Washington, Betgenius launches live streaming service for sportsbooks. Genius Sports Oct. 8, 2019. Accessed at https://news.geniussports.com/betgenius-launches-live-streaming-service-for-sportsbooks/ on Apr. 30, 2021. 6 pages.
Sportradar Group AG and Sportradar AG's Invalidity Contentions Exhibit A-24, May 6, 2024, Case No. 2:23-cv-00472-JRG, *Sportscastr Inc. (dba Panda Interactive)* v. *Sportradar Group AG and Sportradar AG*, 200 pages (SRAD-EX- A-24-AppleHLS).
Sportradar Group AG and Sportradar AG's Invalidity Contentions Exhibit A-25, May 6, 2024, Case No. 2:23-cv-00472-JRG, *Sportscastr Inc. (dba Panda Interactive)* v. *Sportradar Group AG and Sportradar AG*, 331 pages (SRAD-EX- A-25-Betstream).
Sportradar Group AG and Sportradar AG's Invalidity Contentions Exhibit A-26, May 6, 2024, Case No. 2:23-cv-00472-JRG, *Sportscastr Inc. (dba Panda Interactive)* v. *Sportradar Group AG and Sportradar AG*, 79 pages (SRAD-EX-A-26- FacebookLive).
Sportradar Group AG and Sportradar AG's Invalidity Contentions Exhibit A-27, May 6, 2024, Case No. 2:23-cv-00472-JRG, *Sportscastr*
*Inc. (dba Panda Interactive)* v. *Sportradar Group AG and Sportradar AG*, 90 pages (SRAD-EX-A-27- MLBAtBat).
Sportradar Group AG and Sportradar AG's Invalidity Contentions Exhibit A-28, May 6, 2024, Case No. 2:23-cv-00472-JRG, *Sportscastr Inc. (dba Panda Interactive)* v. *Sportradar Group AG and Sportradar AG*, 78 pages (SRAD-EX-A-28- OneTwoSee).
Sportradar Group AG and Sportradar AG's Invalidity Contentions Exhibit B-01, May 6, 2024, Case No. 2:23-cv-00472-JRG, *Sportscastr Inc. (dba Panda Interactive)* v. *Sportradar Group AG and Sportradar AG*, 158 pages (SRAD-EX- B-01-Lu).
Sportradar Group AG and Sportradar AG's Invalidity Contentions Exhibit B-02, May 6, 2024, Case No. 2:23-cv-00472-JRG, *Sportscastr Inc. (dba Panda Interactive)* v. *Sportradar Group AG and Sportradar AG*, 302 pages (SRAD-EX- B-02-Dukes).
Sportradar Group AG and Sportradar AG's Invalidity Contentions Exhibit B-03, May 6, 2024, Case No. 2:23-cv-00472-JRG, *Sportscastr Inc. (dba Panda Interactive)* v. *Sportradar Group AG and Sportradar AG*, 143 pages (SRAD-EX- B-03-Mandyam).
Sportradar Group AG and Sportradar AG's Invalidity Contentions Exhibit B-04, May 6, 2024, Case No. 2:23-cv-00472-JRG, *Sportscastr Inc. (dba Panda Interactive)* v. *Sportradar Group AG and Sportradar AG*, 168 pages (SRAD-EX- B-04-Cromarty).
Sportradar Group AG and Sportradar AG's Invalidity Contentions Exhibit B-05, May 6, 2024, Case No. 2:23-cv-00472-JRG, *Sportscastr Inc. (dba Panda Interactive)* v. *Sportradar Group AG and Sportradar AG*, 171 pages (SRAD-EX- B-05-Cooper).
Sportradar Group AG and Sportradar AG's Invalidity Contentions Exhibit B-06, May 6, 2024, Case No. 2:23-cv-00472-JRG, *Sportscastr Inc. (dba Panda Interactive)* v. *Sportradar Group AG and Sportradar AG*, 190 pages (SRAD-EX- B-06-Basso).
Sportradar Group AG and Sportradar AG's Invalidity Contentions Exhibit B-07, May 6, 2024, Case No. 2:23-cv-00472-JRG, *Sportscastr Inc. (dba Panda Interactive)* v. *Sportradar Group AG and Sportradar AG*, 166 pages (SRAD-EX- B-07-Sullivan).
Sportradar Group AG and Sportradar AG's Invalidity Contentions Exhibit B-08, May 6, 2024, Case No. 2:23-cv-00472-JRG, *Sportscastr Inc. (dba Panda Interactive)* v. *Sportradar Group AG and Sportradar AG*, 93 pages (SRAD-EX-B-08- Bota).
Sportradar Group AG and Sportradar AG's Invalidity Contentions Exhibit B-09, May 6, 2024, Case No. 2:23-cv-00472-JRG, *Sportscastr Inc. (dba Panda Interactive)* v. *Sportradar Group AG and Sportradar AG*, 56 pages (SRAD-EX-B-09- Dengler).
Sportradar Group AG and Sportradar AG's Invalidity Contentions Exhibit B-10, May 6, 2024, Case No. 2:23-cv-00472-JRG, *Sportscastr Inc. (dba Panda Interactive)* v. *Sportradar Group AG and Sportradar AG*, 73 pages (SRAD-EX-B-10-Ma).
Sportradar Group AG and Sportradar AG's Invalidity Contentions Exhibit B-11, May 6, 2024, Case No. 2:23-cv-00472-JRG, *Sportscastr Inc. (dba Panda Interactive)* v. *Sportradar Group AG and Sportradar AG*, 56 pages (SRAD-EX-B-11-Mukherjee).
Sportradar Group AG and Sportradar AG's Invalidity Contentions Exhibit B-12, May 6, 2024, Case No. 2:23-cv-00472-JRG, *Sportscastr Inc. (dba Panda Interactive)* v. *Sportradar Group AG and Sportradar AG*, 127 pages (SRAD-EX-B-12-Ellis).
Sportradar Group AG and Sportradar AG's Invalidity Contentions Exhibit B-13, May 6, 2024, Case No. 2:23-cv-00472-JRG, *Sportscastr Inc. (dba Panda Interactive)* v. *Sportradar Group AG and Sportradar AG*, 219 pages (SRAD-EX-B-13-Herzog).
Sportradar Group AG and Sportradar AG's Invalidity Contentions Exhibit B-14, May 6, 2024, Case No. 2:23-cv-00472-JRG, *Sportscastr Inc. (dba Panda Interactive)* v. *Sportradar Group AG and Sportradar AG*, 222 pages (SRAD-EX-B-14-Mitic).
Sportradar Group AG and Sportradar AG's Invalidity Contentions Exhibit B-15, May 6, 2024, Case No. 2:23-cv-00472-JRG, *Sportscastr Inc. (dba Panda Interactive)* v. *Sportradar Group AG and Sportradar AG*, 107 pages (SRAD-EX-B-15-Spivey).
Sportradar Group AG and Sportradar AG's Invalidity Contentions Exhibit B-16, May 6, 2024, Case No. 2:23-cv-00472-JRG, *Sportscastr Inc. (dba Panda Interactive)* v. *Sportradar Group AG and Sportradar AG*, 692 pages (SRAD-EX-B-16-Levinson).
Sportradar Group AG and Sportradar AG's Invalidity Contentions Exhibit B-17, May 6, 2024, Case No. 2:23-cv-00472-JRG, *Sportscastr*

(56) References Cited

OTHER PUBLICATIONS

*Inc. (dba Panda Interactive)* v. *Sportradar Group AG and Sportradar AG*, 284 pages (SRAD-EX-B-17-Park).

Sportradar Group AG and Sportradar AG's Invalidity Contentions Exhibit B-18, May 6, 2024, Case No. 2:23-cv-00472-JRG, *Sportscastr Inc. (dba Panda Interactive)* v. *Sportradar Group AG and Sportradar AG*, 193 pages (SRAD-EX-B-18-Abulikemu).

Sportradar Group AG and Sportradar AG's Invalidity Contentions Exhibit B-20, May 6, 2024, Case No. 2:23-cv-00472-JRG, *Sportscastr Inc. (dba Panda Interactive)* v. *Sportradar Group AG and Sportradar AG*, 158 pages (SRAD-EX-B-20-Kaazing).

Sportradar Group AG and Sportradar AG's Invalidity Contentions Exhibit B-21, May 6, 2024, Case No. 2:23-cv-00472-JRG, *Sportscastr Inc. (dba Panda Interactive)* v. *Sportradar Group AG and Sportradar AG*, 244 pages (SRAD-EX-B-21-WebRTC).

Sportradar Group AG and Sportradar AG's Invalidity Contentions Exhibit B-22, May 6, 2024, Case No. 2:23-cv-00472-JRG, *Sportscastr Inc. (dba Panda Interactive)* v. *Sportradar Group AG and Sportradar AG*, 288 pages (SRAD-EX-B-22-RTP).

Sportradar Group AG and Sportradar AG's Invalidity Contentions Exhibit B-23, May 6, 2024, Case No. 2:23-cv-00472-JRG, *Sportscastr Inc. (dba Panda Interactive)* v. *Sportradar Group AG and Sportradar AG*, 190 pages (SRAD-EX-B-23-WebSocket).

Sportradar Group AG and Sportradar AG's Invalidity Contentions Exhibit B-24, May 6, 2024, Case No. 2:23-cv-00472-JRG, *Sportscastr Inc. (dba Panda Interactive)* v. *Sportradar Group AG and Sportradar AG*, 201 pages (SRAD-EX-B-24-AppleHLS).

Sportradar Group AG and Sportradar AG's Invalidity Contentions Exhibit B-25, May 6, 2024, Case No. 2:23-cv-00472-JRG, *Sportscastr Inc. (dba Panda Interactive)* v. *Sportradar Group AG and Sportradar AG*, 302 pages (SRAD-EX-B-25-Betstream).

Sportradar Group AG and Sportradar AG's Invalidity Contentions Exhibit B-26, May 6, 2024, Case No. 2:23-cv-00472-JRG, *Sportscastr Inc. (dba Panda Interactive)* v. *Sportradar Group AG and Sportradar AG*, 78 pages (SRAD-EX-B-26-FacebookLive).

Sportradar Group AG and Sportradar AG's Invalidity Contentions Exhibit B-27, May 6, 2024, Case No. 2:23-cv-00472-JRG, *Sportscastr Inc. (dba Panda Interactive)* v. *Sportradar Group AG and Sportradar AG*, 90 pages (SRAD-EX-B-27-MLBAtBat).

Sportradar Group AG and Sportradar AG's Invalidity Contentions Exhibit B-28, May 6, 2024, Case No. 2:23-cv-00472-JRG, *Sportscastr Inc. (dba Panda Interactive)* v. *Sportradar Group AG and Sportradar AG*, 78 pages (SRAD-EX-B-28-OneTwoSee).

Sportradar Group AG and Sportradar AG's Invalidity Contentions Exhibit C-01, May 6, 2024, Case No. 2:23-cv-00472-JRG, *Sportscastr Inc. (dba Panda Interactive)* v. *Sportradar Group AG and Sportradar AG*, 126 pages (SRAD-EX-C-01-Lu).

Sportradar Group AG and Sportradar AG's Invalidity Contentions Exhibit C-02, May 6, 2024, Case No. 2:23-cv-00472-JRG, *Sportscastr Inc. (dba Panda Interactive)* v. *Sportradar Group AG and Sportradar AG*, 264 pages (SRAD-EX-C-02-Dukes).

Sportradar Group AG and Sportradar AG's Invalidity Contentions Exhibit C-03, May 6, 2024, Case No. 2:23-cv-00472-JRG, *Sportscastr Inc. (dba Panda Interactive)* v. *Sportradar Group AG and Sportradar AG*, 111 pages (SRAD-EX-C-03-Mandyam).

Sportradar Group AG and Sportradar AG's Invalidity Contentions Exhibit C-04, May 6, 2024, Case No. 2:23-cv-00472-JRG, *Sportscastr Inc. (dba Panda Interactive)* v. *Sportradar Group AG and Sportradar AG*, 133 pages (SRAD-EX-C-04-Cromarty).

Sportradar Group AG and Sportradar AG's Invalidity Contentions Exhibit C-05, May 6, 2024, Case No. 2:23-cv-00472-JRG, *Sportscastr Inc. (dba Panda Interactive)* v. *Sportradar Group AG and Sportradar AG*, 96 pages (SRAD-EX-C-05-Cooper).

Sportradar Group AG and Sportradar AG's Invalidity Contentions Exhibit C-06, May 6, 2024, Case No. 2:23-cv-00472-JRG, *Sportscastr Inc. (dba Panda Interactive)* v. *Sportradar Group AG and Sportradar AG*, 161 pages (SRAD-EX-C-06-Basso).

Sportradar Group AG and Sportradar AG's Invalidity Contentions Exhibit C-07, May 6, 2024, Case No. 2:23-cv-00472-JRG, *Sportscastr Inc. (dba Panda Interactive)* v. *Sportradar Group AG and Sportradar AG*, 138 pages (SRAD-EX-C-07-Sullivan).

Sportradar Group AG and Sportradar AG's Invalidity Contentions Exhibit C-08, May 6, 2024, Case No. 2:23-cv-00472-JRG, *Sportscastr Inc. (dba Panda Interactive)* v. *Sportradar Group AG and Sportradar AG*, 97 pages (SRAD-EX-C-08-Bota).

Sportradar Group AG and Sportradar AG's Invalidity Contentions Exhibit C-09, May 6, 2024, Case No. 2:23-cv-00472-JRG, *Sportscastr Inc. (dba Panda Interactive)* v. *Sportradar Group AG and Sportradar AG*, 72 pages (SRAD-EX-C-09-Dengler).

Sportradar Group AG and Sportradar AG's Invalidity Contentions Exhibit C-10, May 6, 2024, Case No. 2:23-cv-00472-JRG, *Sportscastr Inc. (dba Panda Interactive)* v. *Sportradar Group AG and Sportradar AG*, 85 pages (SRAD-EX-C-10-Ma).

Sportradar Group AG and Sportradar AG's Invalidity Contentions Exhibit C-11, May 6, 2024, Case No. 2:23-cv-00472-JRG, *Sportscastr Inc. (dba Panda Interactive)* v. *Sportradar Group AG and Sportradar AG*, 59 pages (SRAD-EX-C-11-Mukherjee).

Sportradar Group AG and Sportradar AG's Invalidity Contentions Exhibit C-12, May 6, 2024, Case No. 2:23-cv-00472-JRG, *Sportscastr Inc. (dba Panda Interactive)* v. *Sportradar Group AG and Sportradar AG*, 87 pages (SRAD-EX-C-12-Ellis).

Sportradar Group AG and Sportradar AG's Invalidity Contentions Exhibit C-13, May 6, 2024, Case No. 2:23-cv-00472-JRG, *Sportscastr Inc. (dba Panda Interactive)* v. *Sportradar Group AG and Sportradar AG*, 125 pages (SRAD-EX-C-13-Herzog).

Sportradar Group AG and Sportradar AG's Invalidity Contentions Exhibit C-14, May 6, 2024, Case No. 2:23-cv-00472-JRG, *Sportscastr Inc. (dba Panda Interactive)* v. *Sportradar Group AG and Sportradar AG*, 275 pages (SRAD-EX-C-14-Mitic).

Sportradar Group AG and Sportradar AG's Invalidity Contentions Exhibit C-15, May 6, 2024, Case No. 2:23-cv-00472-JRG, *Sportscastr Inc. (dba Panda Interactive)* v. *Sportradar Group AG and Sportradar AG*, 109 pages (SRAD-EX-C-15-Spivey).

Sportradar Group AG and Sportradar AG's Invalidity Contentions Exhibit C-16, May 6, 2024, Case No. 2:23-cv-00472-JRG, *Sportscastr Inc. (dba Panda Interactive)* v. *Sportradar Group AG and Sportradar AG*, 504 pages (SRAD-EX-C-16-Levinson).

Sportradar Group AG and Sportradar AG's Invalidity Contentions Exhibit C-17, May 6, 2024, Case No. 2:23-cv-00472-JRG, *Sportscastr Inc. (dba Panda Interactive)* v. *Sportradar Group AG and Sportradar AG*, 213 pages (SRAD-EX-C-17-Park).

Sportradar Group AG and Sportradar AG's Invalidity Contentions Exhibit C-18, May 6, 2024, Case No. 2:23-cv-00472-JRG, *Sportscastr Inc. (dba Panda Interactive)* v. *Sportradar Group AG and Sportradar AG*, 147 pages (SRAD-EX-C-18-Abulikemu).

Sportradar and Sportradar Group AG Amended Invalidity Contentions, Ex A-03, Dec. 9, 2024, 600 pages (SRAD_Ex-A-03_12-9-24), 7 parts.

Sportradar and Sportradar Group AG Amended Invalidity Contentions, Ex A-04, Dec. 9, 2024, 309 pages (SRAD_Ex-A-04_12-9-24), 5 parts.

Sportradar and Sportradar Group AG Amended Invalidity Contentions, Ex A-05, Dec. 9, 2024, 372 pages (SRAD_Ex-A-05_12-9-24), 8 parts.

Sportradar and Sportradar Group AG Amended Invalidity Contentions, Ex A-06, Dec. 9, 2024, 330 pages (SRAD_Ex-A-06_12-9-24), 6 parts.

Sportradar and Sportradar Group AG Amended Invalidity Contentions, Ex A-07, Dec. 9, 2024, 309 pages (SRAD_Ex-A-07_12-9-24), 6 parts.

Sportradar and Sportradar Group AG Amended Invalidity Contentions, Ex A-08, Dec. 9, 2024, 148 pages (SRAD_Ex-A-08_12-9-24), 3 parts.

Sportradar and Sportradar Group AG Amended Invalidity Contentions, Ex A-09, Dec. 9, 2024, 111 pages (SRAD_Ex-A-09_12-9-24), 2 parts.

Sportradar and Sportradar Group AG Amended Invalidity Contentions, Ex A-10, Dec. 9, 2024, 128 pages (SRAD_Ex-A-10_12-9-24), 3 parts.

Sportradar and Sportradar Group AG Amended Invalidity Contentions, Ex A-11, Dec. 9, 2024, 202 pages (SRAD_Ex-A-11_12-9-24), 3 parts.

(56) References Cited

OTHER PUBLICATIONS

Sportradar and Sportradar Group AG Amended Invalidity Contentions, Ex A-12, Dec. 9, 2024, 312 pages (SRAD_Ex-A-12_12-9-24), 5 parts.
Sportradar and Sportradar Group AG Amended Invalidity Contentions, Ex A-13, Dec. 9, 2024, 282 pages (SRAD_Ex-A-13_12-9-24), 5 parts.
Sportradar and Sportradar Group AG Amended Invalidity Contentions, Ex A-14, Dec. 9, 2024, 323 pages (SRAD_Ex-A-14_12-9-24), 5 parts.
Sportradar and Sportradar Group AG Amended Invalidity Contentions, Ex A-15, Dec. 9, 2024, 197 pages (SRAD_Ex-A-15_12-9-24), 3 parts.
Sportradar and Sportradar Group AG Amended Invalidity Contentions, Ex A-16, Dec. 9, 2024, 978 pages (SRAD_Ex-A-16_12-9-24), 21 parts.
Sportradar and Sportradar Group AG Amended Invalidity Contentions, Ex A-17, Dec. 9, 2024, 567 pages (SRAD_Ex-A-17_12-9-24), 10 parts.
Sportradar and Sportradar Group AG Amended Invalidity Contentions, Ex A-18, Dec. 9, 2024, 320 pages (SRAD_Ex-A-18_12-9-24), 5 parts.
Sportradar and Sportradar Group AG Amended Invalidity Contentions, Ex A-20, Dec. 9, 2024, 265 pages (SRAD_Ex-A-20_12-9-24), 4 parts.
Sportradar and Sportradar Group AG Amended Invalidity Contentions, Ex A-21, Dec. 9, 2024, 429 pages (SRAD_Ex-A-21_12-9-24), 5 parts.
Sportradar and Sportradar Group AG Amended Invalidity Contentions, Ex A-22, Dec. 9, 2024, 690 pages (SRAD_Ex-A-22_12-9-24), 11 parts.
Sportradar and Sportradar Group AG Amended Invalidity Contentions, Ex A-23, Dec. 9, 2024, 326 pages (SRAD_Ex-A-23_12-9-24), 4 parts.
Sportradar and Sportradar Group AG Amended Invalidity Contentions, Ex A-24, Dec. 9, 2024, 490 pages (SRAD_Ex-A-24_12-9-24), 4 parts.
Sportradar and Sportradar Group AG Amended Invalidity Contentions, Ex A-25, Dec. 9, 2024, 614 pages (SRAD_Ex-A-25_12-9-24), 7 parts.
Sportradar and Sportradar Group AG Amended Invalidity Contentions, Ex A-26, Dec. 9, 2024, 265 pages (SRAD_Ex-A-26_12-9-24), 3 parts.
Sportradar and Sportradar Group AG Amended Invalidity Contentions, Ex A-27, Dec. 9, 2024, 175 pages (SRAD_Ex-A-27_12-9-24), 3 parts.
Sportradar and Sportradar Group AG Amended Invalidity Contentions, Ex A-28, Dec. 9, 2024, 268 pages (SRAD_Ex-A-28_12-9-24), 2 parts.
Sportradar and Sportradar Group AG Amended Invalidity Contentions, Ex A-30, Dec. 9, 2024, 639 pages (SRAD_Ex-A-30_12-9-24), 6 parts.
Sportradar and Sportradar Group AG Amended Invalidity Contentions, Ex A-31, Dec. 9, 2024, 443 pages (SRAD_Ex-A-31_12-9-24), 4 parts.
Sportradar and Sportradar Group AG Amended Invalidity Contentions, Ex A-32, Dec. 9, 2024, 269 pages (SRAD_Ex-A-32_12-9-24), 4 parts.
Sportradar and Sportradar Group AG Amended Invalidity Contentions, Ex A-33, Dec. 9, 2024, 335 pages (SRAD_Ex-A-33_12-9-24), 5 parts.
Sportradar and Sportradar Group AG Amended Invalidity Contentions, Ex A-34, Dec. 9, 2024, 381 pages (SRAD_Ex-A-34_12-9-24), 5 parts.
Sportradar and Sportradar Group AG Amended Invalidity Contentions, Ex A-35, Dec. 9, 2024, 369 pages (SRAD_Ex-A-35_12-9-24), 5 parts.
Sportradar and Sportradar Group AG Amended Invalidity Contentions, Ex A-36, Dec. 9, 2024, 119 pages (SRAD_Ex-A-36_12-9-24), 2 parts.

Sportradar and Sportradar Group AG Amended Invalidity Contentions, Ex A-37, Dec. 9, 2024, 400 pages (SRAD_Ex-A-37_12-9-24), 3 parts.
Sportradar and Sportradar Group AG Amended Invalidity Contentions, Ex A-38, Dec. 9, 2024, 15 pages (SRAD_Ex-A-38_12-9-24).
Sportradar and Sportradar Group AG Amended Invalidity Contentions, Ex A-39, Dec. 9, 2024, 31 pages (SRAD_Ex-A-39_12-9-24).
Sportradar and Sportradar Group AG Amended Invalidity Contentions, Ex A-40, Dec. 9, 2024, 29 pages (SRAD_Ex-A-40_12-9-24).
Sportradar and Sportradar Group AG Amended Invalidity Contentions, Ex B-01, Dec. 9, 2024, 211 pages (SRAD_Ex-B-01_12-9-24), 4 parts.
Sportradar and Sportradar Group AG Amended Invalidity Contentions, Ex B-02, Dec. 9, 2024, 440 pages (SRAD_Ex-B-02_12-9-24), 7 parts.
Sportradar and Sportradar Group AG Amended Invalidity Contentions, Ex B-03, Dec. 9, 2024, 569 pages (SRAD_Ex-B-03_12-9-24), 7 parts.
Sportradar and Sportradar Group AG Amended Invalidity Contentions, Ex B-04, Dec. 9, 2024, 305 pages (SRAD_Ex-B-04_12-9-24), 5 parts.
Sportradar and Sportradar Group AG Amended Invalidity Contentions, Ex B-05, Dec. 9, 2024, 369 pages (SRAD_Ex-B-05_12-9-24), 8 parts.
Sportradar and Sportradar Group AG Amended Invalidity Contentions, Ex B-06, Dec. 9, 2024, 332 pages (SRAD_Ex-B-06_12-9-24), 6 parts.
Sportradar and Sportradar Group AG Amended Invalidity Contentions, Ex B-07, Dec. 9, 2024, 305 pages (SRAD_Ex-B-07_12-9-24), 5 parts.
Sportradar and Sportradar Group AG Amended Invalidity Contentions, Ex B-08, Dec. 9, 2024, 145 pages (SRAD_Ex-B-08_12-9-24), 3 parts.
Sportradar and Sportradar Group AG Amended Invalidity Contentions, Ex B-09, Dec. 9, 2024, 108 pages (SRAD_Ex-B-09_12-9-24), 2 parts.
Sportradar and Sportradar Group AG Amended Invalidity Contentions, Ex B-10, Dec. 9, 2024, 125 pages (SRAD_Ex-B-10_12-9-24), 3 parts.
Sportradar and Sportradar Group AG Amended Invalidity Contentions, Ex B-11, Dec. 9, 2024, 189 pages (SRAD_Ex-B-11_12-9-24), 3 parts.
Sportradar and Sportradar Group AG Amended Invalidity Contentions, Ex B-12, Dec. 9, 2024, 308 pages (SRAD_Ex-B-12_12-9-24), 5 parts.
Sportradar and Sportradar Group AG Amended Invalidity Contentions, Ex B-13, Dec. 9, 2024, 281 pages (SRAD_Ex-B-13_12-9-24), 5 parts.
Sportradar and Sportradar Group AG Amended Invalidity Contentions, Ex B-14, Dec. 9, 2024, 412 pages (SRAD_Ex-B-14_12-9-24), 6 parts.
5 Reasons Why Periscope Is Winning The Live-Streaming Battle, SETUP (Apr. 14, 2015), setup.US/blog/2015/4/14/5-reasons-why-periscope-is-winning-the-live-streaming-battle, 6 pages (GS_00001371).
Adrien Danjou, How is the Sporting World Using Periscope Nowadays?, Snack Media (Apr. 2016), https://www.snack-media.com/2016/04/how-is-the-sporting-world-usin ·· periscope-nowadays/, 4 pages (GS_00002099).
Apple Inc. http Live Streaming Overview (2016), 31 pages(GS_00001382).
Apple Inc. Timed Metadata for http Live Streaming (2011), 8 pages, (GS_00001413).
Arjen Veenhuizen & Ray van Brandenburg, Frame accurate media synchronization of heterogeneous media sources in an HBB context, Media Synchronization Workshop (2012), 7 pages (GS_00003157).
Bbright, Periscope: First Look at Twitter's Live-Stream App, Mar. 26, 2015, https://www.youtube.com/watch?v=6mp4RkxvE0g, 1 page (GS_00003646).
Betgenius Acquire Boolabus, BOOLABUSBLOG (Sep. 9, 2011), https://web.archive.org/web/20150504045439/http://www.boolabus.com:80/blog/, 10 pages (GS_00001448).

(56)　　　　　References Cited

OTHER PUBLICATIONS

Betstream Product Review in August Edition of "Egaming Review,"Boolabus Blog (Oct. 23, 2015), https://web.archive.org/web/20151023082029/http://www.boolabus.com:80/portfolio/, 4 pages (GS_00001466).
BOOM More Transcode Servers., Twitch Blog (Jul. 8, 2015), https://blog.twitch.tv/en/2015/07/08/boom-more-transcode-servers-427bcbfb519/, 5 pages (GS_00001477).
Brian MacSweeney, Jan. 5, 2015, Skybet Live Betting App, It's Half Time, https://www.youtube.com/watch?v=RYX4YspfYYM, 1 page (GS_00000241).
Brian MacSweeney, Boolabus Betstream Snooker App, Apr. 22, 2011, https://www.youtube.com/watch?v=4Za2RhUC5sk, 1 page (GS_00000245).
Brian MacSweeney, Boolabus Betstream, Betinplay football, Jan. 2, 2010, https://www.youtube.com/watch?v=1Shj1IR6W94, 1 page (GS_00000243).
Brian MacSweeney, Skybet Live Betting App from Boolabus, Oct. 6, 2010, https://www.youtube.com/watch?v=E-LZ67zuPVY, 1 page (GS_00000251).
Brian MacSweeney, Totesport Betstream live betting from Boolabus, Jun. 13, 2010, https://www.youtube.com/watch?v=UXJL9TNS_Hs, 1 page (GS_00000253).
Brian MacSweeney, Totesport live betting marketing applications, Jun. 22, 2010, https://www.youtube.com/watch?v=Xs9sB-S0lul, 1 page (GS_00000255).
Brian MacSweeney, Unibet Live Betting, Jan. 15, 2009, https://www.youtube.com/watch?v=kwnELhB2a30, 1 page (GS_00000249).
Brian MacSweeney, www.Betstream.com—Sportingbet Live Betting Application, YouTube, Dec. 6, 2008, https:///www.youtube.com/watch?tv+E-LZ67zuPVY, 1 page (GS_00000247).
Brian Petrocelli, Attention Broadcasters: Channel Feed Beta is Now Available, Twitch Blog (Mar. 28, 2016), https://blog.twitch.tv/en/2016/03/28/attention-broadcasters-channe••feed-beta-is-now-available-28f7c3dff995/, 5 pages (GS_00001421).
Brian Petrocelli, Channel Feed: Now with Comments!, Twitch Blog (Jul. 11, 2016), https://blog.twitch.tv/en/2016/07/11/channel-feed-now-with-comments-b7a0bc18e806/, 4 pages (GS_00001486).
Building a Better Twitch—Updating to https, Twitch Blog (Mar. 9, 2016), https://blog.twitch.tv/en/2016/03/09/building-a-better-twitch-updating-to-https• cf06c7a02c3a/, 4 pages (GS_00001482).
Caleb Wojcik, Meerkat vs. Periscope Video Demo + How to Use Them, Mar. 31, 2015, https://www.youtube.com/watch?v=PmkSad2udWI, 1 page (GS_00003666).
Carlos R. Morales et al., Development of a Multi-Platform High Performance Computing Streaming Video Distribution Cluster, AM. Soc'y for Eng'g Educ. (2013), 6 pages (GS_00002788).
Carrie Halperin, Times Minute, A (Very) Basic Twitch User's Guide, Aug. 26, 2014, https://www.youtube.com/watch?v=uVAu3PYasuY, 1 page (GS_00003638).
Cbrit07, Livestream.com Tutorial, Dec. 7, 2009, https://www.youtube.com/watch?v=0zsYG7gXBVk, 1 page (GS_00003648).
Chris Ducker, 4 Reasons Why Periscope is a HUGE Game Changer, Jul. 21, 2015, https://www.youtube.com/watch?v=IK_kmlY0Wrc, 1 page (GS_00003661).
CNN Business, First look at Periscope—the app that could kill Meerkat, Mar. 26, 2015, https://www.youtube.com/watch?v=wS6Lk_mf3eE, 1 page (GS_00003669).
Cong Zhang & Jiangchuan Liu, On Crowdsourced Interactive Live Streaming: A Twitch.TV• Based Measurement Study, 25rn ACM Workshop on Network and Operating Sys. Support for Digital Audio & Video 55 (2015), 6 pages (GS_00001359).
Cong Zhang & Jiangchuan Liu, On Crowdsourced Interactive Live Streaming: A Twitch.TVBased Measurement Study, 25th ACM Workshop on Network and Operating Sys. Support for Digital Audio & Video 55 (2015), arXiv preprint arXiv1502.04666v2, 2015, 7 pages (GS_00003613).

Davelocity, New vs. Old Livestream.com, Apr. 19, 2012, https://www.youtube.com/watch?v=JTLpjD_0YX8, 1 page (GS_00003656).
David Carr, Amazon Bets on Content in Deal for Twitch, N.Y. Times (Aug. 31, 2014), ttps://www.nytimes.com/2014/09/01/business/media/amazons-bet-on-content-in-a-hub-for•-gamers.html, 5 pages (GS_00001377).
David Pierce, Twitter's Periscope App Lets You Livestream Your World, WIRED (Mar. 26, 2015), https://www.wired.com/2015/03/periscope/, 16 pages (GS_00003061).
Douglas Soo, Twitch Engineering: An Introduction and Overview, Twitch Eng'g (Jan. 19, 2016), 11 pages (GS_00003028).
Embed Scoreboard User Guide, Live Score App, https://web.archive.org/web/20150926085347/http://www.live-scopr •• app.com:80/userguide/embed-scoreboard, 6 pages (GS_00003144).
ExpatLive. TV, Honest Review of LiveStream HD550, Mevo Cameras and Livestream.com (Pt. 1), Feb. 15, 2017, https://www.youtube.com/watch?v=oCikHKLmDsg, 1 page (GS_00003665).
Fidji Simo, Introducing New Ways to Create, Share and Discover Live Video on Facebook, Facebook Watch (Dec. 8, 2016), 13 pages (GS_00002156).
From NHL GameCenter to NHL.TV—A Look at MLBAM's Relaunch of NHL Digital Properties, SPORTS Bus. J. (Feb. 26, 2016), https://www.sportsbusinessjoumal.com/Daily/Issues/2016/02/26/Technology/from-nhl• gamecenter-to-nhl-tv- a-look-at-mlbams-relaunch-of-nhl-digital-pr%E2%80%A6, 3 pages (GS_00002058).
Genius Sports LTD's Answer to Complaint filed Jan. 26, 2024, in U.S. District Court, Eastern Division of Texas Marshall Division, Case No. 2:23-cv-00471-JRG, *Sportscastr Inc. (dba Panda Interactive)* v. *Genius Sports LTD*, 54 pages (Answer_to_Complaint_01-26-2024_npl).
Genius Sports LTD's Initial Invalidity and Subject-Matter Eligibility Contentions served on Mar. 14, 2024, in U.S. District Court, Eastern Division of Texas Marshall Division, Case No. 2:23-cv-00471-JRG, *Sportscastr Inc. (dba Panda Interactive)* v. *Genius Sports LTD*, 42 pages (Genius_Invalidity_Contentions_03-14-2024_npl).
Genius Sports LTD's Initial Invalidity and Subject-Matter Eligibility Contentions Exhibit A-01, Mar. 14, 2024, Case No. 2:23-cv-00471-JRG, *Sportscastr Inc. (dba Panda Interactive)* v. *Genius Sports LTD*, 227 pages (Ex_A-01_npl).
Genius Sports LTD's Initial Invalidity and Subject-Matter Eligibility Contentions Exhibit A-02, Mar. 14, 2024, Case No. 2:23-cv-00471-JRG, *Sportscastr Inc. (dba Panda Interactive)* v. *Genius Sports LTD*, 499 pages (EX_A_02_NPL).
Genius Sports LTD's Initial Invalidity and Subject-Matter Eligibility Contentions Exhibit A-03, Mar. 14, 2024, Case No. 2:23-cv-00471-JRG, *Sportscastr Inc. (dba Panda Interactive)* v. *Genius Sports LTD*, 221 pages (Ex_A_03_NPL).
Genius Sports LTD's Initial Invalidity and Subject-Matter Eligibility Contentions Exhibit A-04, Mar. 14, 2024, Case No. 2:23-cv-00471-JRG, *Sportscastr Inc. (dba Panda Interactive)* v. *Genius Sports LTD*, 522 pages (Ex_A_04_NPL).
Genius Sports LTD's Initial Invalidity and Subject-Matter Eligibility Contentions Exhibit A-05, Mar. 14, 2024, Case No. 2:23-cv-00471-JRG, *Sportscastr Inc. (dba Panda Interactive)* v. *Genius Sports LTD*, 245 pages (Ex_A_05_NPL).
Genius Sports LTD's Initial Invalidity and Subject-Matter Eligibility Contentions Exhibit A-06, Mar. 14, 2024, Case No. 2:23-cv-00471-JRG, *Sportscastr Inc. (dba Panda Interactive)* v. *Genius Sports LTD*, 143 pages (Ex_A_06_NPL).
Genius Sports LTD's Initial Invalidity and Subject-Matter Eligibility Contentions Exhibit A-07, Mar. 14, 2024, Case No. 2:23-cv-00471-JRG, *Sportscastr Inc. (dba Panda Interactive)* v. *Genius Sports LTD*, 208 pages (Ex_A_07_NPL).
Genius Sports LTD's Initial Invalidity and Subject-Matter Eligibility Contentions Exhibit A-08, Mar. 14, 2024, Case No. 2:23-cv-00471-JRG, *Sportscastr Inc. (dba Panda Interactive)* v. *Genius Sports LTD*, 257 pages (Ex_A_08_NPL).
Genius Sports LTD's Initial Invalidity and Subject-Matter Eligibility Contentions Exhibit A-09, Mar. 14, 2024, Case No. 2:23-cv-00471-JRG, *Sportscastr Inc. (dba Panda Interactive)* v. *Genius Sports LTD*, 159 pages (Ex_A_09_NPL).

(56)          References Cited

OTHER PUBLICATIONS

Genius Sports LTD's Initial Invalidity and Subject-Matter Eligibility Contentions Exhibit A-10, Mar. 14, 2024, Case No. 2:23-cv-00471-JRG, *Sportscastr Inc. (dba Panda Interactive) v. Genius Sports LTD*, 490 pages (Ex_A_10_NPL).
Genius Sports LTD's Initial Invalidity and Subject-Matter Eligibility Contentions Exhibit A-11, Mar. 14, 2024, Case No. 2:23-cv-00471-JRG, *Sportscastr Inc. (dba Panda Interactive) v. Genius Sports LTD*, 470 pages (Ex_A_11_NPL).
Genius Sports LTD's Initial Invalidity and Subject-Matter Eligibility Contentions Exhibit A-12, Mar. 14, 2024, Case No. 2:23-cv-00471-JRG, *Sportscastr Inc. (dba Panda Interactive) v. Genius Sports LTD*, 584 pages (Ex_A_12_NPL).
Twitter Dev, Twitter Flight 2015—Up Periscope by Kayon Beykpour and Sara Haider, Nov. 2, 2015, https://www.youtube.com/watch?v=xjC3ZKYG74g&list=PLFKjcMIU2Wsi599UeOXpODIJ60za0zr_h&index=3, 1 page (GS_00003670).
Update: Chat Replay is Now Live!, Twitch Blog (Mar. 2, 2016), https://blog.twitch.tv/en/2016/03/02/update-chat-replay-is-now-live-aac0b82305b6/, 6 pages (GS_00003138).
Watch and Chat in Full Screen with Theater Mode, Twitch Blog (Dec. 16, 2014), https://blog.twitch.tv/en/2014/12/16/watch-and-chat-in-full-screen-with-theater-mode-321238b7bd38/, 5 pages (GS_00003171).
Wowza Media Systems, Tech-Guide: Building a Live Mobile Streaming App (2016), 19 pages (GS_00003328).
Wowza Media Systems, the History of Streaming, 1 page (GS_00003327).
Wowza Media Systems, Wowza Streaming Engine Overview (Feb. 2014), 26 pages (GS_00003347).
Wowza Media Systems, Wowza Streaming Engine User's Guide 4.0 (2007-2014), 122 pages (GS_00003205).
Wowza Media Systems, Wowza Streaming Engine User's Guide 4.7.5 (2007-2018), 97 pages (GS_00003493).
Wowza Media Systems, Wowza Streaming Engine User's Guide 4.I (2006-2015), 120 pages (GS_00003373).
Yoree Koh & Evelyn M. Rusli, Twitter Acquires Live-Video Streaming Startup Periscope, Wall St. J. (Mar. 9, 2015), http://www.wsj.com/articles/twitter-acquires-live-vide •• streaming-startup-periscope-1425938498, 2 pages (GS_00003059).
Andrew S. Tanenbaum & David J. Wetherall, Computer Networks (5th Ed. 2011), 962 pages (Tanenbaum_Wetherall_2011).
Andy Harris, HTML5 and CSS3 All-In-One for Dummies (3d Ed. 2014), 1107 pages (Harris_HTML5_2014).
Betgenius, 188bet Proposal: Advanced Football Scorecentre (Jun. 12, 2012) ("Advanced Football Scorecentre"), 32 pages (Betgenius_188bet_2012_SRAD_00000812).
Betradar Product Brochure 2011/2012 (2011), 36 pages (Betradar_Product_Brochure_2011).
Betradar, Betradar—Feature Update: Snooker now available on Live Scout service (Dec. 2013) 12 pages (BETRADAR_Feature_update_Snooker_Live_Scout_2013).
Betradar, Betrader Help (Oct. 2012) 46 pages (Betradar_Help_Oct_2012).
Betradar, Bowls Scout Client Specification, 7 pages (BETRADAR_Bowls_Scout_SRAD_00009616).
Betradar, Snooker Scout Client (2013) 9 pages (BETRADAR_Snooker_Scout_Client_2013).
Betrader, Betradar—Feature Update: Bowls now available on Live Odds & Live Scouting services Oct. 2014, 12 pages (Betradar_Feature_Update_2014).
Boolabus Blog (May 4, 2015), https://web.archive.org/web/20150504045439/http://www.boolabus.com:80/blog/, ("Boolabus Blog"), 10 pages (Boolabus-Blog_05-04-2015_SRAD_00000958).
Brian MacSweeney & Peter Hall, Betfred Inplay Application Development: Technical Specification (Jun. 2, 2009) ("Inplay Technical Specification"), 28 pages (MacSweeney_Hall_SRAD_00000784).
Genius Sports LTD's Preliminary Claim Constructions and Extrinsic Evidence Pursuant to P.R. 4-2 filed Aug. 2, 2024, in U.S. District Court, Eastern Division of Texas Marshall Division, Case No.

2:23-cv-00471-JRG, *Sportscastr Inc. (dba Panda Interactive) v. Genius Sports LTD*, 19 pages (Genius_Proposed_Claim_Constructions_08-22-2024_npl).
https://www.telestream.net/telestream-support/wire-cast/how-to-stream-to-facebook-live.htm, 16 pages (TELESTREAM_How_to_Stream_to_Facebook_live).
International Search Report and Written Opinion in PCT/US2024/028064 mailed Jun. 24, 2024, 16 pages.
Kaazing WebSocket Gateway: Detailed Technical Overview (Jun. 2010) 34 pages (Kaazing_Websocket_Gateway_June_2010).
Matthew Prince, CloudFlare Now Supports WebSockets, Cloudflare Blog (Aug. 5, 2014), https://blog.cloudflare.com/cloudflare-now-supports-websockets/, 7 pages (Prince_CloudFlare_SRAD_00009053).
MLB At Bat for iOS brings Live Overlay of Gameday Data onto TV Broadcasts and More, Next Web (Aug. 31, 2012), https://thenextweb.com/news/mlb-at-bat-ios-updates-ford-sync-integration-social-sharing-highlight-videos, 3 pages (MLB_at_Bat_for_IOS_Aug_31_2012).
Real-Time Second Screen Connectivity, Kaazing, https://web.archive.org/web/20130815224633/https://www.kaazing.com/solutions/real-time-second-screen-connectivity/, 2 pages (Real-time_Second_Screen_Kaazing).
Richard Clark, Whitepaper: Real-Time Data, KAAZING (2014) 10 pages (Clark_Whitepaper_Real-time_Data_2014).
Rob Manson, Getting Started With Webrtc (2013), 114 pages (Manson_Getting_Started_w_WebRTC-2013).
Salvatore Loreto & Simon Pietro Romano, Real-Time Communication With Webrtc (2014), 163 pages (Loreto_Romano_Real-time_Comm_w_WebRTC_2014).
Schulzrinne et al., RTP: a Transport Protocol for Real-Time Applications (2003), 89 pages (Schulzrinne_RTP_Transport_2003).
Second Screen App, KAAZING, https://web.archive.org/web/20130818005342/http://developer.kaazing.com/portfolio/second-screen-application/, 2 pages (Second_Screen_App_5342).
SEcond Screen App. KAAZING, https://web.archive.org/web/20130914172647/http://developer.kaazing.com:80/portfolio/second-screen-application, 2 pages (SEcond_Screen_App_2647).
Socket.IO Broadcasting events, SOCKET.IO, https://socket.io/docs/v4/broadcasting-events/, 3 pages (Socket_IO_SRAD_00008933).
Socket.IO Docs, SOCKET.IO https://web.archive.org/web/20150401041027/http:/socket.io/docs, 2 pages (Socket_IO_SRAD_00009039).
Socket.IO Documentation, SOCKET.IO, https://socket.io/docs/v4/, 4 pages (Socket_IO_SRAD_00009060).
Socket.IO on PubNub, PUBNUB https://web.archive.org/web/20150924221323mp_/http:/www.pubnub. com/socket.io, 3 pages, (Socket_IO_PubNub_SRAD_00009064).
Sportradar Group AG and Sportradar AG's Invalidity Contentions Exhibit A-01, May 6, 2024, Case No. 2:23-cv-00472-JRG, *Sportscastr Inc. (dba Panda Interactive) v. Sportradar Group AG and Sportradar AG*, 158 pages (SRAD-EX- A-01-Lu).
Sportradar Group AG and Sportradar AG's Invalidity Contentions Exhibit A-02, May 6, 2024, Case No. 2:23-cv-00472-JRG, *Sportscastr Inc. (dba Panda Interactive) v. Sportradar Group AG and Sportradar AG*, 302 pages (SRAD-EX- A-02-Dukes).
Sportradar Group AG and Sportradar AG's Invalidity Contentions Exhibit A-03, May 6, 2024, Case No. 2:23-cv-00472-JRG, *Sportscastr Inc. (dba Panda Interactive) v. Sportradar Group AG and Sportradar AG*, 144 pages (SRAD-EX- A-03-Mandyam).
Sportradar Group AG and Sportradar AG's Invalidity Contentions Exhibit A-04, May 6, 2024, Case No. 2:23-cv-00472-JRG, *Sportscastr Inc. (dba Panda Interactive) v. Sportradar Group AG and Sportradar AG*, 166 pages (SRAD-EX- A-04-Cromarty).
Sportradar Group AG and Sportradar AG's Invalidity Contentions Exhibit A-05, May 6, 2024, Case No. 2:23-cv-00472-JRG, *Sportscastr Inc. (dba Panda Interactive) v. Sportradar Group AG and Sportradar AG*, 171 pages (SRAD-EX- A-05-Cooper).
Sportradar Group AG and Sportradar AG's Invalidity Contentions Exhibit A-06, May 6, 2024, Case No. 2:23-cv-00472-JRG, *Sportscastr Inc. (dba Panda Interactive) v. Sportradar Group AG and Sportradar AG*, 190 pages (SRAD-EX- A-06-Basso).
Sportradar Group AG and Sportradar AG's Invalidity Contentions Exhibit A-07, May 6, 2024, Case No. 2:23-cv-00472-JRG, *Sportscastr*

(56) References Cited

OTHER PUBLICATIONS

*Inc.* (*dba Panda Interactive*) v. *Sportradar Group AG and Sportradar AG*, 166 pages (SRAD-EX-A-07-Sullivan).

Sportradar Group AG and Sportradar AG's Invalidity Contentions Exhibit A-08, May 6, 2024, Case No. 2:23-cv-00472-JRG, *Sportscastr Inc.* (*dba Panda Interactive*) v. *Sportradar Group AG and Sportradar AG*, 93 pages (SRAD-EX-A-08-Bota).

Sportradar Group AG and Sportradar AG's Invalidity Contentions Exhibit A-09, May 6, 2024, Case No. 2:23-cv-00472-JRG, *Sportscastr Inc.* (*dba Panda Interactive*) v. *Sportradar Group AG and Sportradar AG*, 56 pages (SRAD-EX-A-09-Dengler).

Sportradar Group AG and Sportradar AG's Invalidity Contentions Exhibit A-10, May 6, 2024, Case No. 2:23-cv-00472-JRG, *Sportscastr Inc.* (*dba Panda Interactive*) v. *Sportradar Group AG and Sportradar AG*, 73 pages (SRAD-EX-A-10-Ma).

Sportradar Group AG and Sportradar AG's Invalidity Contentions Exhibit A-11, May 6, 2024, Case No. 2:23-cv-00472-JRG, *Sportscastr Inc.* (*dba Panda Interactive*) v. *Sportradar Group AG and Sportradar AG*, 56 pages (SRAD-EX-A-11-Mukherjee).

Sportradar Group AG and Sportradar AG's Invalidity Contentions Exhibit A-12, May 6, 2024, Case No. 2:23-cv-00472-JRG, *Sportscastr Inc.* (*dba Panda Interactive*) v. *Sportradar Group AG and Sportradar AG*, 133 pages (SRAD-EX-A-12-Ellis).

Sportradar Group AG and Sportradar AG's Invalidity Contentions Exhibit A-13, May 6, 2024, Case No. 2:23-cv-00472-JRG, *Sportscastr Inc.* (*dba Panda Interactive*) v. *Sportradar Group AG and Sportradar AG*, 223 pages (SRAD-EX-A-13-Herzog).

Sportradar Group AG and Sportradar AG's Invalidity Contentions Exhibit A-14, May 6, 2024, Case No. 2:23-cv-00472-JRG, *Sportscastr Inc.* (*dba Panda Interactive*) v. *Sportradar Group AG and Sportradar AG*, 222 pages (SRAD-EX-A-14-Mitic).

Sportradar Group AG and Sportradar AG's Invalidity Contentions Exhibit A-15, May 6, 2024, Case No. 2:23-cv-00472-JRG, *Sportscastr Inc.* (*dba Panda Interactive*) v. *Sportradar Group AG and Sportradar AG*, 107 pages (SRAD-EX-A-15-Spivey).

Sportradar Group AG and Sportradar AG's Invalidity Contentions Exhibit A-16, May 6, 2024, Case No. 2:23-cv-00472-JRG, *Sportscastr Inc.* (*dba Panda Interactive*) v. *Sportradar Group AG and Sportradar AG*, 692 pages (SRAD-EX-A-16-Levinson).

Sportradar Group AG and Sportradar AG's Invalidity Contentions Exhibit A-17, May 6, 2024, Case No. 2:23-cv-00472-JRG, *Sportscastr Inc.* (*dba Panda Interactive*) v. *Sportradar Group AG and Sportradar AG*, 284 pages (SRAD-EX-A-17-Park).

Sportradar Group AG and Sportradar AG's Invalidity Contentions Exhibit A-18, May 6, 2024, Case No. 2:23-cv-00472-JRG, *Sportscastr Inc.* (*dba Panda Interactive*) v. *Sportradar Group AG and Sportradar AG*, 193 pages (SRAD-EX-A-18-Abulikemu).

Sportradar Group AG and Sportradar AG's Invalidity Contentions Exhibit A-20, May 6, 2024, Case No. 2:23-cv-00472-JRG, *Sportscastr Inc.* (*dba Panda Interactive*) v. *Sportradar Group AG and Sportradar AG*, 158 pages (SRAD-EX-A-20-Kaazing).

Sportradar Group AG and Sportradar AG's Invalidity Contentions Exhibit A-21, May 6, 2024, Case No. 2:23-cv-00472-JRG, *Sportscastr Inc.* (*dba Panda Interactive*) v. *Sportradar Group AG and Sportradar AG*, 244 pages (SRAD-EX-A-21-WebRTC).

Sportradar Group AG and Sportradar AG's Invalidity Contentions Exhibit A-22, May 6, 2024, Case No. 2:23-cv-00472-JRG, *Sportscastr Inc.* (*dba Panda Interactive*) v. *Sportradar Group AG and Sportradar AG*, 288 pages (SRAD-EX-A-22-RTP).

Sportradar Group AG and Sportradar AG's Invalidity Contentions Exhibit A-23, May 6, 2024, Case No. 2:23-cv-00472-JRG, *Sportscastr Inc.* (*dba Panda Interactive*) v. *Sportradar Group AG and Sportradar AG*, 189 pages (SRAD-EX-A-23-WebSocket).

Genius Sports' 2nd Supp. Invalidity Contentions, Ex B-26, Dec. 9, 2024, 78 pages (GEN-Ex-B-26_12-9-24).

Genius Sports' 2nd Supp. Invalidity Contentions, Ex B-27, Dec. 9, 2024, 527 pages (GEN-Ex-B-27_12-9-24) (10 parts).

Genius Sports' 2nd Supp. Invalidity Contentions, Ex B-28, Dec. 9, 2024, 133 pages (GEN-Ex-B-28_12-9-24).

Genius Sports' 2nd Supp. Invalidity Contentions, Ex B-29, Dec. 9, 2024, 363 pages (GEN-Ex-B-29_12-9-24).

Genius Sports' 2nd Supp. Invalidity Contentions, Ex B-30, Dec. 9, 2024, 315 pages (GEN-Ex-B-30_12-9-24).

Genius Sports' 2nd Supp. Invalidity Contentions, Ex B-31, Dec. 9, 2024, 279 pages (GEN-Ex-B-31_12-9-24).

Genius Sports' 2nd Supp. Invalidity Contentions, Ex B-32, Dec. 9, 2024, 139 pages (GEN-Ex-B-32_12-9-24).

Genius Sports' 2nd Supp. Invalidity Contentions, Ex B-33, Dec. 9, 2024, 292 pages (GEN-Ex-B-33_12-9-24).

Genius Sports' 2nd Supp. Invalidity Contentions, Ex B-34, Dec. 9, 2024, 212 pages (GEN-Ex-B-34_12-9-24).

Genius Sports' 2nd Supp. Invalidity Contentions, Ex B-35, Dec. 9, 2024, 117 pages (GEN-Ex-B-35_12-9-24).

Genius Sports' 2nd Supp. Invalidity Contentions, Ex C-15, Dec. 9, 2024, 50 pages (GEN-Ex-C-15_12-9-24).

Genius Sports' 2nd Supp. Invalidity Contentions, Ex C-16, Dec. 9, 2024, 74 pages (GEN-Ex-C-16_12-9-24).

Genius Sports' 2nd Supp. Invalidity Contentions, Ex C-18, Dec. 9, 2024, 50 pages (GEN-Ex-C-18_12-9-24).

Genius Sports' 2nd Supp. Invalidity Contentions, Ex C-20, Dec. 9, 2024, 52 pages (GEN-Ex-C-20_12-9-24).

Genius Sports' 2nd Supp. Invalidity Contentions, Ex C-21, Dec. 9, 2024, 45 pages (GEN-Ex-C-21_12-9-24).

Genius Sports' 2nd Supp. Invalidity Contentions, Ex C-22, Dec. 9, 2024, 48 pages (GEN-Ex-C-22_12-9-24).

Genius Sports' 2nd Supp. Invalidity Contentions, Ex C-23, Dec. 9, 2024, 44 pages (GEN-Ex-C-23_12-9-24).

Genius Sports' 2nd Supp. Invalidity Contentions, Ex C-24, Dec. 9, 2024, 45 pages (GEN-Ex-C-24_12-9-24).

Genius Sports' 2nd Supp. Invalidity Contentions, Ex C-25, Dec. 9, 2024, 67 pages (GEN-Ex-C-25_12-9-24).

Genius Sports' 2nd Supp. Invalidity Contentions, Ex C-26, Dec. 9, 2024, 64 pages (GEN-Ex-C-26_12-9-24).

Genius Sports' 2nd Supp. Invalidity Contentions, Ex C-27, Dec. 9, 2024, 94 pages (GEN-Ex-C-27_12-9-24)(2 parts).

Genius Sports' 2nd Supp. Invalidity Contentions, Ex C-28, Dec. 9, 2024, 42 pages (GEN-Ex-C-28_12-9-24).

Genius Sports' 2nd Supp. Invalidity Contentions, Ex C-29, Dec. 9, 2024, 86 pages (GEN-Ex-C-29_12-9-24).

Genius Sports' 2nd Supp. Invalidity Contentions, Ex C-30, Dec. 9, 2024, 112 pages (GEN-Ex-C-30_12-9-24).

Genius Sports' 2nd Supp. Invalidity Contentions, Ex C-31, Dec. 9, 2024, 84 pages (GEN-Ex-C-31_12-9-24).

Genius Sports' 2nd Supp. Invalidity Contentions, Ex C-32, Dec. 9, 2024, 52 pages (GEN-Ex-C-32_12-9-24).

Genius Sports' 2nd Supp. Invalidity Contentions, Ex C-33, Dec. 9, 2024, 75 pages (GEN-Ex-C-33_12-9-24).

Genius Sports' 2nd Supp. Invalidity Contentions, Ex C-34, Dec. 9, 2024, 80 pages (GEN-Ex-C-34_12-9-24).

Genius Sports' 2nd Supp. Invalidity Contentions, Ex C-35, Dec. 9, 2024, 37 pages (GEN-Ex-C-35_12-9-24).

Genius Sports' 2nd Supp. Invalidity Contentions, Ex D-1, Dec. 9, 2024, 26 pages (GEN-Ex-D-1_12-9-24).

Genius Sports' 2nd Supp. Invalidity Contentions, Ex D-2, Dec. 9, 2024, 30 pages (GEN-Ex-D-2_12-9-24).

Genius Sports' 2nd Supp. Invalidity Contentions, Ex D-3, Dec. 9, 2024, 23 pages (GEN-Ex-D-3_12-9-24).

Genius Sports' 2nd Supp. Invalidity Contentions, Ex D-4, Dec. 9, 2024, 27 pages (GEN-Ex-D-4_12-9-24).

Genius Sports' 2nd Supp. Invalidity Contentions, Ex E-18, Dec. 9, 2024, 408 pages (GEN-Ex-E-18_12-9-24).

Genius Sports' 2nd Supp. Invalidity Contentions, Ex E-27, Dec. 9, 2024, 62 pages (GEN-Ex-E-27_12-9-24).

Genius Sports' 2nd Supp. Invalidity Contentions, Ex E-28, Dec. 9, 2024, 42 pages (GEN-Ex-E-28_12-9-24).

Genius Sports' 2nd Supp. Invalidity Contentions, Ex E-29, Dec. 9, 2024, 54 pages (GEN-Ex-E-29_12-9-24).

Genius Sports' 2nd Supp. Invalidity Contentions, Ex E-30, Dec. 9, 2024, 86 pages (GEN-Ex-E-30_12-9-24).

Genius Sports' 2nd Supp. Invalidity Contentions, Ex E-31, Dec. 9, 2024, 85 pages (GEN-Ex-E-31_12-9-24).

(56)        References Cited

OTHER PUBLICATIONS

Genius Sports' 2nd Supp. Invalidity Contentions, Ex E-32, Dec. 9, 2024, 46 pages (GEN-Ex-E-32_12-9-24).

Genius Sports' 2nd Supp. Invalidity Contentions, Ex E-33, Dec. 9, 2024, 49 pages (GEN-Ex-E-33_12-9-24).

Genius Sports' 2nd Supp. Invalidity Contentions, Ex E-34, Dec. 9, 2024, 74 pages (GEN-Ex-E-34_12-9-24).

Genius Sports' 2nd Supp. Invalidity Contentions, Ex E-35, Dec. 9, 2024, 42 pages (GEN-Ex-E-35_12-9-24).

Genius Sports' 2nd Supplemental Invalidity and Subject Matter Eligibility Contentions, filed in United States District Court for Eastern District of Texas, Civil Action Nos. 2:23-cv-00472 and 2:23-cv-00471) served Dec. 9, 2024, 74 pages (3 parts).

Gilstrap Order of Sep. 30, 2024 authorizing addition of Challenged Claims to the Complaint, 2 pages (Gilstrap_Order_09-30-2024).

Infrared5's Red5 Pro Streaming Application and website documents, cited in Exhibit A-34 of Genius Contentions (identified in Exhibit as GS_00022230-22290) dated Dec. 19, 2024, 61 pages (Red5-Pro).

IPR 2025-00251 and 00252 (Dec. 6, 2024) Exhibit 1001, "Wicker Dec" 223 pages (IPR2025-00251_EX_1001_223_p_12-06-2024_npl).

IPR 2025-00251 and 00252 (Dec. 6, 2024) Exhibit 1002, "Wicker CV" 38 pages (IPR2025-00251_EX_1002_38_p_12-06-2024_npl).

IPR 2025-00251 and 00252 (Dec. 6, 2024) Exhibit 1013, "Vidal Memo" 9 pages (IPR2025-00251_EX_1013_57_p_12-06-2024_npl).

IPR 2025-00251 and 00252 (Dec. 6, 2024) Exhibit 1057, 57 pages (IPR2025-00251_EX_1057_57_p_12-06-2024_npl), 3 parts.

A Brief History of the Internet, Online Lib. Learning Center. (Feb. 9, 2024), https://www.usg.edu/galileo/skills/unit07/internet07_02.phtml ("Online Library"), 2 pages (A_Brief_History_ONLINE_LIB_2024).

Andy Salo, MPEG DASH: A Technical Deep Dive and Look at What's Next, RGB Networks, (2012) ("Salo"), 13 pages (Andy_Salo_MPEG_RGB_2012).

Brijesh Kumar, Making Sense of Video Streaming Protocols, Linkedin. (Aug. 11, 2016), https://www.linkedin.com/pulse/making-sense-video-streaming-protocols-dr-brijesh-kumar/ ("Kumar"), 7 pages (Brijesh_Kumar_Making_Sense_2016).

Charles Marion & Julien Jomier, Real-time Collaborative Scientific WebGL Visualization with Websocket, Ass'n Computing Machinery, Aug. 4-5, 2012 ("Marion"), 4 pages (CHARLES_MARION_Real-time_2012).

Christopher Mueller, MEPG-DASH vs. Apple HLS vs. Microsoft Smooth Streaming vs. Adobe HDS, BITMOVIN. (Mar. 29, 2015), https://bitmovin.com/mpeg-dash-vs-apple-hls-vs-microsoft-smooth-streaming-vs-adobe-hds/ ("Mueller"), 10 pages (Christopher_Mueller_MEPG-DASH_Bitmovin_2015).

Curriculum Vitae of Dr. Stephen Wicker, PhD., 38 pages (Wicker_CV_38p).

Declaration of Dr. Stephen Wicker, Ph.D., signed Aug. 22, 2024, in IPR2024-01305, 499 pages (WIcker_Dec_IPR2024-01305_499p).

Declaration of Dr. Stephen Wicker, Ph.D., signed Aug. 22, 2024, in IPR2024-01307, 499 pages (WIcker_Dec_IPR2024-01307_499p).

Declaration of Dr. Stephen Wicker, Ph.D., signed Aug. 22, 2024, in IPR2024-01308, 499 pages (WIcker_Dec_IPR2024-01308_499p).

Declaration of Dr. Stephen Wicker, Ph.D., signed Aug. 22, 2024, in IPR2024-01309, 499 pages (WIcker_Dec_IPR2024-01309_499p).

Declaration of Dr. Stephen Wicker, Ph.D., signed Aug. 22, 2024, in IPR2024-01310, 499 pages (WIcker_Dec_IPR2024-01310_499p).

Declaration of Dr. Stephen Wicker, Ph.D., signed Aug. 22, 2024, in IPR2024-01311, 499 pages (WIcker_Dec_IPR2024-01311_499p).

Genius Sports' proposed Sotera Stipulation to SportsCastr, 2 pages (Genius_propose_Sotera_Stip).

Hardeep Singh Parmar & Michael C. Thornburgh, Adobe's Real Time Messaging Protocol, Veriskope. (Dec. 21, 2002) ("Parmer"), 52 pages (Hardeep_Singh_Parmar_Adobe_Veriskope_2002).

Henning Schulzrinne et al., RTP: A Transport Protocol for Real-Time-Applications, Data Tracker (Jan. 1996), https://datatracker.ietf.org/doc/html/rfc1889 ("Schulzrinne"), 75 pages (Henning_Schulzrinne_RTP_1996).

Hisayuuki Ohmata et al., Hybridcast: A new media experience by integration of broadcasting and broadband, 2013 ITU Kaleidoscope: Building Sustainable Communities, Apr. 2013 ("Ohmata"), 8 pages (Hisayuuki_Ohmata_Hybridcast_2013).

Ian Fette & Alexey Melnikov, The WebSocket Protocol, RFC Editor. (Dec. 2016), https://www.rfc-editor.org/rfc/rfc6455. html, 71 pages (Ian_Fette_WebSocket_RFC_2016).

Ilya Grigorik, WebRTC, in High Performance Browser Networking, (2013) ("Grigorik"), 20 pages (Ilya Grigorik, WebRTC, in High Performance Browser Networking, (2013) ("Grigorik"), 20 pages (Ilya_Grigorik_WebRTC_High_Performance_2013).

James F. Kurose & Keith W. Ross, Application Layer, in Computer Networking a Top-Down Approach (Michael Hirsch et al. eds., 4th ed. 2012) ("Kurose"), 5 pages (James_F_Kurose_2012).

Jan Newmarch, Introduction to Stream Control Transmission Protocol, Linux J. (Sep. 1, 2007), https://www.linuxjournal.com/article/9748 ("Newmarch"), 12 pages (Jan_Newmarch_Introduction_LINUX_2007).

Jan Ozer, Upstream, Justin.tv, Livestream, and Bambuser: Streaming Unplugged, Streaming Media Magazine., Jun.-Jul. 2012 ("Ozer"), 18 pages (Jan_Ozer_Upstream_2012).

John Dilley et al., Globally Distributed Content Delivery, IEEE Internet Computing (Sep.-Oct. 2002), 9 pages (john_Dilley_Globally_distributed_2002).

Kyung-Hoe Kim et al., A transmission control SCTP for real-time multimedia streaming, 54 Computer Networks 1418, (2010) ("Kim"), 8 pages (KYUNG_KIM_transmission_54_Computer_2010).

Lucian Popa et al., HTTP as the narrow waist of the future internet, 2010 ACM SIGCOMM Workshop, Oct. 2013 ("Popa"), 6 pages (Lucian_Popa_HTTP_ACM_2013).

Lydon Ong, John Yoakum &, An Introduction to the Stream Control Transmission Protocol (SCTP), Datatracker. (May 2002), https://datatracker.ietf.org/doc/rfc3286/ ("Ong"), 10 pages (Lydon_Ong_Introduction_Datatracker_2002).

Marcin Warczygłowa, Real-time Web Application with Websockets and Vert.X (Nov. 10, 2015), https://blog.allegro.tech/2015/11/real-time-web-application-with-websockets-and-vert-x.html, 14 pages (Marcin_Warczyglowa_Real-time_Web_blog-allegro-tech_2015).

Mark Sweney, First ads appear on YouTube Clips, Guardian, Aug. 22, 2007 ("Sweney"), 6 pages (Mark_Sweney_First-ads_Guardian_2007).

Petition for Inter Partes Review of U.S. Pat. No. 10,425,697 (IPR2024-01308) dated Aug. 22, 2024, 97 pages (Petition-IPR2024-01308).

Petition for Inter Partes Review of U.S. Pat. No. 10,425,697 (IPR2024-01309) dated Aug. 22, 2024, 101 pages (Petition-IPR2024-01309).

Petition for Inter Partes Review of U.S. Pat. No. 10,805,687 (IPR2024-01305) dated Aug. 22, 2024, 99 pages (Petition-IPR2024-01305).

Petition for Inter Partes Review of U.S. Pat. No. 10,805,687 (IPR2024-01307) dated Aug. 22, 2024, 101 pages (Petition-IPR2024-01307).

Petition for Inter Partes Review of U.S. Pat. No. 11,039,218 (IPR2024-01310) dated Aug. 23, 2024, 100 pages (Petition-IPR2024-01310).

Petition for Inter Partes Review of U.S. Pat. No. 11,039,218 (IPR2024-01311) dated Aug. 23, 2024, 103 pages (Petition-IPR2024-01311).

Randall Stewart & Chris Metz, SCTP: new transport protocol for TCP/IP, 5 IEEE 64, (2001) ("Stewart"), 6 pages (Randall_Stewart_SCTP_IEEE_2001).

Richard Sandomir, The Innovation That Grew and Grew, N.Y. Times, Jun. 12, 2014 ("Sandomir"), 3 pages (Richard_Sandomir_Innovation_NY_Times_2014).

Sam Dutton, Get started with WebRTC, web.dev. (Jul. 23, 2012), https://web.dev/articles/webrtc-basics ("Dutton"), 27 pages (Sam_Dutton_Get_started_w_WebRTC_2012).

(56)         References Cited

OTHER PUBLICATIONS

SportsCastr's Complaint for Patent Infringement against Genius Sports, dated Oct. 5, 2023, 123 pages (SGIC_Complaint_Genius).

SportsCastr's Preliminary Infringement Contentions dated Jan. 18, 2024, 638 pages (SGIC_Prelim_Infring_Cont).

SportsCastr's Response to Genius Sports' First Set of Interrogatories dated May 29, 2024, 53 pages (SGIC_RESP-to_Ints).

Stefan Saroiu et al., An analysis of Internet Content Delivery Systems, ACM SIGOPS Operating System Review, vol. 36 (Dec. 31, 2002), https://doi.org/10.1145/844128.84415 ("Saroiu"), 13 pages (Stefan_Saroiu_analysis_ACM_2002).

Victoria Pimentel & Bradford G. Nickerson, Communicating and Displaying Real-Time Data with WebSocket, 16 IEEE (2012) ("Pimentel"), 9 pages (Victoria_Pimentel _Communicating_IEEE_2012).

Sportradar and Sportradar Group AG Amended Invalidity Contentions, Ex B-15, Dec. 9, 2024, 195 pages (SRAD_Ex-B-15_12-9-24), 2 parts.

Sportradar and Sportradar Group AG Amended Invalidity Contentions, Ex B-16, Dec. 9, 2024, 976 pages (SRAD_Ex-B-16_12-9-24), 21 parts.

Sportradar and Sportradar Group AG Amended Invalidity Contentions, Ex B-17, Dec. 9, 2024, 590 pages (SRAD_Ex-B-17_12-9-24), 10 parts.

Sportradar and Sportradar Group AG Amended Invalidity Contentions, Ex B-18, Dec. 9, 2024, 363 pages (SRAD_Ex-B-18_12-9-24), 6 parts.

Sportradar and Sportradar Group AG Amended Invalidity Contentions, Ex B-20, Dec. 9, 2024, 255 pages (SRAD_Ex-B-20_12-9-24), 4 parts.

Sportradar and Sportradar Group AG Amended Invalidity Contentions, Ex B-21, Dec. 9, 2024, 430 pages (SRAD_Ex-B-21_12-9-24), 5 parts.

Sportradar and Sportradar Group AG Amended Invalidity Contentions, Ex B-22, Dec. 9, 2024, 682 pages (SRAD_Ex-B-22_12-9-24), 11 parts.

Sportradar and Sportradar Group AG Amended Invalidity Contentions, Ex B-23, Dec. 9, 2024, 323 pages (SRAD_Ex-B-23_12-9-24), 4 parts.

Sportradar and Sportradar Group AG Amended Invalidity Contentions, Ex B-24, Dec. 9, 2024, 488 pages (SRAD_Ex-B-24_12-9-24), 3 parts.

Sportradar and Sportradar Group AG Amended Invalidity Contentions, Ex B-25, Dec. 9, 2024, 573 pages (SRAD_Ex-B-25_12-9-24), 6 parts.

Sportradar and Sportradar Group AG Amended Invalidity Contentions, Ex B-26, Dec. 9, 2024, 256 pages (SRAD_Ex-B-26_12-9-24), 3 parts.

Sportradar and Sportradar Group AG Amended Invalidity Contentions, Ex B-27, Dec. 9, 2024, 171 pages (SRAD_Ex-B-27_12-9-24), 3 parts.

Sportradar and Sportradar Group AG Amended Invalidity Contentions, Ex B-28, Dec. 9, 2024, 267 pages (SRAD_Ex-B-28_12-9-24), 2 parts.

Sportradar and Sportradar Group AG Amended Invalidity Contentions, Ex B-30, Dec. 9, 2024, 647 pages (SRAD_Ex-B-30_12-9-24), 6 parts.

Sportradar and Sportradar Group AG Amended Invalidity Contentions, Ex B-31, Dec. 9, 2024, 439 pages (SRAD_Ex-B-31_12-9-24), 4 parts.

Sportradar and Sportradar Group AG Amended Invalidity Contentions, Ex B-32, Dec. 9, 2024, 278 pages (SRAD_Ex-B-32_12-9-24), 4 parts.

Sportradar and Sportradar Group AG Amended Invalidity Contentions, Ex B-33, Dec. 9, 2024, 323 pages (SRAD_Ex-B-33_12-9-24), 4 parts.

Sportradar and Sportradar Group AG Amended Invalidity Contentions, Ex B-34, Dec. 9, 2024, 385 pages (SRAD_Ex-B-34_12-9-24), 5 parts.

Sportradar and Sportradar Group AG Amended Invalidity Contentions, Ex B-35, Dec. 9, 2024, 375 pages (SRAD_Ex-B-35_12-9-24), 5 parts.

Sportradar and Sportradar Group AG Amended Invalidity Contentions, Ex B-36, Dec. 9, 2024, 116 pages (SRAD_Ex-B-36_12-9-24), 2 parts.

Sportradar and Sportradar Group AG Amended Invalidity Contentions, Ex B-37, Dec. 9, 2024, 398 pages (SRAD_Ex-B-37_12-9-24), 3 parts.

Sportradar and Sportradar Group AG Amended Invalidity Contentions, Ex B-38, Dec. 9, 2024, 15 pages (SRAD_Ex-B-38_12-9-24).

Sportradar and Sportradar Group AG Amended Invalidity Contentions, Ex B-39, Dec. 9, 2024, 30 pages (SRAD_Ex-B-39_12-9-24).

Sportradar and Sportradar Group AG Amended Invalidity Contentions, Ex B-40, Dec. 9, 2024, 29 pages (SRAD_Ex-B-40_12-9-24).

Sportradar and Sportradar Group AG Amended Invalidity Contentions, Ex C-01, Dec. 9, 2024, 257 pages (SRAD_Ex-C-01_12-9-24), 4 parts.

Sportradar and Sportradar Group AG Amended Invalidity Contentions, Ex C-02, Dec. 9, 2024, 594 pages (SRAD_Ex-C-02_12-9-24), 9 parts.

Sportradar and Sportradar Group AG Amended Invalidity Contentions, Ex C-03, Dec. 9, 2024, 636 pages (SRAD_Ex-C-03_12-9-24), 11 parts.

Sportradar and Sportradar Group AG Amended Invalidity Contentions, Ex C-04, Dec. 9, 2024, 295 pages (SRAD_Ex-C-04_12-9-24), 5 parts.

Sportradar and Sportradar Group AG Amended Invalidity Contentions, Ex C-05, Dec. 9, 2024, 279 pages (SRAD_Ex-C-05_12-9-24), 6 parts.

Sportradar and Sportradar Group AG Amended Invalidity Contentions, Ex C-06, Dec. 9, 2024, 373 pages (SRAD_Ex-C-06_12-9-24), 6 parts.

Sportradar and Sportradar Group AG Amended Invalidity Contentions, Ex C-07, Dec. 9, 2024, 309 pages (SRAD_Ex-C-07_12-9-24), 5 parts.

Sportradar and Sportradar Group AG Amended Invalidity Contentions, Ex C-08, Dec. 9, 2024, 330 pages (SRAD_Ex-C-08_12-9-24), 6 parts.

Sportradar and Sportradar Group AG Amended Invalidity Contentions, Ex C-09, Dec. 9, 2024, 243 pages (SRAD_Ex-C-09_12-9-24), 5 parts.

Sportradar and Sportradar Group AG Amended Invalidity Contentions, Ex C-10, Dec. 9, 2024, 327 pages (SRAD_Ex-C-10_12-9-24), 6 parts.

Sportradar and Sportradar Group AG Amended Invalidity Contentions, Ex C-11, Dec. 9, 2024, 233 pages (SRAD_Ex-C-11_12-9-24), 4 parts.

Sportradar and Sportradar Group AG Amended Invalidity Contentions, Ex C-12, Dec. 9, 2024, 322 pages (SRAD_Ex-C-12_12-9-24), 3 parts.

Sportradar and Sportradar Group AG Amended Invalidity Contentions, Ex C-13, Dec. 9, 2024, 580 pages (SRAD_Ex-C-13_12-9-24), 10 parts.

Sportradar and Sportradar Group AG Amended Invalidity Contentions, Ex C-14, Dec. 9, 2024, 976 pages (SRAD_Ex-C-14_12-9-24), 16 parts.

Sportradar and Sportradar Group AG Amended Invalidity Contentions, Ex C-15, Dec. 9, 2024, 441 pages (SRAD_Ex-C-15_12-9-24), 7 parts.

Sportradar and Sportradar Group AG Amended Invalidity Contentions, Ex C-16, Dec. 9, 2024, 1093 pages (SRAD_Ex-C-16_12-9-24), 22 parts.

Sportradar and Sportradar Group AG Amended Invalidity Contentions, Ex C-17, Dec. 9, 2024, 449 pages (SRAD_Ex-C-17_12-9-24), 8 parts.

Sportradar and Sportradar Group AG Amended Invalidity Contentions, Ex C-18, Dec. 9, 2024, 365 pages (SRAD_Ex-C-18_12-9-24), 6 parts.

Sportradar and Sportradar Group AG Amended Invalidity Contentions, Ex C-20, Dec. 9, 2024, 388 pages (SRAD_Ex-C-20_12-9-24), 6 parts.

(56)     References Cited

OTHER PUBLICATIONS

Sportradar and Sportradar Group AG Amended Invalidity Contentions, Ex C-21, Dec. 9, 2024, 694 pages (SRAD_Ex-C-21_12-9-24), 9 parts.
Sportradar and Sportradar Group AG Amended Invalidity Contentions, Ex C-22, Dec. 9, 2024, 525 pages (SRAD_Ex-C-22_12-9-24), 10 parts.
Sportradar and Sportradar Group AG Amended Invalidity Contentions, Ex C-23, Dec. 9, 2024, 662 pages (SRAD_Ex-C-23_12-9-24), 6 parts.
Sportradar and Sportradar Group AG Amended Invalidity Contentions, Ex C-24, Dec. 9, 2024, 480 pages (SRAD_Ex-C-24_12-9-24), 4 parts.
Sportradar and Sportradar Group AG Amended Invalidity Contentions, Ex C-25, Dec. 9, 2024, 761 pages (SRAD_Ex-C-25_12-9-24), 8 parts.
Sportradar and Sportradar Group AG Amended Invalidity Contentions, Ex C-26, Dec. 9, 2024, 250 pages (SRAD_Ex-C-26_12-9-24), 2 parts.
Sportradar and Sportradar Group AG Amended Invalidity Contentions, Ex C-27, Dec. 9, 2024, 199 pages (SRAD_Ex-C-27_12-9-24), 3 parts.
Sportradar and Sportradar Group AG Amended Invalidity Contentions, Ex C-28, Dec. 9, 2024, 315 pages (SRAD_Ex-C-28_12-9-24), 3 parts.
Sportradar and Sportradar Group AG Amended Invalidity Contentions, Ex C-30, Dec. 9, 2024, 878 pages (SRAD_Ex-C-30_12-9-24), 10 parts.
Sportradar and Sportradar Group AG Amended Invalidity Contentions, Ex C-31, Dec. 9, 2024, 369 pages (SRAD_Ex-C-31_12-9-24), 5 parts.
Sportradar and Sportradar Group AG Amended Invalidity Contentions, Ex C-32, Dec. 9, 2024, 372 pages (SRAD_Ex-C-32_12-9-24), 5 parts.
Sportradar and Sportradar Group AG Amended Invalidity Contentions, Ex C-33, Dec. 9, 2024, 270 pages (SRAD_Ex-C-33_12-9-24), 5 parts.
Sportradar and Sportradar Group AG Amended Invalidity Contentions, Ex C-34, Dec. 9, 2024, 335 pages (SRAD_Ex-C-34_12-9-24), 5 parts.
Sportradar and Sportradar Group AG Amended Invalidity Contentions, Ex C-35, Dec. 9, 2024, 342 pages (SRAD_Ex-C-35_12-9-24), 6 parts.
Sportradar and Sportradar Group AG Amended Invalidity Contentions, Ex C-36, Dec. 9, 2024, 122 pages (SRAD_Ex-C-36_12-9-24), 2 parts.
Sportradar and Sportradar Group AG Amended Invalidity Contentions, Ex C-37, Dec. 9, 2024, 363 pages (SRAD_Ex-C-37_12-9-24), 4 parts.
Sportradar and Sportradar Group AG Amended Invalidity Contentions, Ex D-01, Dec. 9, 2024, 150 pages (SRAD_Ex-D-01_12-9-24), 2 parts.
Sportradar and Sportradar Group AG Amended Invalidity Contentions, Ex D-02, Dec. 9, 2024, 328 pages (SRAD_Ex-D-02_12-9-24), 5 parts.
Sportradar and Sportradar Group AG Amended Invalidity Contentions, Ex D-03, Dec. 9, 2024, 264 pages (SRAD_Ex-D-03_12-9-24), 3 parts.
Sportradar and Sportradar Group AG Amended Invalidity Contentions, Ex D-04, Dec. 9, 2024, 195 pages (SRAD_Ex-D-04_12-9-24), 3 parts.
Sportradar and Sportradar Group AG Amended Invalidity Contentions, Ex D-05, Dec. 9, 2024, 173 pages (SRAD_Ex-D-05_12-9-24), 2 parts.
Sportradar and Sportradar Group AG Amended Invalidity Contentions, Ex D-06, Dec. 9, 2024, 200 pages (SRAD_Ex-D-06_12-9-24), 3 parts.
Sportradar and Sportradar Group AG Amended Invalidity Contentions, Ex D-07, Dec. 9, 2024, 187 pages (SRAD_Ex-D-07_12-9-24), 3 parts.

Sportradar and Sportradar Group AG Amended Invalidity Contentions, Ex D-08, Dec. 9, 2024, 182 pages (SRAD_Ex-D-08_12-9-24), 3 parts.
Sportradar and Sportradar Group AG Amended Invalidity Contentions, Ex D-09, Dec. 9, 2024, 146 pages (SRAD_Ex-D-09_12-9-24), 2 parts.
Sportradar and Sportradar Group AG Amended Invalidity Contentions, Ex D-10, Dec. 9, 2024, 193 pages (SRAD_Ex-D-10_12-9-24), 2 parts.
Sportradar and Sportradar Group AG Amended Invalidity Contentions, Ex D-11, Dec. 9, 2024, 118 pages (SRAD_Ex-D-11_12-9-24), 2 parts.
Sportradar and Sportradar Group AG Amended Invalidity Contentions, Ex D-12, Dec. 9, 2024, 180 pages (SRAD_Ex-D-12_12-9-24), 3 parts.
Sportradar and Sportradar Group AG Amended Invalidity Contentions, Ex D-13, Dec. 9, 2024, 263 pages (SRAD_Ex-D-13_12-9-24), 5 parts.
Sportradar and Sportradar Group AG Amended Invalidity Contentions, Ex D-14, Dec. 9, 2024, 387 pages (SRAD_Ex-D-14_12-9-24), 5 parts.
Sportradar and Sportradar Group AG Amended Invalidity Contentions, Ex D-15, Dec. 9, 2024, 221 pages (SRAD_Ex-D-15_12-9-24), 3 parts.
Sportradar and Sportradar Group AG Amended Invalidity Contentions, Ex D-16, Dec. 9, 2024, 665 pages (SRAD_Ex-D-16_12-9-24), 13 parts.
Sportradar and Sportradar Group AG Amended Invalidity Contentions, Ex D-17, Dec. 9, 2024, 321 pages (SRAD_Ex-D-17_12-9-24), 6 parts.
Sportradar and Sportradar Group AG Amended Invalidity Contentions, Ex D-18, Dec. 9, 2024, 232 pages (SRAD_Ex-D-18_12-9-24), 4 parts.
Sportradar and Sportradar Group AG Amended Invalidity Contentions, Ex D-20, Dec. 9, 2024, 235 pages (SRAD_Ex-D-20_12-9-24), 3 parts.
Sportradar and Sportradar Group AG Amended Invalidity Contentions, Ex D-21, Dec. 9, 2024, 503 pages (SRAD_Ex-D-21_12-9-24), 5 parts.
Sportradar and Sportradar Group AG Amended Invalidity Contentions, Ex D-22, Dec. 9, 2024, 359 pages (SRAD_Ex-D-22_12-9-24), 7 parts.
Sportradar and Sportradar Group AG Amended Invalidity Contentions, Ex D-23, Dec. 9, 2024, 405 pages (SRAD_Ex-D-23_12-9-24), 3 parts.
Sportradar and Sportradar Group AG Amended Invalidity Contentions, Ex D-24, Dec. 9, 2024, 325 pages (SRAD_Ex-D-24_12-9-24), 4 parts.
Sportradar and Sportradar Group AG Amended Invalidity Contentions, Ex D-25, Dec. 9, 2024, 571 pages (SRAD_Ex-D-25_12-9-24), 6 parts.
Sportradar and Sportradar Group AG Amended Invalidity Contentions, Ex D-26, Dec. 9, 2024, 127 pages (SRAD_Ex-D-26_12-9-24).
Sportradar and Sportradar Group AG Amended Invalidity Contentions, Ex D-27, Dec. 9, 2024, 146 pages (SRAD_Ex-D-27_12-9-24), 2 parts.
Sportradar and Sportradar Group AG Amended Invalidity Contentions, Ex D-28, Dec. 9, 2024, 139 pages (SRAD_Ex-D-28_12-9-24), 2 parts.
Sportradar and Sportradar Group AG Amended Invalidity Contentions, Ex D-30, Dec. 9, 2024, 515 pages (SRAD_Ex-D-30_12-9-24), 5 parts.
Sportradar and Sportradar Group AG Amended Invalidity Contentions, Ex D-31, Dec. 9, 2024, 264 pages (SRAD_Ex-D-31_12-9-24), 4 parts.
Sportradar and Sportradar Group AG Amended Invalidity Contentions, Ex D-32, Dec. 9, 2024, 268 pages (SRAD_Ex-D-32_12-9-24), 2 parts.
Sportradar and Sportradar Group AG Amended Invalidity Contentions, Ex D-33, Dec. 9, 2024, 191 pages (SRAD_Ex-D-33_12-9-24), 3 parts.

(56) References Cited

OTHER PUBLICATIONS

Sportradar and Sportradar Group AG Amended Invalidity Contentions, Ex D-34, Dec. 9, 2024, 211 pages (SRAD_Ex-D-34_12-9-24), 4 parts.

Sportradar and Sportradar Group AG Amended Invalidity Contentions, Ex D-35, Dec. 9, 2024, 211 pages (SRAD_Ex-D-35_12-9-24), 4 parts.

Sportradar and Sportradar Group AG Amended Invalidity Contentions, Ex D-36, Dec. 9, 2024, 87 pages (SRAD_Ex-D-36_12-9-24), 2 parts.

Sportradar and Sportradar Group AG Amended Invalidity Contentions, Ex D-37, Dec. 9, 2024, 252 pages (SRAD_Ex-D-37_12-9-24), 2 parts.

Sportradar and Sportradar Group AG Amended Invalidity Contentions, Ex D-40, Dec. 9, 2024, 11 pages (SRAD_Ex-D-40_12-9-24).

Sportradar and Sportradar Group AG Amended Invalidity Contentions, Ex E-01, Dec. 9, 2024, 33 pages (SRAD_Ex-E-01_12-9-24).

Sportradar and Sportradar Group AG Amended Invalidity Contentions, Ex E-02, Dec. 9, 2024, 31 pages (SRAD_Ex-E-02_12-9-24).

Sportradar and Sportradar Group AG Amended Invalidity Contentions, Ex E-03, Dec. 9, 2024, 30 pages (SRAD_Ex-E-03_12-9-24).

Sportradar and Sportradar Group AG Amended Invalidity Contentions, Ex E-04, Dec. 9, 2024, 28 pages (SRAD_Ex-E-04_12-9-24).

Sportscastr Inc. (Patent Owner) Preliminary Response In IPR-2024-01307 served Dec. 19, 2024, 81 pages (IPR-2024-01307_Sportcastr_Prelim_Res_12-19-24).

* cited by examiner

253—5B

253—5A

253—5C

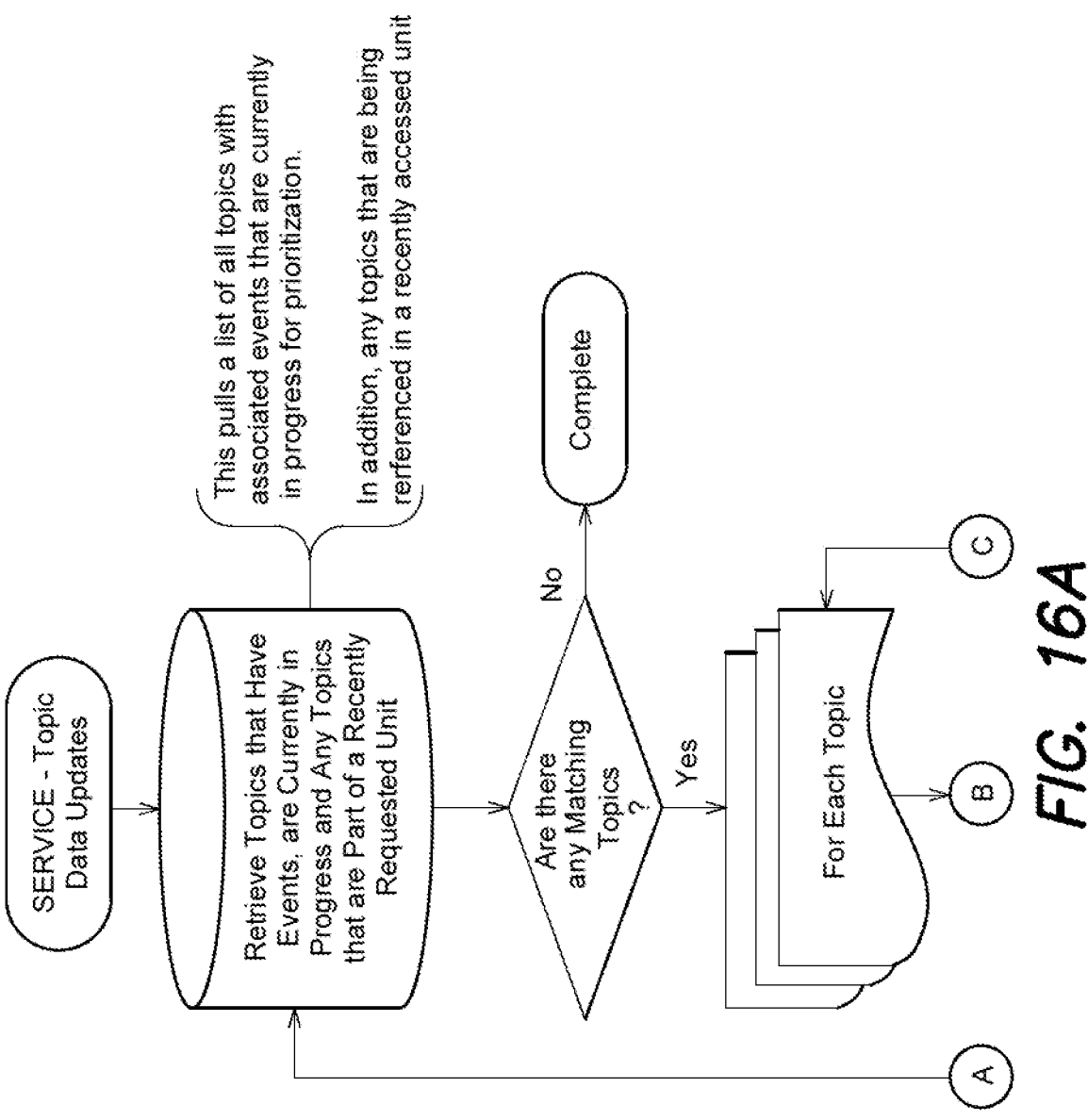

This pulls a list of all topics with associated events that are currently in progress for prioritization.

In addition, any topics that are being refferenced in a recently accessed unit

SERVICE – Topic Data Updates

Retrieve Topics that Have Events, are Currently in Progress and Any Topics that are Part of a Recently Requested Unit Are there any Matching Topics ?

Complete

For Each Topic

*FIG. 16A*

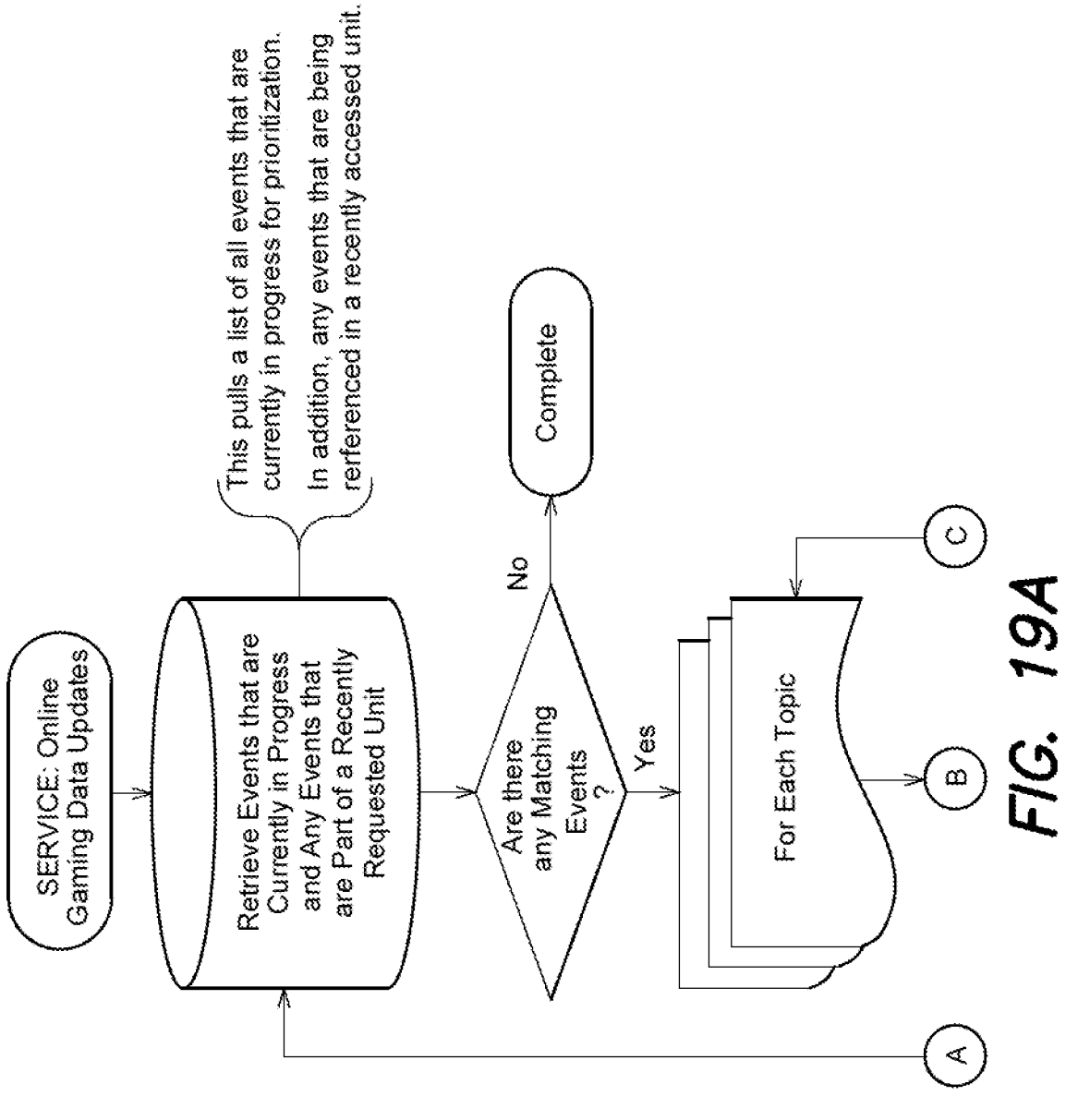

This pulls a list of all events that are currently in progress for prioritization.

In addition, any events that are being referenced in a recently accessed unit.

SERVICE: Online Gaming Data Updates

Retrieve Events that are Currently in Progress and Any Events that are Part of a Recently Requested Unit Are there any Matching Events ?

No — Complete

Yes

For Each Topic

In the case updates were found to existing data, the process immediately repeats loop in case of "highly active" events wherein the data is updating quickly

SYSTEMS, APPARATUS AND METHODS FOR TOPIC EXTRACTION FROM DIGITAL MEDIA AND REAL-TIME DISPLAY OF DIGITAL CONTENT RELATING TO ONE OR MORE EXTRACTED TOPICS

CROSS-REFERENCE TO RELATED APPLICATION

The present application is a bypass continuation of international application no. PCT/US2022/015713, filed on Feb. 8, 2022, entitled "Systems, Apparatus and Methods for Topic Extraction from Digital Media and Real-time Display of Digital Content Relating to One or More Extracted Topics," which claims a priority benefit to U.S. provisional application Ser. No. 63/147,131, filed on Feb. 8, 2021, entitled "Systems, Apparatus and Methods for Topic Extraction from Digital Media and Real-time Display of Digital Content Relating to One or More Extracted Topics," which application is incorporated by reference herein in its entirety.

BACKGROUND

The public's access to the Internet, as well as the amount of bandwidth for Internet users, increased greatly in the mid-1990s to the early 2000s and beyond. The available Internet bandwidth allowed for access to a wide variety of digital content, including the streaming of both recorded audio and recorded video content to a user's home. Also, additional increase of Internet access was sparked by the rise of the smartphone and the ability for smartphones to access the Internet on-the-go.

SUMMARY

The inventive concepts disclosed herein provide viewers/readers of primary digital content on a displayed page of a website or an app to be presented with a variety of additional ("secondary") digital content based on one or more topics extracted from the primary digital content.

For example, in the context of primary digital content relating to sports, the inventive concepts herein utilize machine learning and semantic matching techniques to extract particular topics of relevance relating to the sports-related primary digital content (e.g., a web-article about a sports event), and then present to the viewer relevant online gaming information (e.g., one or more bets) relating to the sports-related primary digital content based on the extracted topics. Other examples herein apply the disclosed inventive concepts to primary digital content relating to a variety of other topics, examples of which include, but are not limited to: finance, business and economics; entertainment (e.g., movies, television programming, celebrity personalities, etc.); hobbies; video games; shopping; health and wellness; food and culinary interests; nature; dieting; gardening; religion; dating; politics; culture; art; music (including playing and learning music); education; language; automotive; real estate; legal issues; and environmental issues.

In some implementations, secondary digital content based on one or more topics extracted from primary digital content (e.g., text in a news article) is presented to a viewer on a display (of a mobile computing device or laptop/desktop computer) in essentially real-time, i.e., as the viewer is also viewing the primary digital content. In the context of essentially real-time viewing of secondary digital content, in various implementations the inventive systems, apparatus and methods discussed in detail herein address one or more technological problems relating to viewer latency, synchronization amongst different numbers of viewers, and providing scalable and flexible access to primary and/or secondary digital content (e.g., in some cases to different classes/types of viewers and/or with different qualities of service).

In other implementations in which one or more topics extracted from primary digital content relate to an event with a temporal component, in some aspects the inventive systems, apparatus and methods described herein provide additional improvements in computer network functionality by facilitating scalable and appreciably low-latency synchronization of displayed secondary content amongst significant numbers of viewers. Accordingly, the inventive systems, apparatus and methods described herein specifically address multiple technological problems in conventional techniques relating to transport of digital content via the Internet by providing technological solutions to ensure a low-latency viewing experience for significant numbers of viewers as well as appropriate synchronization of secondary digital content for multiple viewers who are interested in and viewing the same or similar primary digital content.

In some implementations as discussed herein, these technological solutions contemplate multiple Internet communication channels to a given viewer device (also referred to herein as "client device") to provide relevant and synchronized information to multiple client devices. As would be readily appreciated in the relevant arts, a "communication channel" refers to a physical or logical connection over a transmission medium to convey information signals from one or more senders to one or more receivers. For example, in one implementation, a first "media" Internet communication channel (e.g., between a media server or other media source and a client device) conveys the primary digital content to one or more viewers, and a second "topic information" Internet communication channel (e.g., between a particular socket of a socket server and the client device) conveys the secondary digital content relating to one or more topics extracted from or related to the primary digital content. In other implementations, an additional "chat" Internet communication channel (e.g., between another socket of a socket server and the client device) is employed to convey chat information and other information relating to system events. In one aspect, connections between client devices and a particular socket of a socket server are persistent authenticated connections, so that the number of viewers connected to a particular socket may be tracked.

GLOSSARY

Topic: A classification of subject matter that may or may not include a temporal component. Examples of topics include, but are limited to: sports (including different types of sports, respective participants, teams, leagues, etc.); finance, business and economics; entertainment (e.g., movies, television programming, celebrity personalities, etc.); hobbies; video games; shopping; health and wellness; food and culinary interests; nature; dieting; gardening; religion; dating; politics; culture; art; music (including playing and learning music); education; language; automotive; real estate; legal issues; and environmental issues (e.g., global warming, space exploration).

Event: A temporally-linked occurrence associated with a topic. Examples of events include, but are not limited to, a variety of sports games (e.g., professional, semi-professional, intramural, community-oriented) or sporting activities (e.g., exercise-related activities, physical training activities, fishing, hunting), musical performances, theatrical performances, other artistic or entertainment-oriented activities, speeches or presentations, political activities (e.g., election-related activities, campaign-related activities, public or "town hall" meetings, public marches or demonstrations), military activities, professional activities (e.g., meetings or conferences), academic or educational activities (e.g., academic presentations or lectures, research activities, medical or scientific procedures, ceremonies), cooking or baking activities, competitive activities (e.g., racing activities), game-related activities (e.g., online gaming such as betting, board games, chess matches, role playing games), social activities, and news-related activities. In view of the foregoing, it may be appreciated that an event has a temporal component, whereas a topic more generally relates to a classification of subject matter that may or may not include a temporal component; thus, all events relate to one or more topics, but not all topics are (or are related to) events.

Topic Extraction Platform (TEP): The disclosed systems, apparatus, and methods for topic extraction from digital media (e.g., digital text sources), also referred to herein as "primary digital content," and embedding of "secondary digital content" relating to one or more topics extracted from the primary digital content for display on a webpage or in an application ("app") for consumption by a viewer. In some implementations, the secondary digital content is displayed in tandem with the primary digital content on a display of a viewer device.

TEP Unit: A content box having a particular size and placement on a web page or in an application view to contain secondary digital content for embedding in a webpage or an app.

Embedded/Injected Content: Secondary digital content that is included in a TEP unit on a webpage or in an application via (e.g., via iframe, web view, SDK, or direct injection).

User/Site Owner: An entity (e.g., a website owner or application developer) that utilizes the Topic Extraction Platform to embed/inject one or more TEP units on one or more webpages or applications curated by the entity.

Viewer (or Visitor): A person who interfaces, via a mobile application (or "app") or web portal accessed on a client device communicatively coupled to the Internet, with one or more of the various servers and corresponding server functionality described herein. Accordingly, a viewer is a visitor of a Site Owner's webpage or app (via a viewer client device) in which a TEP unit is embedded/injected in the webpage or app (in some instances in tandem with the primary digital media itself from which one or more topics are extracted). A viewer may be a "registered viewer" that provides profile information and validation credentials to establish a user account so as to access, via a login process using the validation credentials, the one or more of the various servers and corresponding server functionality described herein. Alternatively a viewer may be an "anonymous viewer," e.g., a non-registered user that has access, without requiring a login process, to a limited feature set based on the server functionality described herein.

Viewer (or Visitor) Profile: A viewer/visitor profile contains all information gathered by the TEP based on, but not limited to, a viewer/visitor's browser fingerprint, content seen, webpages visited, secondary digital content embedded in a TEP unit content, viewer/visitor interaction with a TEP unit, logs, and externally provided information from the viewer/visitor themselves (e.g., I am a member of sportsbook "X"). In example implementations, the TEP may utilize any information in a viewer/visitor profile to process primary digital content, rank and/or filter topics extracted from primary digital content, and/or otherwise select/prepare secondary digital content for embedding in a TEP unit.

Display Page URL: The Internet address or location identifier (Uniform Resource Locator) in which a TEP unit is embedded/injected. In example implementations relating to web pages, the display page typically contains the primary digital content. The display page URL is most often a website URL but could also be a "virtual page" inside an app presented via a web view.

Application View: The display of an app that a Viewer/Visitor is currently consuming/interacting with.

Application content information: Information (text, transcript, etc.) that is being displayed in an app and serving, at least in part, as primary digital content from an app.

Request: A single instance of a viewer client device requesting secondary digital content for embedding/injecting in TEP unit in a webpage or application view being viewed.

Requestor: An application (mobile or server based) that accesses the Topic Extraction Platform via an API (Application Programming Interface) or SDK (Software Development Kit).

Param(eter)s: Content information provided by the Requestor to an API or SDK for analysis and targeting.

Control Server(s): One or more server(s) of the Topic Extraction Platform that control(s) background tasks and updates relating to the provision of secondary digital content (e.g., ingress of topic data).

Web Server(s): One or more server(s) that build(s) content for injection into one or more webpages of a Site Owner. One or more webservers also provide(s) API access for use by one or more TEP Units for updates to secondary digital content, as well as interactions with a given TEP unit by a viewer.

Caching Server: An intermediary layer between the control server(s) and the web server(s).

Database Server: A platform-agnostic data storage system.

Socket Server(s)/Socket(s): A server that accepts and maintains dedicated connections between viewer client devices and one or more sockets of the socket server. A socket may also refer to a persistent http/2 connection that allows for a "push" from the socket server to a viewer client device.

Socket Channel: Refers to either a dedicated socket connection for a topic or a subscription in a single shared channel to the topic.

Feed: A source of data for a topic (e.g., a Topic Information Provider). A topic information provider may be queried by, and respond to, xml, json, and direct API requests. There may be more than one feed used to populate the data for a topic. Examples of feed sources/topic information providers include, but are not limited to, FanDuel SportsBook bet feed, Yahoo Finance API, and other data aggregators or single point data providers.

Topic Data: Data that is retrieved from a feed about a topic. Topic data may include, but is not limited to, general information, specific information, associated topics, entity information, event information, real time quantitative data (e.g., stock prices, betting information), availability of associated objects (tickets), merchandise availability, and/or participant information.

Normalize Data: The process of converting raw feed data for a topic into a standardized format for storing by the Database Server and sending to viewer client devices via socket channels.

Async(hronous) Queue: A first-in-first-out queue of platform events to be processed by one or more worker programs.

One example implementation is directed to a method, comprising: A) receiving a request from a viewer client device, via at least one webserver, to embed secondary digital content in a topic extraction platform (TEP) unit on a webpage or in an application view of an app displayed on the viewer client device, wherein: the webpage or the application view of the app displayed on the viewer client device includes primary digital content; and the secondary digital content to embed relates to a first topic present in the primary digital content; B) transmitting to the viewer client device, via the at least one webserver, the secondary digital content for embedding in the TEP unit on the webpage or in the application view of the app displayed on the viewer client device, wherein the secondary digital content is derived from topic information retrieved via at least one control server from at least one topic information provider; C) establishing a persistent connection with the viewer client device via a dedicated topic socket of at least one socket server coupled to the at least one control server; and D) transmitting to the viewer client device, via the dedicated topic socket of the at least one socket server coupled to the at least one control server, updated secondary digital content derived from updated topic information retrieved via the at least one control server from the at least one topic information provider. In one aspect, the primary digital content includes a news article about a sports team, and the secondary digital content includes betting information regarding an upcoming event involving the sports team.

Another example implementation is directed to a method, comprising: A) transmitting a request from a viewer client device, via at least one webserver, to embed secondary digital content in a topic extraction platform (TEP) unit on a webpage or in an application view of an app displayed on the viewer client device, wherein: the webpage or the application view of the app displayed on the viewer client device includes primary digital content; and the secondary digital content to embed relates to a first topic present in the primary digital content; B) receiving at the viewer client device, via the at least one webserver, the secondary digital content for embedding in the TEP unit on the webpage or in the application view of the app displayed on the viewer client device, wherein the secondary digital content is derived from topic information retrieved via at least one control server from at least one topic information provider; and C) receiving at the viewer client device, via a persistent connection to a dedicated topic socket of at least one socket server coupled to the at least one control server, updated secondary digital content derived from updated topic information retrieved via the at least one control server from the at least one topic information provider.

The following publications and/or applications are hereby incorporated by reference herein in their entirety: U.S. Pat. No. 11,039,218, issued Jun. 15, 2021, entitled SYSTEMS, APPARATUS AND METHODS FOR RENDERING DIGITAL CONTENT RELATING TO A SPORTING EVENT WITH ONLINE GAMING INFORMATION; PCT Application no. PCT/US2022/014999, filed Feb. 2, 2022, entitled SYSTEMS, APPARATUS AND METHODS FOR RENDERING DIGITAL CONTENT; and U.S. provisional application Ser. No. 63/144,718, filed Feb. 2, 2021, entitled SYSTEMS, APPARATUS AND METHODS FOR RENDERING DIGITAL CONTENT.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 16A and 16B show a process flow diagram for a topic data updates service method performed by the control server of FIGS. 10 and 11, according to some inventive embodiments.

FIGS. 19A and 19B show a process flow diagram for an online gaming data updates service method performed by the control server of FIGS. 10 and 11, according to some inventive implementations.

DETAILED DESCRIPTION

Following below are more detailed descriptions of various concepts related to, and implementations of, inventive systems, methods and apparatus for topic extraction from digital media and real-time display of digital content relating to one or more extracted topics. It should be appreciated that various concepts introduced above and discussed in greater detail below may be implemented in various manners, and that examples of specific implementations and applications are provided primarily for illustrative purposes.

I. Overview

The inventive concepts disclosed herein provide viewers/readers of primary digital content on a displayed page of a website or an app to be presented with a variety of additional ("secondary") digital content based on one or more topics extracted from the primary digital content. The systems, apparatus, and methods disclosed herein for topic extraction from primary digital content (e.g., digital text sources) and embedding secondary digital content relating to one or more topics extracted from the primary digital content for display on a webpage or in an application ("app") for consumption by a viewer is referred to herein as a "Topic Extraction Platform" (TEP).

Figure 1:
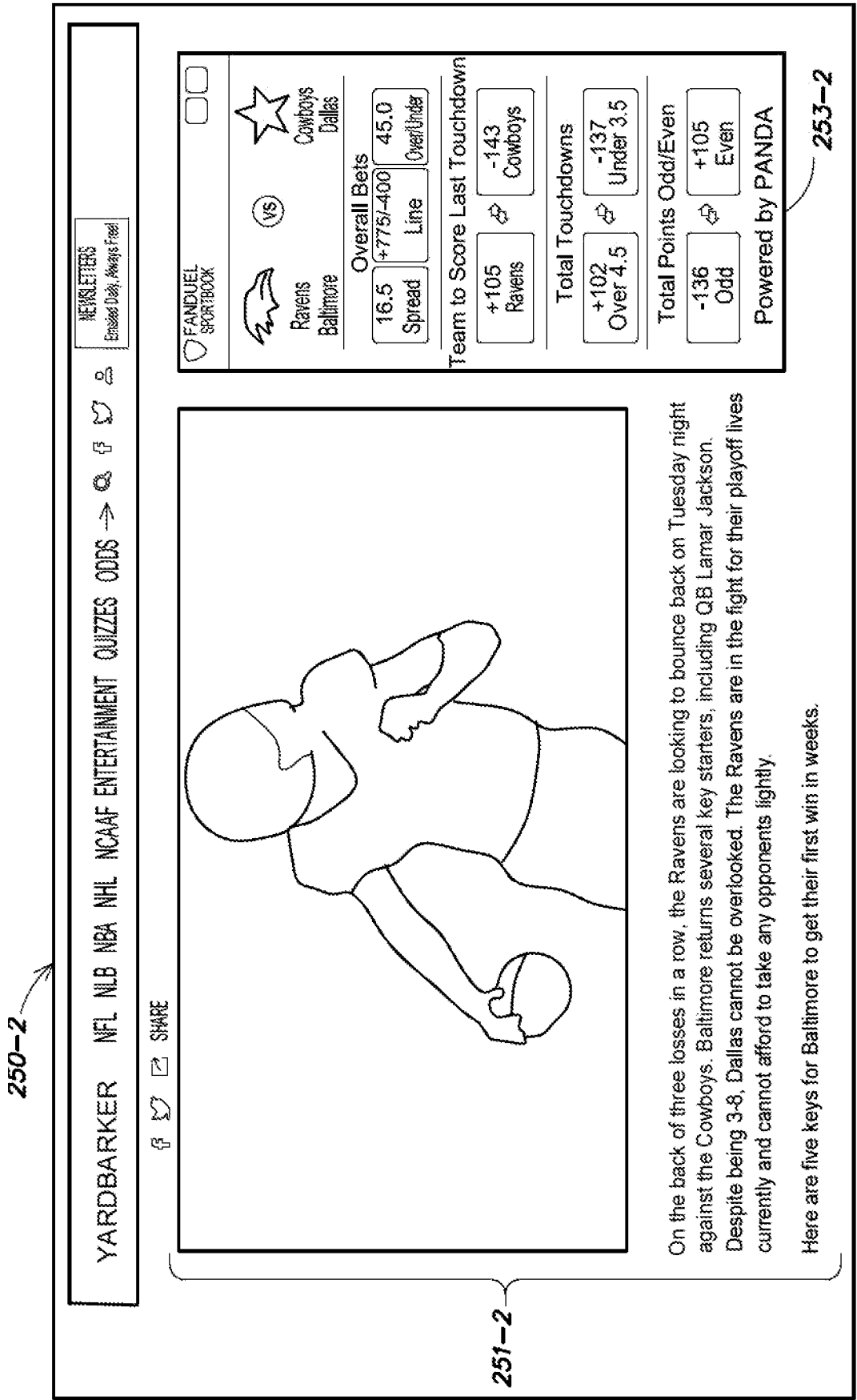
FIG. 1 shows a display of a viewer client device that includes primary digital content relating to sports (e.g., football) in a webpage and embedded secondary digital content in the webpage (e.g., betting information) that relates to a topic present in the primary digital content (e.g., one or more sports teams), according to some inventive implementations.

FIG. 1 shows a display 250-2 of a viewer client device (e.g., a mobile computing device such as a smartphone, or a laptop or desktop computer) showing a webpage that includes primary digital content 251-2 relating to sports (e.g., football) and embedded secondary digital content 253-2 in the webpage (e.g., betting information) that relates to a topic present in the primary digital content (e.g., one or more sports teams), pursuant to the TEP according to some inventive implementations. More specifically, in FIG. 1, the primary digital content 251-2 is a sports news article mentioning the Baltimore Ravens and Dallas Cowboys football teams, and the secondary digital content 253-2 displayed in tandem with the article includes online gaming information (e.g., one or more bets) related to the Ravens and Cowboys, based on these topics being mentioned in and extracted from the article.

Figure 2:
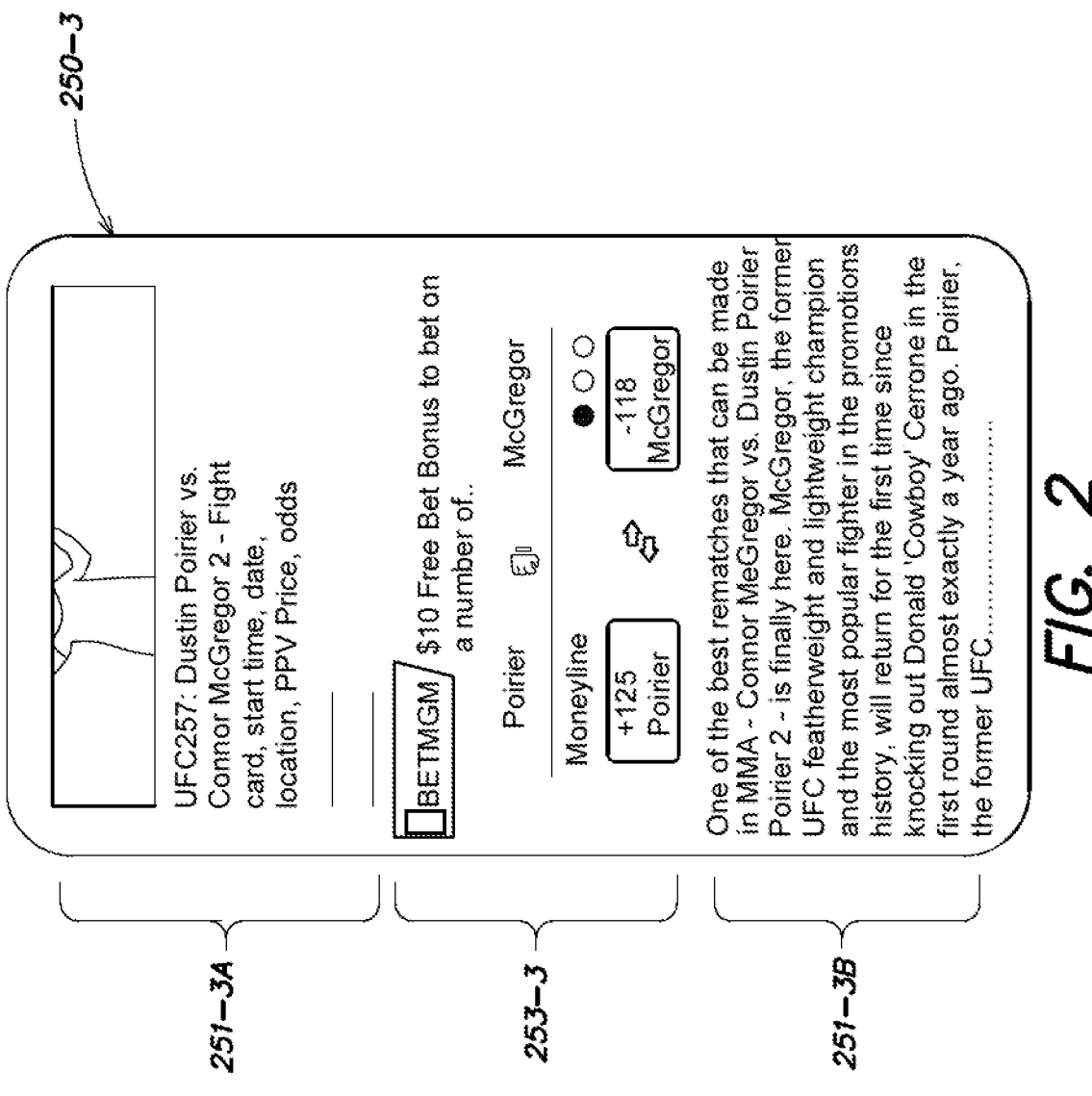
FIG. 2 shows a display of a viewer client device that includes primary digital content relating to sports (e.g., boxing) in an application view of an app and embedded secondary digital content in the application view (e.g., betting information) that relates to a topic present in the primary digital content (e.g., the participants), according to some inventive implementations.

Similarly, FIG. 2 shows a display 250-3 of a viewer client device (e.g., a smartphone) that includes primary digital content 251-3A and 251-3B relating to sports (e.g., boxing)

in an application view of an app and embedded secondary digital content 253-3 in the application view (e.g., betting information) that relates to a topic present in the primary digital content (e.g., the participants), pursuant to the TEP according to some inventive implementations. More specifically, in FIG. 2 the primary digital content 251-3A and 251-3B is a sports news article relating to Mixed Martial Arts and an upcoming Ultimate Fighting Championship (UFC 257), and the secondary digital content 253-3 displayed in tandem with the article includes online gaming information (e.g., one or more bets) related to the participants, based on these topics being mentioned in and extracted from the article. As may be readily appreciated in FIG. 2, and as discussed below in connection with FIGS. 4A-8C, the secondary digital content may be displayed in a variety of positions and sizes with respect to the primary digital content on the display of the viewer client device.

Figure 3:
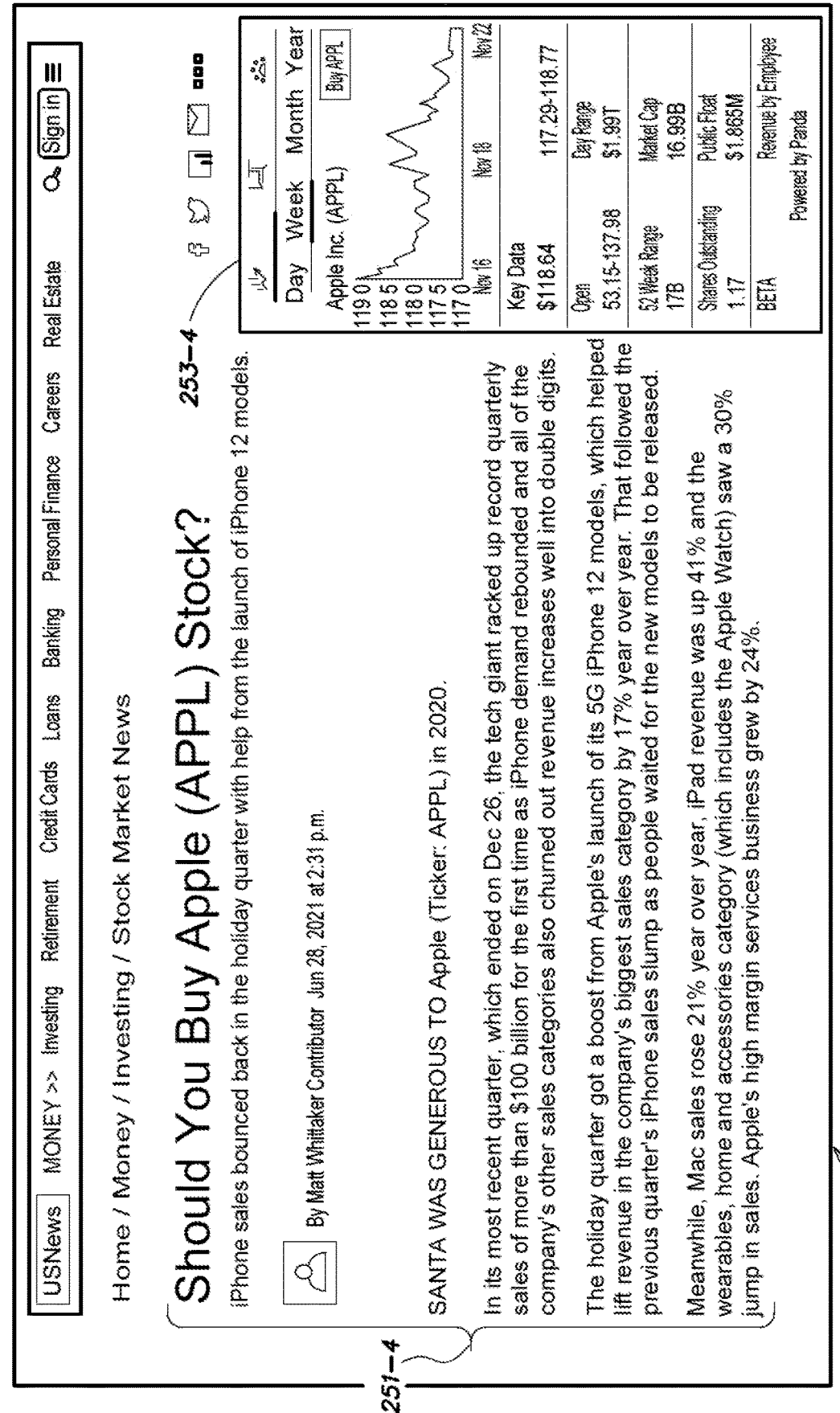
FIG. 3 shows a display of a viewer client device that includes primary digital content relating to finance in a webpage and embedded secondary digital content in the webpage (e.g., stock price information) that relates to a topic present in the primary digital content (e.g., Apple stock), according to some inventive implementations.

In yet another example, FIG. 3 shows a display 250-4 of a viewer client device showing a webpage that includes primary digital content 251-4 relating to business information on technology companies and embedded secondary digital content 253-4 in the webpage (e.g., stock price information) that relates to a topic present in the primary digital content (e.g., Apple stock), pursuant to the TEP according to some inventive implementations. More specifically, in FIG. 3, the primary digital content 251-4 is a news article about Apple and sales of iPhones, and the secondary digital content 253-4 displayed in tandem with the article includes stock information relating to Apple, based on this topic being mentioned in and extracted from the article.

As can be readily appreciated from the foregoing figures, a wide variety of topics may be extracted from primary digital content and serve as the basis for providing secondary digital content pursuant to the TEP. In general, as used herein, a "topic" is a classification of subject matter that may or may not include a temporal component. Examples of topics include, but are limited to: sports (including different types of sports, respective participants, teams, leagues, etc.); finance, business and economics; entertainment (e.g., movies, television programming, celebrity personalities, etc.); hobbies; video games; shopping; health and wellness; food and culinary interests; nature; dieting; gardening; religion; dating; politics; culture; art; music (including playing and learning music); education; language; automotive; real estate; legal issues; and environmental issues (e.g., global warming, space exploration).

A subset of topics that include a temporal component are referred to herein as "events." In general, as used herein, an "event" is a temporally-linked occurrence associated with a topic. Examples of events include, but are not limited to, a variety of sports games (e.g., professional, semi-professional, intramural, community-oriented) or sporting activities (e.g., exercise-related activities, physical training activities, fishing, hunting), musical performances, theatrical performances, other artistic or entertainment-oriented activities, speeches or presentations, political activities (e.g., election-related activities, campaign-related activities, public or "town hall" meetings, public marches or demonstrations), military activities, professional activities (e.g., meetings or conferences), academic or educational activities (e.g., academic presentations or lectures, research activities, medical or scientific procedures, ceremonies), cooking or baking activities, competitive activities (e.g., racing activities), game-related activities (e.g., online gaming such as betting, board games, chess matches, role playing games), social activities, and news-related activities. In view of the foregoing, it may be appreciated that an event has a temporal component, whereas a topic more generally relates to a classification of subject matter that may or may not include a temporal component; thus, all events relate to one or more topics, but not all topics are (or are related to) events.

With reference again to the example shown in FIG. 1, the site owner of the webpage that provides the primary digital content 251-2 is Yardbarker; in the example of FIG. 2, the site owner of the app providing the primary digital content 251-3A and 251-3B is The Athletic and in the example of FIG. 3 the site owner of the app providing the primary digital content 251-4 is U.S. News. As discussed in greater detail below, in example implementations a given site owner wishing to support the provision of secondary digital content in one or more of their webpages or application views pursuant to a TEP according to the concepts disclosed herein would define one or more "topic extraction platform units" (TEP units) in a given webpage or application view to contain secondary digital content. In one aspect, a given TEP unit may be defined by the site owner to have a particular size and/or placement on the webpage or in the application view.

Figures 4A, 4B, 4C:
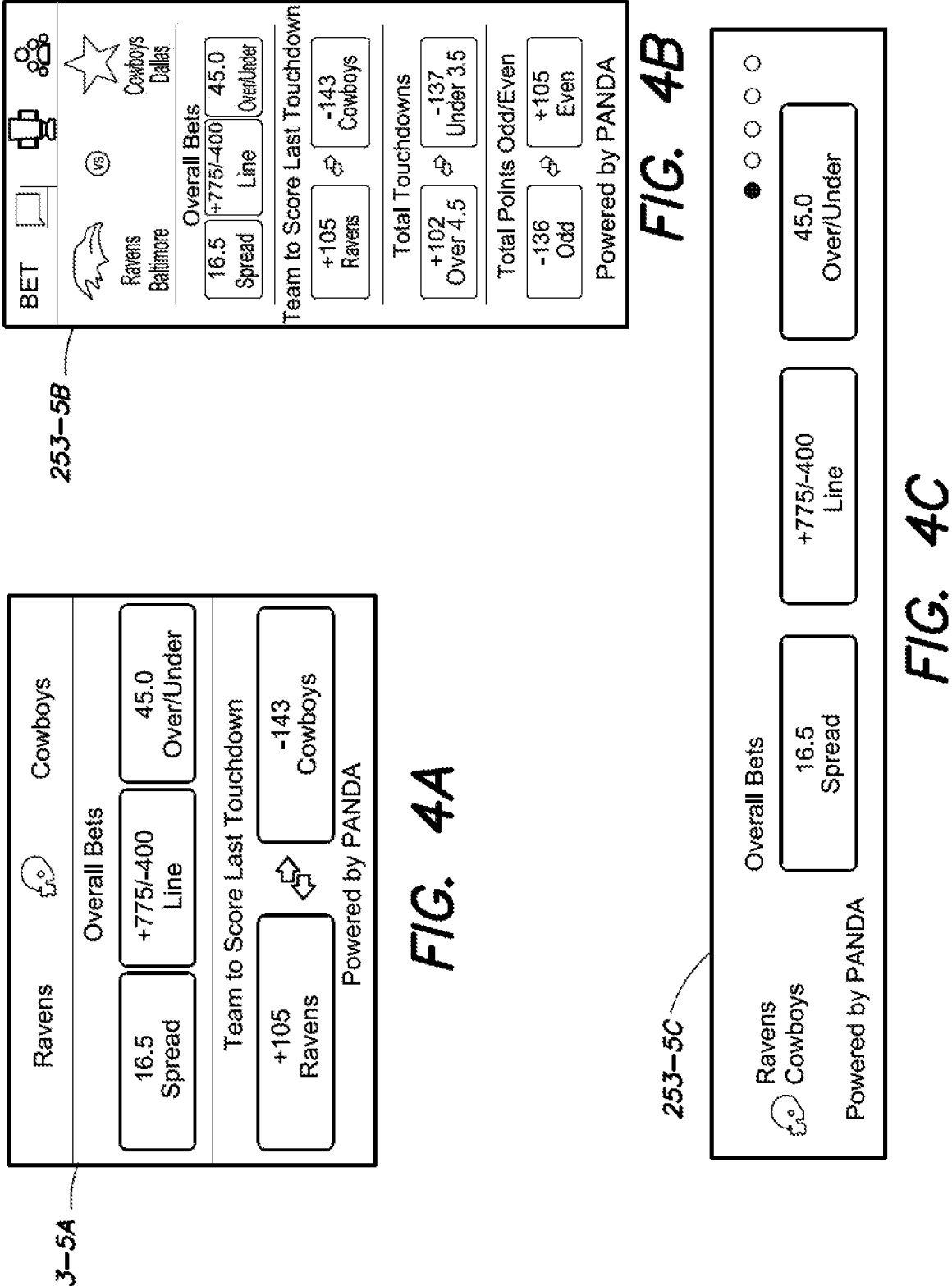
FIGS. 4A, 4B and 4C respectively illustrate different types (e.g., sizes and content) of topic extraction platform (TEP) units that may be embedded in a webpage or application view of an app to contain secondary digital content relating to betting information, according to some inventive implementations.
Figures 5A, 5B, 5C:
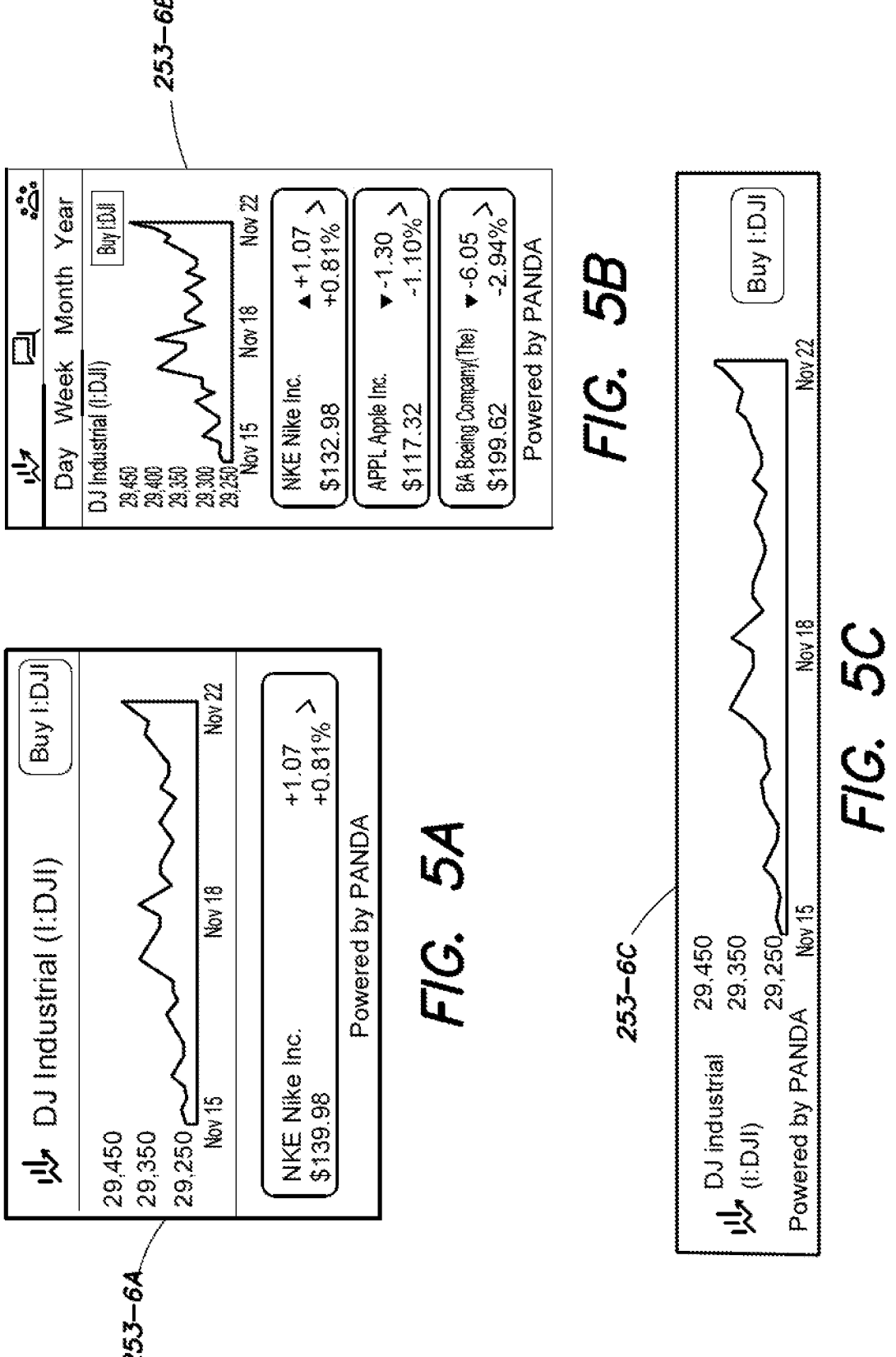
FIGS. 5A, 5B and 5C respectively illustrate different types (e.g., sizes and content) of topic extraction platform (TEP) units that may be embedded in a webpage or application view of an app to contain secondary digital content relating to financial information (e.g., stock index performance), according to some inventive implementations.
Figures 6A, 6B, 6C:
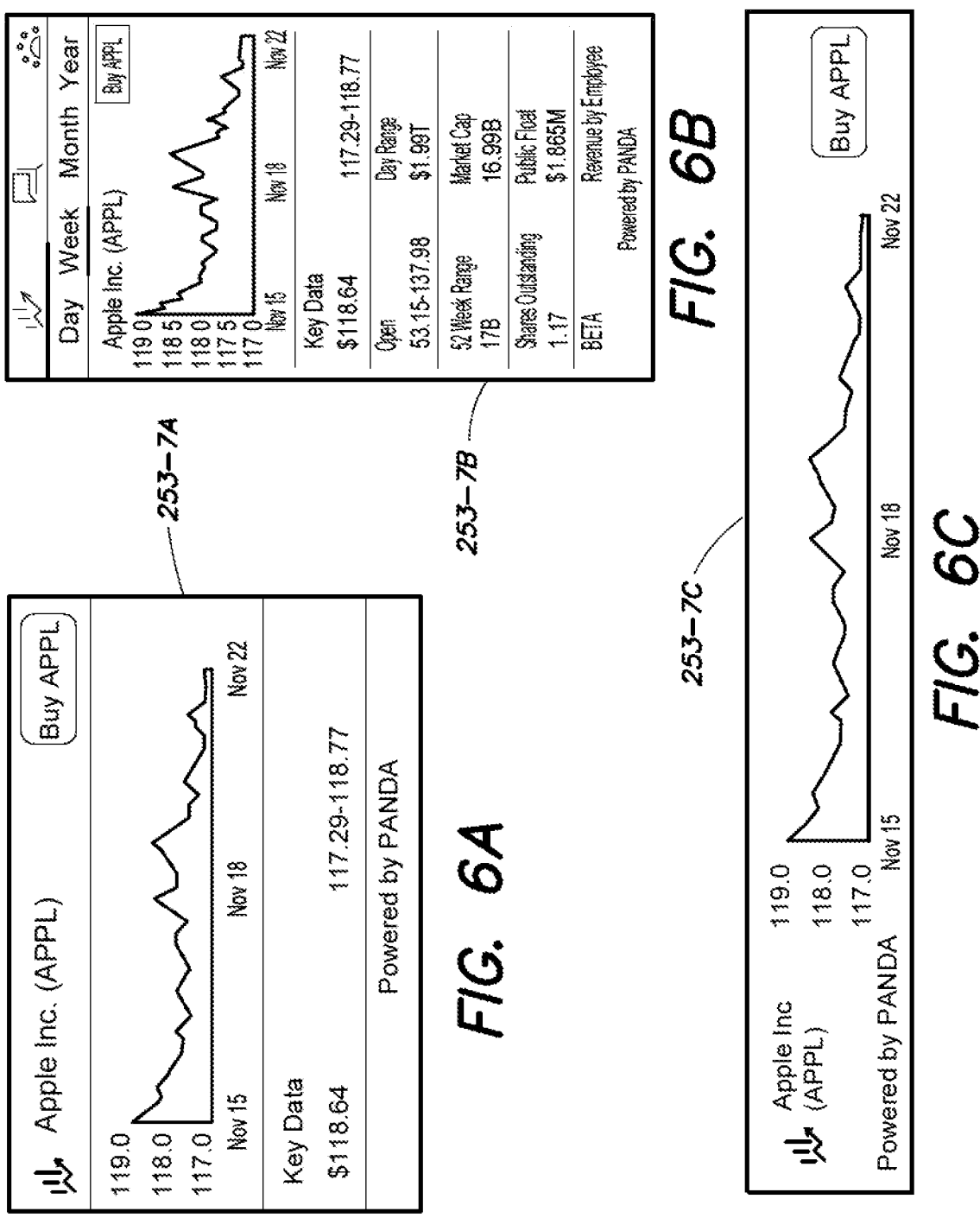
FIGS. 6A, 6B and 6C respectively illustrate different types (e.g., sizes and content) of topic extraction platform (TEP) units that may be embedded in a webpage or application view of an app to contain secondary digital content relating to financial information (e.g., stock price performance), according to some inventive implementations.
Figures 7A, 7B, 7C:
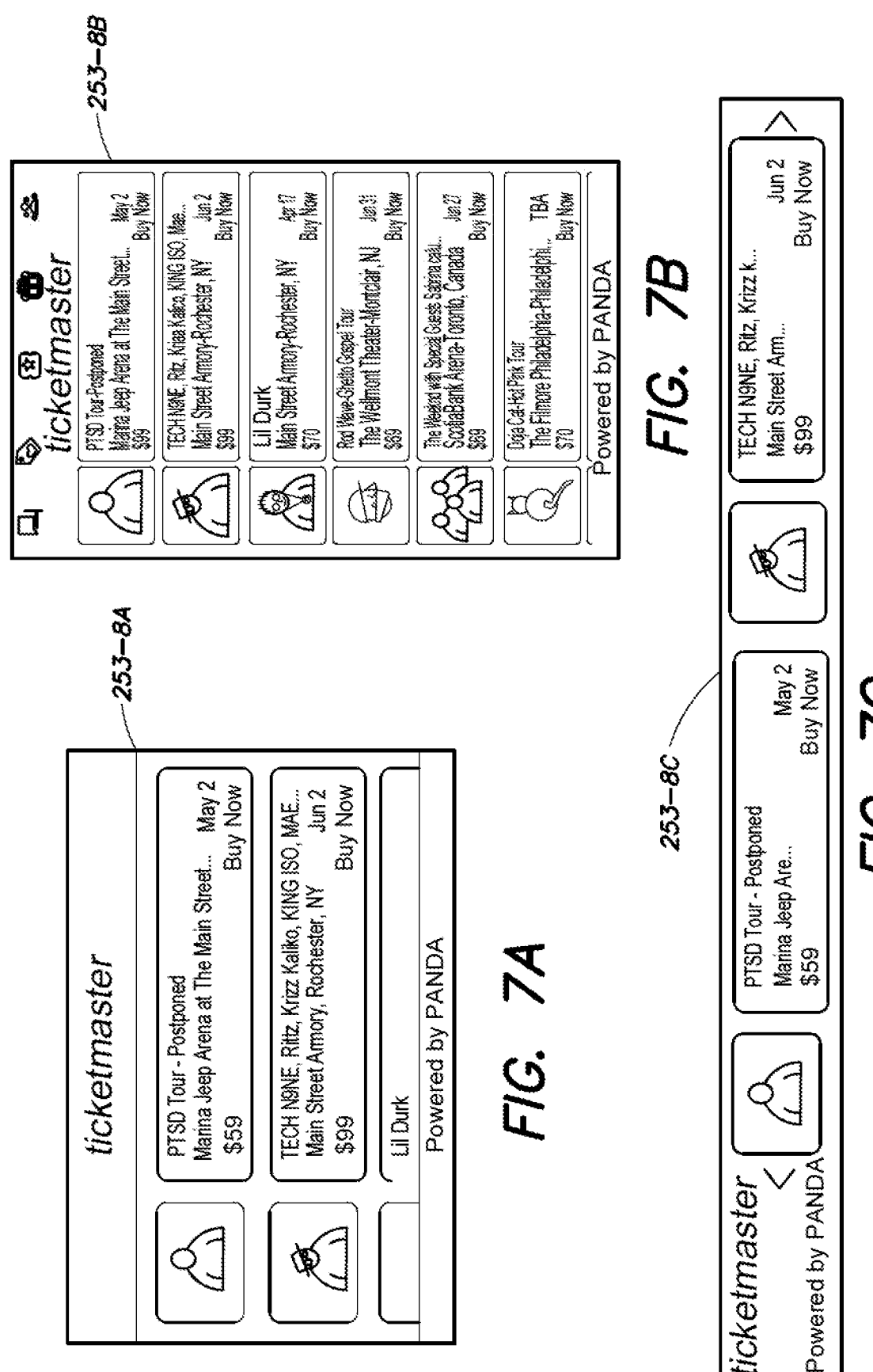
FIGS. 7A, 7B and 7C respectively illustrate different types (e.g., sizes and content) of topic extraction platform (TEP) units that may be embedded in a webpage or application view of an app to contain secondary digital content relating to entertainment information (e.g., general concert ticket availability), according to some inventive implementations.
Figures 8A, 8B, 8C:
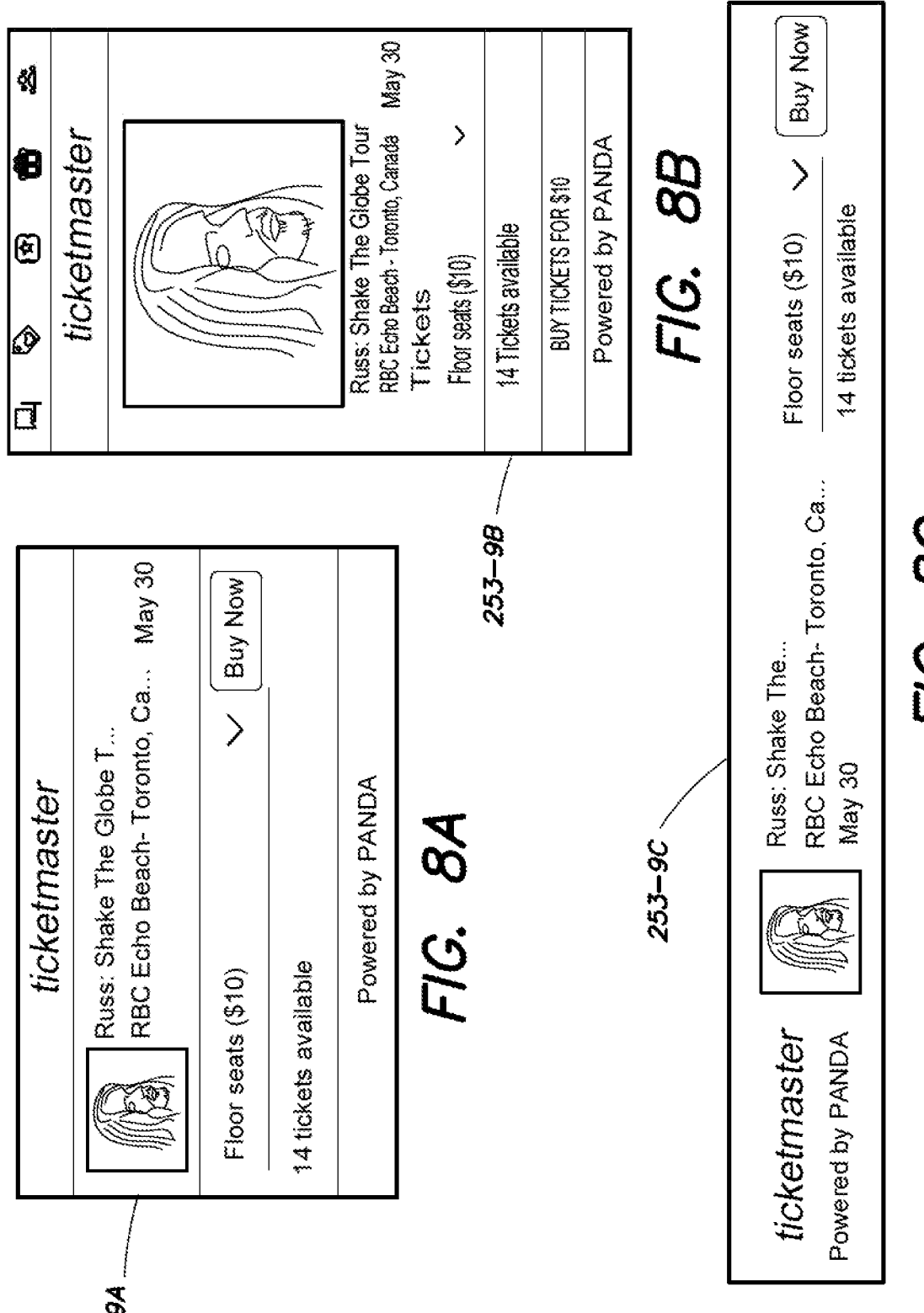
FIGS. 8A, 8B and 8C respectively illustrate different types (e.g., sizes and content) of topic extraction platform (TEP) units that may be embedded in a webpage or application view of an app to contain secondary digital content relating to entertainment information (e.g., specific concert ticket availability), according to some inventive implementations.

To this end, FIGS. 4A, 4B and 4C respectively illustrate different types (e.g., sizes and content) of topic extraction platform (TEP) units to contain different versions of secondary digital content 253-5A, 253-5B and 253-5C relating to betting information that may be embedded in a webpage or application view of an app, according to some inventive implementations. Similarly, FIGS. 5A, 5B and 5C respectively illustrate different types (e.g., sizes and content) of topic extraction platform (TEP) units to contain different version of secondary digital content 253-6A, 253-6B, and 253-6C relating to financial information (e.g., stock index performance) that may be embedded in a webpage or application view of an app, according to some inventive implementations. FIGS. 6A, 6B and 6C respectively illustrate different types (e.g., sizes and content) of topic extraction platform (TEP) units to contain different versions of secondary digital content 253-7A, 253-7B and 253-7C relating to financial information (e.g., stock price performance) that may be embedded in a webpage or application view of an app, according to some inventive implementations. FIGS. 7A, 7B and 7C respectively illustrate different types (e.g., sizes and content) of topic extraction platform (TEP) units to contain different versions of secondary digital content 253-8A, 253-8B and 253-8C relating to entertainment information (e.g., general concert ticket availability) that may be embedded in a webpage or application view of an app, according to some inventive implementations. Finally, FIGS. 8A, 8B and 8C respectively illustrate different types (e.g., sizes and content) of topic extraction platform (TEP) units to contain different versions of secondary digital content 253-9A, 253-9B and 253-9C relating to entertainment information (e.g., specific concert ticket availability) that may be embedded in a webpage or application view of an app, according to some inventive implementations.

Figure 9:
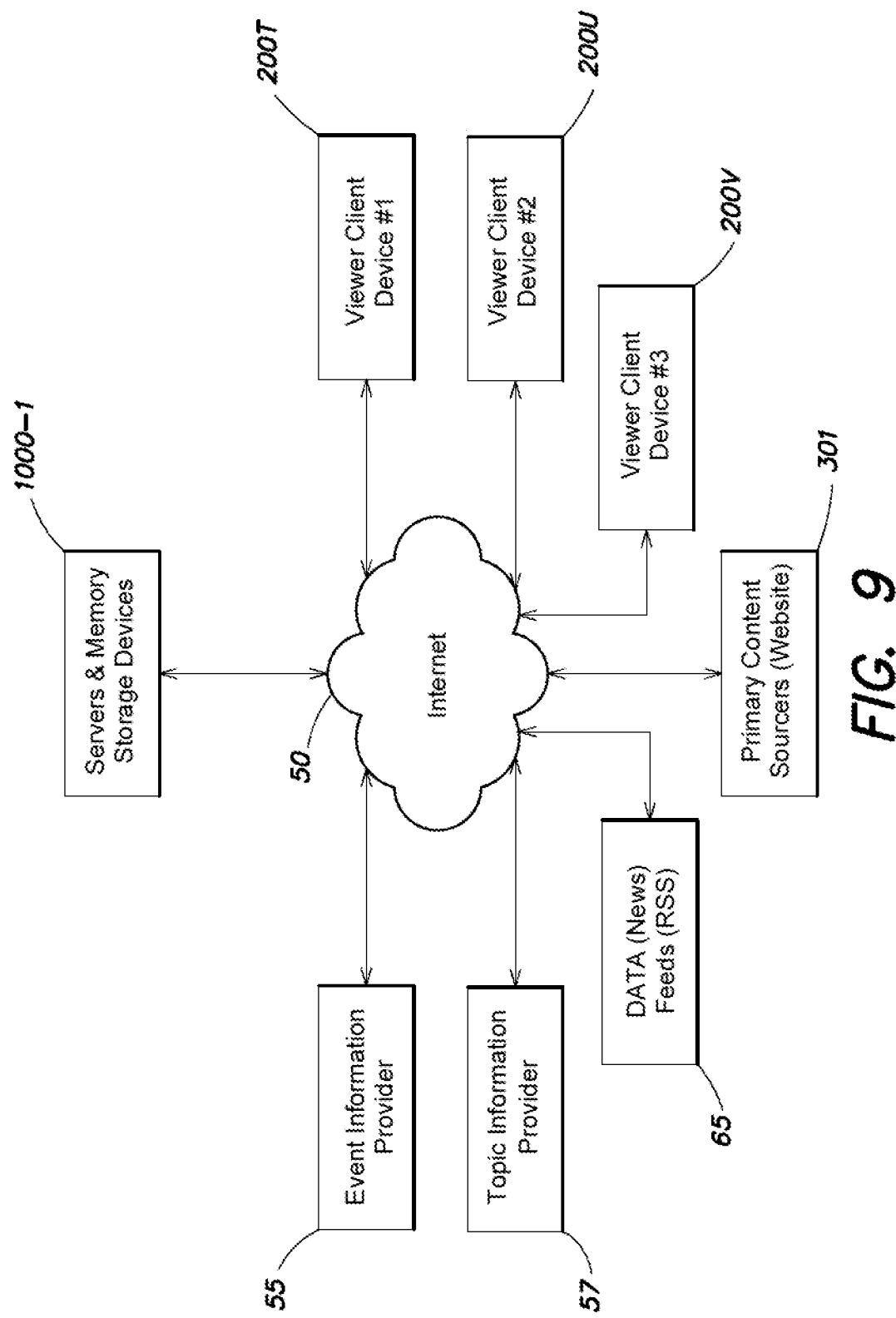
FIG. 9 is a block diagram showing the interconnectivity of a Topic Extraction Platform with multiple viewer client devices, primary content sources, and various information providers, according to some inventive implementations.

FIG. 9 is a block diagram showing the interconnectivity of a Topic Extraction Platform that includes memory and storage devices 1000-1 with multiple viewer client devices 200T, 200U, 200V, primary digital content sources 301 (e.g., that provide webpages of websites or application content information for apps), and various information providers (e.g., an event information provider 55, a topic information provider 57, and one or more RSS/API data (news) feeds 65), wherein respective elements are communicatively coupled via the Internet 50, according to some inventive implementations.

Although FIG. 9 illustrates three viewer client devices, it should be appreciated that various numbers of client devices are contemplated by the systems, apparatus and methods disclosed herein, and those shown in FIG. 9 are for purposes of illustration. With respect to topics, events or news on which secondary digital content may be based, the servers and memory storage devices of the Topic Extraction Platform 1000-1 may retrieve various topic information from the topic information provider 57 (e.g., various Internet information sources such as Wikipedia (en.wikipedia.org/wiki/ Main_Page), the Yahoo Finance API (for real time market information), the Coinmarketcap API (for real time cryptocurrency pricing), and Ticketmaster (ticketmaster.com; for real time ticketing availability), and various online gambling/betting platforms (e.g., FanDuel SportsBook, Bovada, William Hill). Similarly, the servers and memory storage devices of the Topic Extraction Platform 1000-1 may retrieve various event information from the event information provider 55 (e.g., STATS LLC), and various news from RSS/API data/news feeds 65.

In some implementations, the servers and memory storage devices of the Topic Extraction Platform 1000-1 maintain user profiles for viewers that receive secondary digital content on their viewer client devices. Each user profile may be associated with, for example, a viewer email address, viewer device, or other unique identifier. Each user profile interface (e.g., "page" such as a webpage) may include and/or be customized with content (e.g., a profile photo, descriptive text, user-generated multimedia, subscription information relating to various sources of primary digital content, favorite team imagery, etc.).

II. Topic Extraction Platform—Servers and Memory Storage Devices

Figure 10:
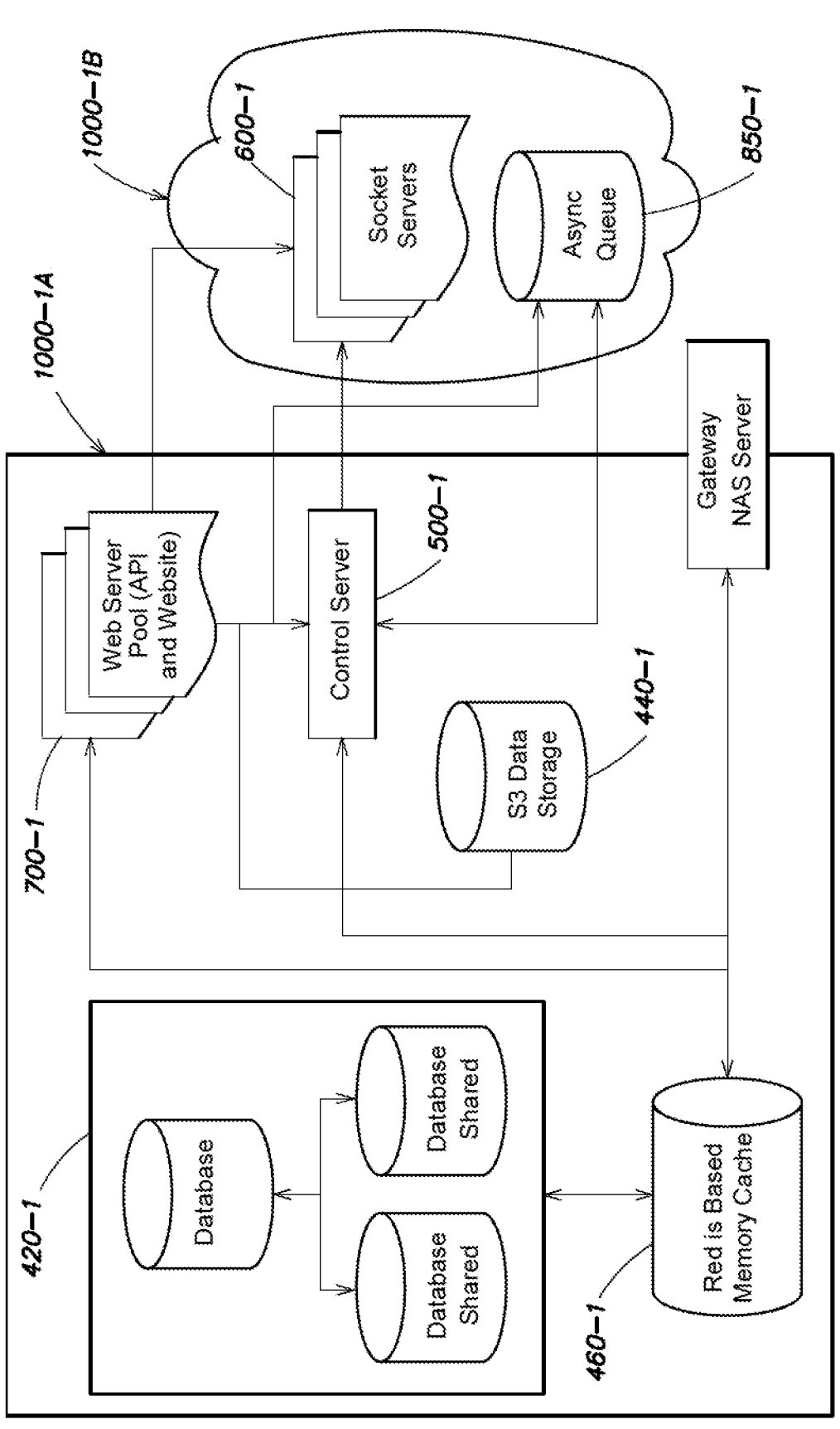
FIG. 10 is a block diagram showing additional details of the various servers, memory storage devices and other components of the Topic Extraction Platform shown in FIG. 9, according to some inventive implementations.

Having provided an overview of the information flow and general functionality enabled by the various elements shown in FIG. 9, additional details of the servers and memory storage devices of the Topic Extraction Platform (TEP) 1000-1 are now discussed, with reference initially to FIG. 10. The general architecture and function of certain constituent elements of the Topic Extraction Platform 1000-1 are also discussed in U.S. Pat. No. 11,039,218, issued Jun. 15, 2021, entitled SYSTEMS, APPARATUS AND METHODS FOR RENDERING DIGITAL CONTENT RELATING TO A SPORTING EVENT WITH ONLINE GAMING INFORMATION; PCT Application no. PCT/US2022/014999, filed Feb. 2, 2022, entitled SYSTEMS, APPARATUS AND METHODS FOR RENDERING DIGITAL CONTENT; and U.S. provisional application Ser. No. 63/144,718, filed Feb. 2, 2021, entitled SYSTEMS, APPARATUS AND METHODS FOR RENDERING DIGITAL CONTENT, each of which is incorporated by reference herein in its entirety.

As shown in FIG. 10, in one example implementation some of the components 1000-1A of the TEP are hosted by a first web hosting service (e.g., Amazon Web Services AWS), while one or more other components 1000-1B of the TEP may be hosted by a different web hosting service and/or generally accessible via the Internet. In yet other implementations, a single web hosting service may host all of the servers and memory storage devices of the TEP.

As shown in FIG. 10, in one inventive implementation the TEP includes one or more web servers 700-1 (also referred to herein as a "web server pool") that support an Applications Programming Interface (API) to facilitate communications between the TEP and one or more viewer client devices, as well as between the TEP and one or more source of primary digital content. In this role, as discussed in further detail below, much of the instructive communication between the viewer client devices and the TEP occurs via the web server(s) 700-1. For example, it is via the web server(s) 700-1 that a given viewer client device makes requests for secondary digital content to be embedded in one or more TEP units, and it is also via the web server(s) 700-1 that a given viewer client device receives secondary digital content for embedding. The web server(s) 700-1 are communicatively coupled to a memory system that includes a database 420-1, data storage 440-1, and one or more memory caches 460-1 to store various information (e.g., user profile information for viewers, site owner information and definitions/ defaults/preferences relating to TEP units and/or associated topics, topic information, event information, online gaming information, etc.) germane to the operation of the servers and memory storage devices of the TEP and the various client devices.

The TEP 1000-1A and 1000-1B shown in FIG. 10 further comprises one or more control servers 500-1 communicatively coupled to the database 420-1, data storage 440-1 and memory cache 460-1. One of the salient functions of the control server(s) 500-1 (referred to in the singular hereinafter for convenience) is to ingress various information relating to one or more topics discussed in and extracted from the primary digital content, so as to provide secondary digital content for embedding into one or more TEP units.

To this end, the control server 500-1 may gain access to the topic information provider 57, the event information provider 55 and one or more RSS/API data feeds 65 (via the Internet 50 shown in FIG. 9). In one aspect, the control server 500-1 periodically retrieves various topic information from the topic information provider 57, event information from the event information provider 55 and/or news from the news feeds 65 that is germane to one or more topics extracted from primary digital content. In another aspect, the control system 500-1 may store at least some portion of retrieved topic and/or event information and/or other data from RSS/API feeds news in the database 420-1, data storage 440-1, and/or memory cache 460-1. More generally, as discussed below in connection with FIG. 12, the control server 500-1 implements a number of services/processes that govern various functionality of the TEP; examples of such control system services/processes include, but are not limited to: a topic extraction process (FIGS. 13A and 13B); a topic ranking and pruning process (FIGS. 14A and 14B); a topic data ingress process (FIGS. 15A and 15B); a topic data updates process (FIGS. 16A and 16B); an event data ingress process (FIGS. 17A and 17B); an online gaming data ingress process (FIGS. 18A and 18B); an online gaming data updates process (FIGS. 19A and 19B); an RSS/API data feed ingress process (FIG. 20); an asynchronous task processor (FIG. 21); and an RSS/API data feed processor (FIG. 22).

With reference again to FIG. 10, the TEP 1000-1A and 1000-1B further comprises one or more socket servers 600-1 communicatively coupled to the web server(s) 700-1 and the control server(s) 500-1. In one aspect, the socket server(s) 600-1 facilitate communication to viewer client devices of synchronized updates to topic information, event information (including online gaming information or betting information) and or data from RSS/API data feeds retrieved by the control server 500-1. In particular, one or more sockets of the socket server(s) are dedicated to a particular topic or event to allow respective viewer client devices to establish a topic information channel or event information channel with the socket server(s), such that the topic information or event information (including online gamine information or betting information) is shared in a synchronized manner by multiple viewers receiving the same secondary digital content.

In one aspect, connections between a given viewer client device and a particular socket of a socket server are persistent authenticated connections (e.g., with IP-based fingerprint identifiers for anonymous users). The authenticated connection allows the TEP to track how many viewer client devices are connected to a particular socket at any given time. In another aspect, the various "messages" (e.g., topic messages, event messages) that are carried on the respective channels between a viewer given client device and corresponding sockets of the socket server(s) are data packets including various topic information and/or event information (including betting information) for updating secondary digital content that is embedded in a webpage or application view in essentially real time.

In this regard, and with reference again for the moment to FIG. 1, the combined functionality of the web server(s) 700-1, the control server(s) 500-1 and the socket server(s) 600-1 of the TEP shown in FIG. 10 facilitate an example implementation referred to as Contextually Updated Betting (CUB). For an example TEP implementing CUB, sports betting information may be presented to a viewer as secondary digital content 253-2 on a display 250-2 of a viewer client device based on the context provided by the primary digital content 251-2 (e.g., topics discussed in and extracted from the primary digital content, such as particular teams, players, or sporting events). As a viewer navigates to different primary digital content, updated sports betting information may be presented to the viewer as updated secondary digital content based on one or more topics present in and extracted from the different primary digital content.

Figure 11:
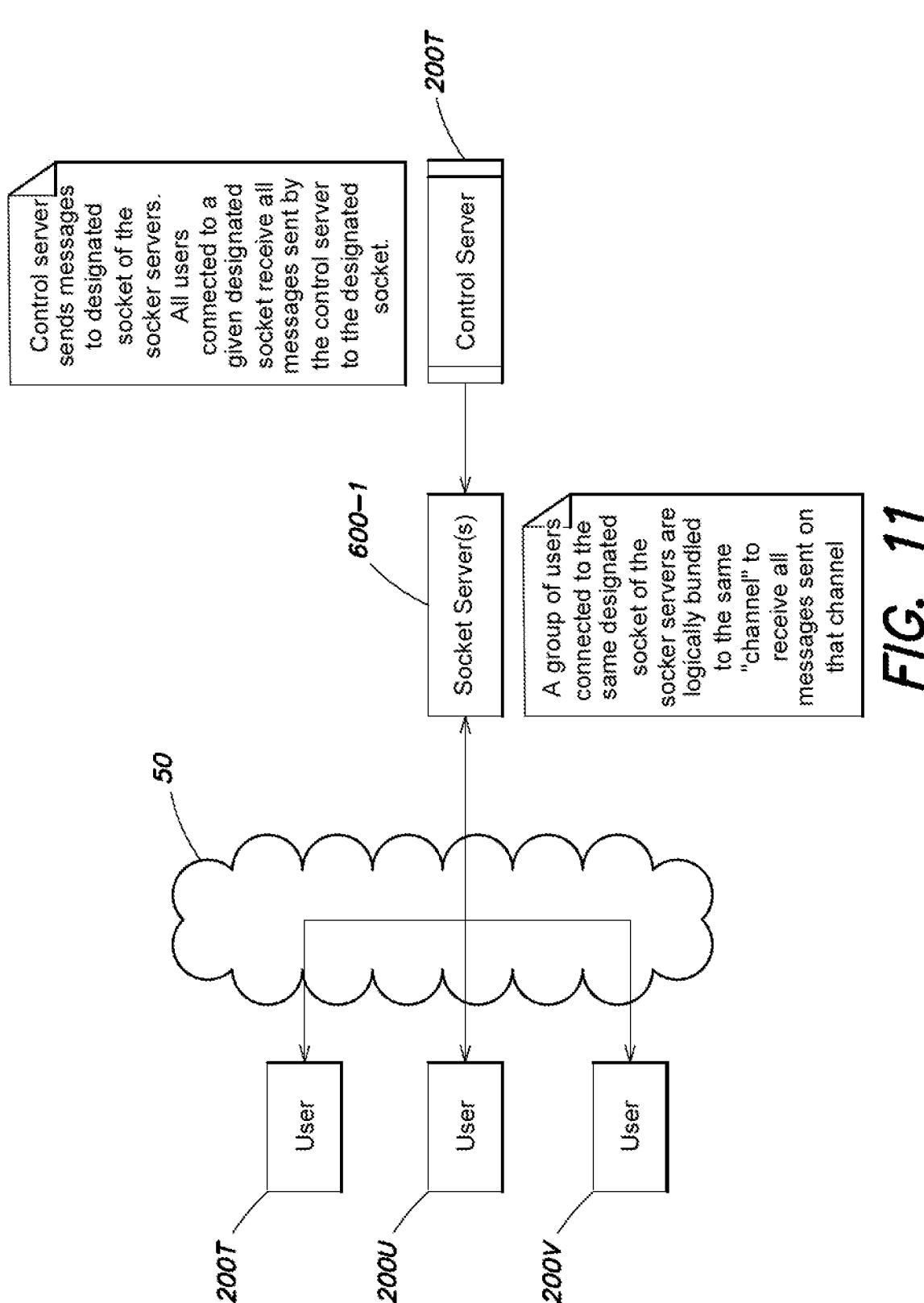
FIG. 11 is a block diagram outlining the operation of a control server and a socket server of the Topic Extraction Platform shown in FIG. 10 to provide information relating to secondary digital content to one or more viewer client devices, according to some inventive implementations.

FIG. 11 is a block diagram outlining some of the functionality of the control server 500-1 and the socket server(s) 600-1 of the Topic Extraction Platform 1000-1A and 1000-1B shown in FIG. 10 to provide information (and particularly updates) relating to secondary digital content to one or more viewer client devices, according to some inventive implementations. As discussed above, the control server 500-1 periodically retrieves, via the Internet and from one or more of a topic information provider 57, an event information provider 55, or an RSS/API data (news) feed 65, various information relating to a selected topic extracted from primary digital content, which information serves as a basis for providing secondary digital content to a webpage or application view on a viewer client device. The control server 500-1 sends messages with information relating to a particular topic to designated sockets of the socket servers for that particular topic. All viewer client devices connected to the designated socket (e.g., via an Internet URL for the socket) receive all of the messages sent by ("pushed by") the control server to the designated socket. Stated differently, a group of viewers connected to the same designated socket of the socket server(s) 600-1 are logically bundled to the same information channel to receive all messages sent on that channel.

As discussed further below, in some example implementations the web server(s) 700-1 may provide to a first viewer client device 200T a first topic identifier (a first TopicID) that corresponds to a first topic socket of the socket server(s) 600-1; the web server(s) 700-1 also may provide to a second viewer client device 200U a second topic identifier (a second TopicID) that corresponds to a second topic socket of the socket servers. The first viewer client device 200T uses the first TopicID to connect to the first topic socket (e.g., via a first URL including the first TopicID in a path of the URL), and the second viewer client device 200U uses the second TopicID to connect to the second topic socket (e.g., via a second URL including the second TopicID in a path of the URL). First topic information is then transmitted to the first viewer client device 200T via a first topic information Internet communication channel between the first topic socket and the first viewer client device 200T, and second topic information is transmitted to the second viewer client device 200U via a second topic information Internet communication channel between the second event socket and the second viewer client device 200U.

With reference again to FIG. 10, FIG. 10 also shows that the TEP may further include an asynchronous queue 850-1 (e.g., for queuing of various messages and instructions to be acted upon by an asynchronous task processor implemented by the control server 500-1), and a gateway NAS server 870-1 (e.g., to facilitate communications between other elements of the servers and memory storage devices 1000-1A that may be hosted by the first web hosting service). Additionally, FIG. 10 illustrates that the database 420-1 may include a main database and multiple database shards, in which portions of data are placed in relatively smaller shards, and the main database acts as a directory for the database shards (in some implementations, the main database also stores some de-normalized data, for example, to facilitate cross-server searching).

III. TEP Unit Creation

As noted above, a given site owner of a website that curates multiple webpages or an app that presents multiple application views creates topic extraction platform units (TEP units) for embedding in their webpage(s) or application views to contain secondary digital content provided by the TEP. The definition of TEP units may vary significantly depending in part on respective site owners' requirements. In some examples, a site owner specifies the displayed size and format for a given TEP unit and may optionally select a primary default topic for the TEP unit on which secondary digital content to be embedded in the TEP unit is based or derived. In one aspect, a primary default topic specified by a site owner for a TEP unit may be used by the TEP (and, more particularly, one or more services performed by the control server, as discussed further below) as a weighting factor for topic selection to provide secondary digital content. In another aspect, if a site owner provides a primary default topic, the TEP uses this default topic to select secondary digital content for embedding in the TEP unit. In yet another aspect, a site owner may specify a relative weighting to prioritize multiple topics on which secondary digital content to be embedded in the TEP unit may be based (e.g., one or more topics that "bubble to the top" depending on an analysis of the primary digital content).

In an example implementation, a given site owner that wishes to use the services of the TEP provides TEP unit definitions to the TEP, which definitions and associated parameters are stored in one or more of the memory components of the TEP (e.g., the database 420-1, the data storage 440-1, the memory cache 460-1). In turn, the TEP provides to the site owner a code and URL to access the TEP, which code is included in the TEP unit definition on a given webpage or application view of an app. When a webpage or application view including the TEP unit is accessed by a viewer client device (e.g., via a browser executing on the viewer client device), a request is made by the viewer client device to the TEP to embed in the TEP unit secondary digital content pursuant to the various concepts disclosed herein and discussed in further detail below.

IV. Functional Outline of TEP

As a predicate to a detailed discussion of the respective components of the Topic Extraction Platform (TEP), the general functional outline of the TEP is first presented.

As noted above, when a viewer client device accesses a webpage or application view including a TEP unit, a request is made by the viewer client device to the web server(s) 700-1 of the TEP to embed in the TEP unit secondary digital content. In one aspect, the request may include the display page URL for the primary digital content, application content information for the primary digital content, or other parameters (e.g., if the viewer client device is accessing the TEP via an API or SDK).

In one example, the web server(s) 700-1 first checks one of the memory components (e.g., the database 420-1) to see if a topic list already exists for the display page URL. If the request is the first request for the display page URL, the web server(s) pass the request to the control server 500-1 to analyze the primary digital content and extract one or more topics from the primary digital content. To this end, the control server 500-1 transmits the display page URL or the primary digital content itself to a third-party service to extract topics from the primary digital content (e.g., using semantic language parsing techniques). An example of a third-party service includes, but is not limited to, Dandelion API (dandelion.eu), which is a set of semantic APIs to extract meaning and insights from texts in several languages (Italian, English, French, German and Portuguese). Dandelion API extracts entities (such as persons, places and events), categorizes and classifies documents in user-defined categories, and augments text with tags and links to external knowledge graphs. The controller then parses the topics that are returned from the third-party service and performs an initial filtering and ranking of the returned topics, pursuant to various services described in detail further below (and shown in various flow charts in the accompanying drawings).

Following the initial filtering and ranking of topics performed by various services of the control server, the web server(s) 700-1 perform some additional sorting and ranking based at least in part on particular viewer information and/or ongoing/live events that are associated with one or more candidate topics. The web server(s) 700-1 then select a topic on which the secondary digital content will be based, and passes this to the control server. The control server then ingresses various topic information, event information, and/or data from one or more RSS/API data feeds relating to the selected topic, normalizes the ingressed information, and stores the information in the database 420-1. The web server(s) 700-1 then prepare the secondary digital content based on the information stored in the database by the control server, and transmits the secondary digital content to the requesting viewer client device.

In another aspect, the web server(s) 700-1 may also transmit to the viewer client device a URL for a dedicated topic socket of a socket server 600-1, to which the control server provides subsequent updates to the topic information on which the secondary digital content is based. In this manner, the viewer client device may receive real-time updates to the secondary digital content via a persistent connection to the dedicated topic socket. Additionally, in implementations in which a viewer may interact with the secondary digital content, viewer interactions with the secondary digital content (e.g., placing a bet by clicking on a portion of the secondary digital content) may be processed by the TEP via the connection between the viewer client device and the socket server.

V. Control Server and Associated Services/Processes

Figure 12:
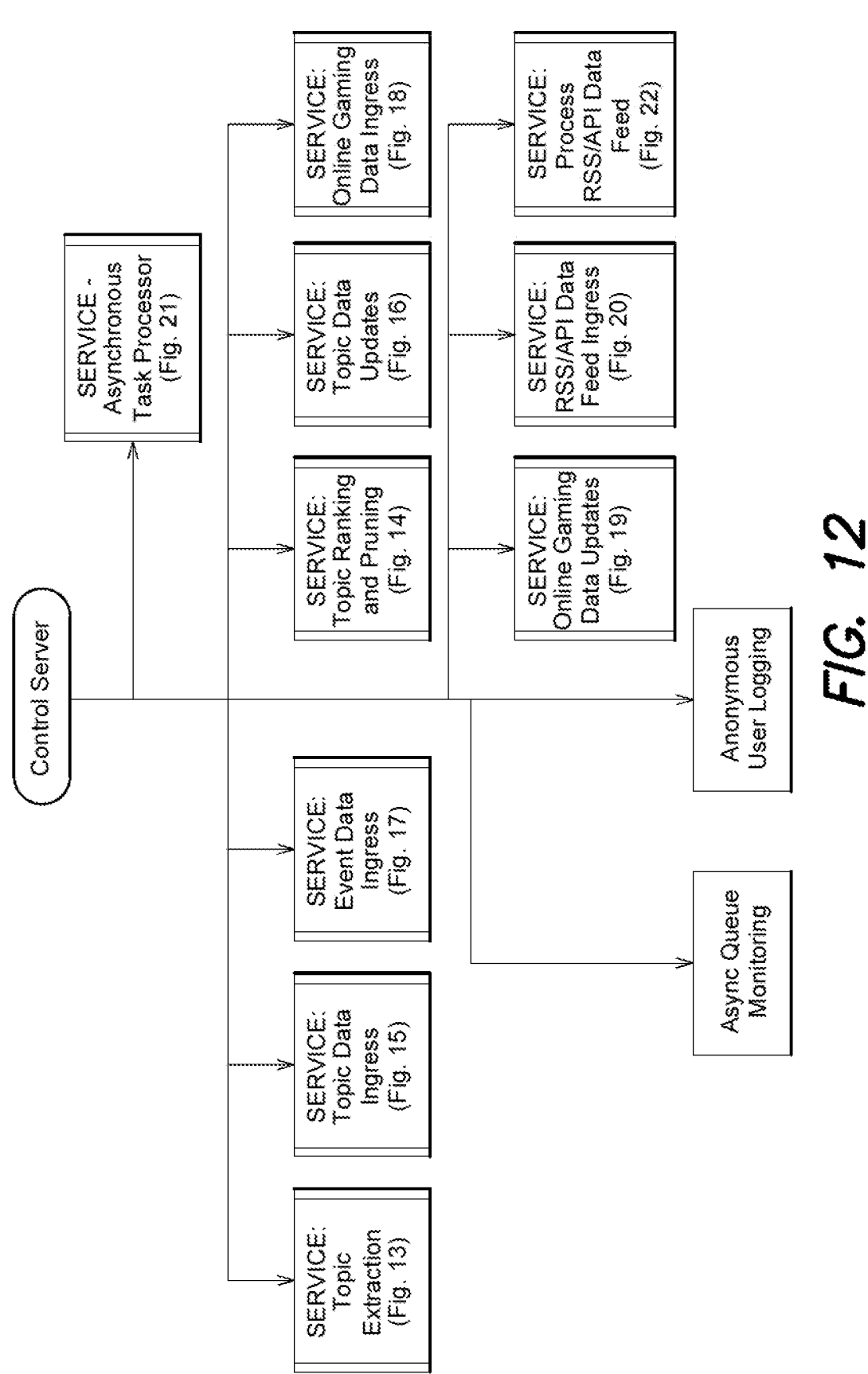
FIG. 12 illustrates some of the functionality (e.g., services and other processes) performed by the control server shown in FIGS. 10 and 11, according to some inventive implementations.

FIG. 12 illustrates some of the functionality (e.g., services and other processes) performed by the control server 500-1 shown in FIGS. 10 and 11, according to some inventive implementations. As noted above, the control server 500-1 is coupled to the web server(s) 700-1, various memory components, one or more topic information providers 57, one or more event information providers 55, one or more RSS/API data (news) feeds 65 or other news sources, and the socket server(s) 600. In general, the control server is responsible for preliminarily facilitating the extraction of one or more topics from primary digital content, and then ingesting information from one or more various information sources, wherein the information is related to a selected topic that was extracted from the primary digital content.

To this end, the control server employs multiple different services to accomplish its various functionality. These services work in concert to first parse and rank a list of extracted topics, and then based on a selected topic, obtain topic information from one or more information sources, parse the obtained information, normalize the information, obtain information (e.g., online gaming/betting information) associated with one or more events relating to a selected topic, store various obtained information in one or more of the memory components (e.g., database 420-1), and push updates to topic information to viewer client devices via one or more socket channels dedicated to the selected topic. In various aspects, the control server may either make requests to obtain information from information sources directly, or may employ an asynchronous queue and respective ingress services.

Accordingly, as shown in several of the accompanying figures, the control server 500-1 implements a number of services/processes that govern various functionality of the TEP; examples of such control system services/processes include, but are not limited to: a topic extraction process (FIGS. 13A and 13B); a topic ranking and pruning process (FIGS. 14A and 14B); a topic data ingress process (FIGS. 15A and 15B); a topic data updates process (FIGS. 16A and 16B); an event data ingress process (FIGS. 17A and 17B); an online gaming data ingress process (FIGS. 18A and 18B); an online gaming data updates process (FIGS. 19A and 19B); an RSS/API data feed ingress process (FIG. 20); an asynchronous task processor (FIG. 21); and an RSS/API data feed processor (FIG. 22).

Figure 13A:
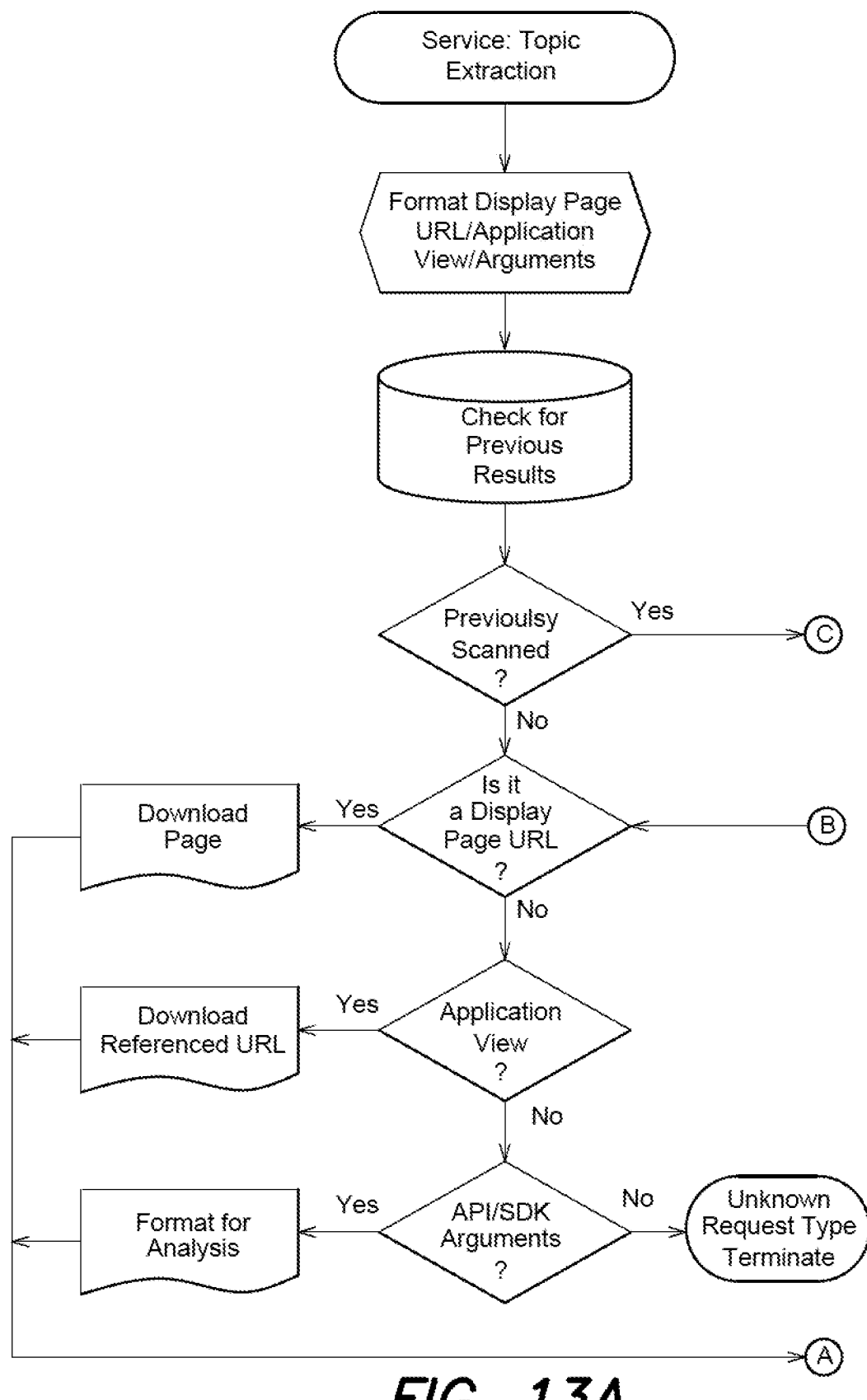
FIGS. 13A and 13B show a process flow diagram for a topic extraction service method performed by the control server of FIGS. 10 and 11, according to some inventive embodiments.
Figure 13B:
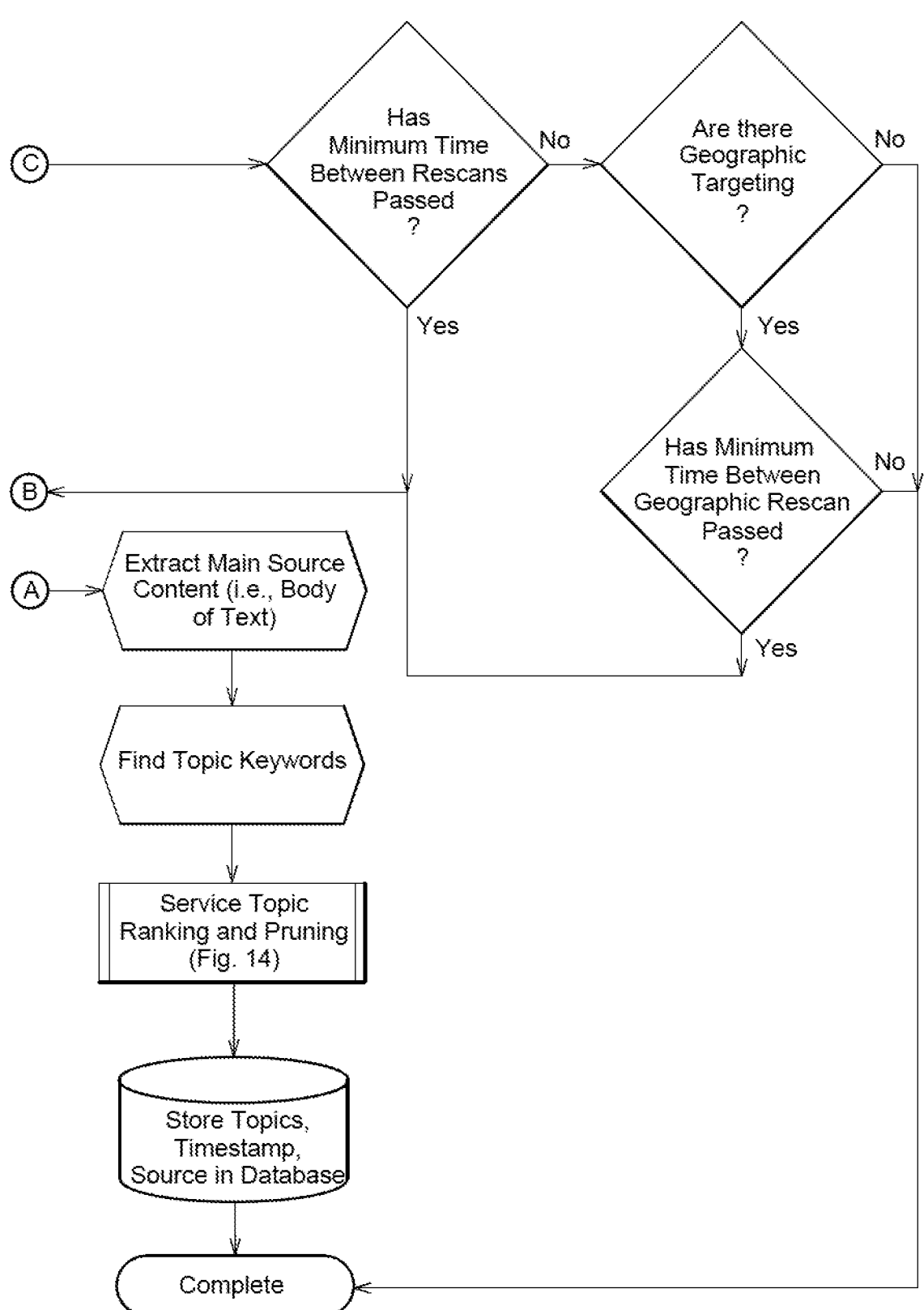
Figure 14A:
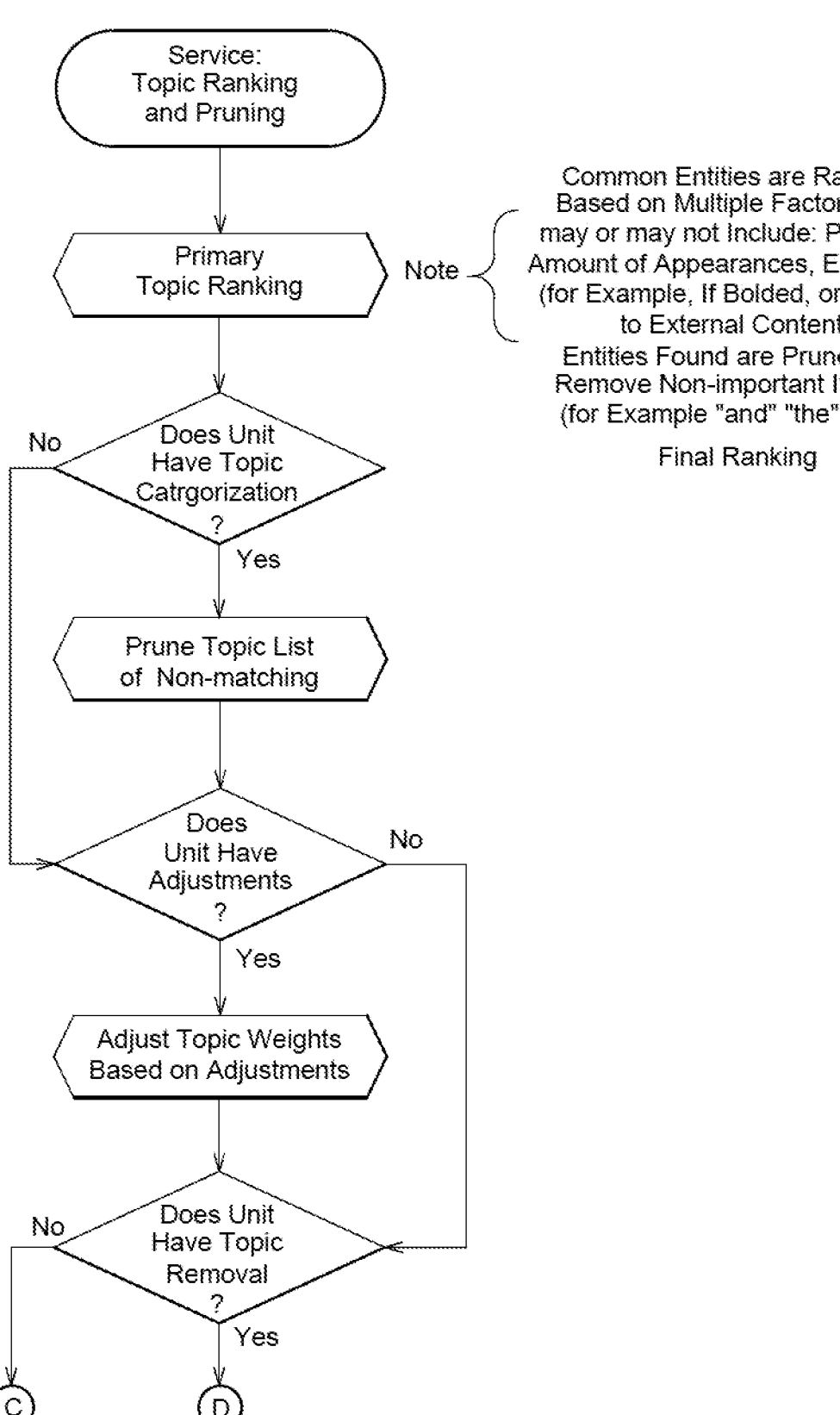
FIGS. 14A and 14B show a process flow diagram for a topic ranking and pruning service method performed by the control server of FIGS. 10 and 11, according to some inventive embodiments.
Figure 14B:
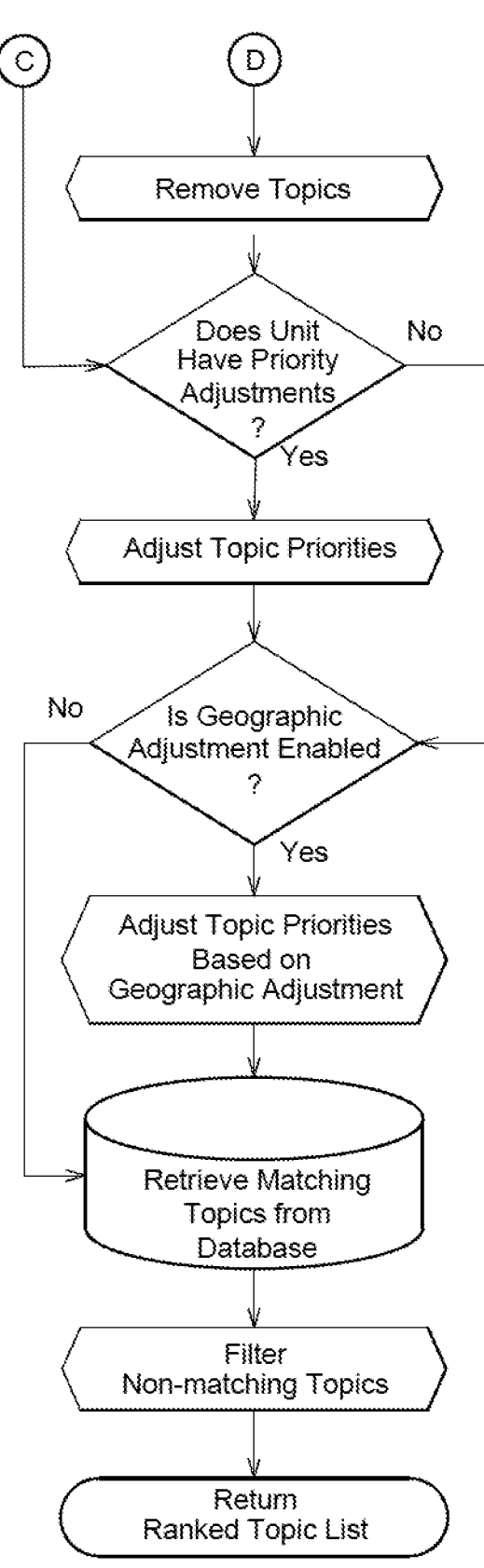

FIGS. 13A and 13B show a process flow diagram for a topic extraction service method performed by the control server of FIGS. 10 and 11, and FIGS. 14A and 14B show a process flow diagram for a topic ranking and pruning service method performed by the control server of FIGS. 10 and 11, according to some inventive embodiments.

As indicated in these flow diagrams, if the location for the TEP unit is a web page, a display page URL of the request passed to a third-party content analysis provider (e.g., dandelion.eu). If the TEP unit is in an application view, either a corresponding web page url may be provided, or application content information may be passed via SDK/API to the third-party content analysis provider. The display page URL or application view is queued for analysis by the "first" request made when the TEP unit was loaded on a webpage or application view.

The third-party content analysis engine functions basically as follows. A part of the webpage containing content (or full page content if unable to find a specific section of dense text) is analyzed or, in the case of application view, the provided application content information or corresponding web page URL is analyzed to finds content entities (single and multi-word sets, example: ravens; apple; international business machines etc.). If the page/view has been previous analyzed (in the case of geographic targeting) and the timeout for refresh has not occurred, the previously extracted topics are retrieved from database for further analysis. Topics are extracted and ranked based on weight/occurrence on page. Common entitles are ranked based on multiple factors that may or may not include: position; amount of appearances; emphasis (for example, if bolded, or linked to external content). Entities found are pruned to remove non-important items (for example "and" "the" etc.).

After the topics are extracted and ranked in a naive fashion, the resulting topic list is run through one or more multiple algorithms that adjust the rankings that query if the TEP unit have topic categorization. If the site owner specified that certain topics should be focused on (for example marking the unit as to focus on financial topics only), any non-matching topics are removed from the list. If the site owner specified that certain topics should have their ranking increased (such as teams over leagues, or specific stocks over general market data) then those topics are given additional weight to increase their rankings. If the user has specified a blacklist of potential topics, they are removed. Then there is a final reranking of the topic list after applying the user specific topic adjustments.

In some cases, the resulting ranked topics may also be adjusted given user specified topic adjustment based on viewer geographic location. For example, if online gaming or betting topics are found, some topics may be adjusted to account for local laws, or financial data may be adjusted to use European market topics, or tickets may use only available topics in the general area.

Using the final filtered topic list weights, the process checks for matching data in the database for topics that can be used to populate the embeds and prune from result list any terms that are not found (to prevent excess work during display). In the case of active geographic filtering, the topic list for the geographic area are used from database.

Figure 15A:
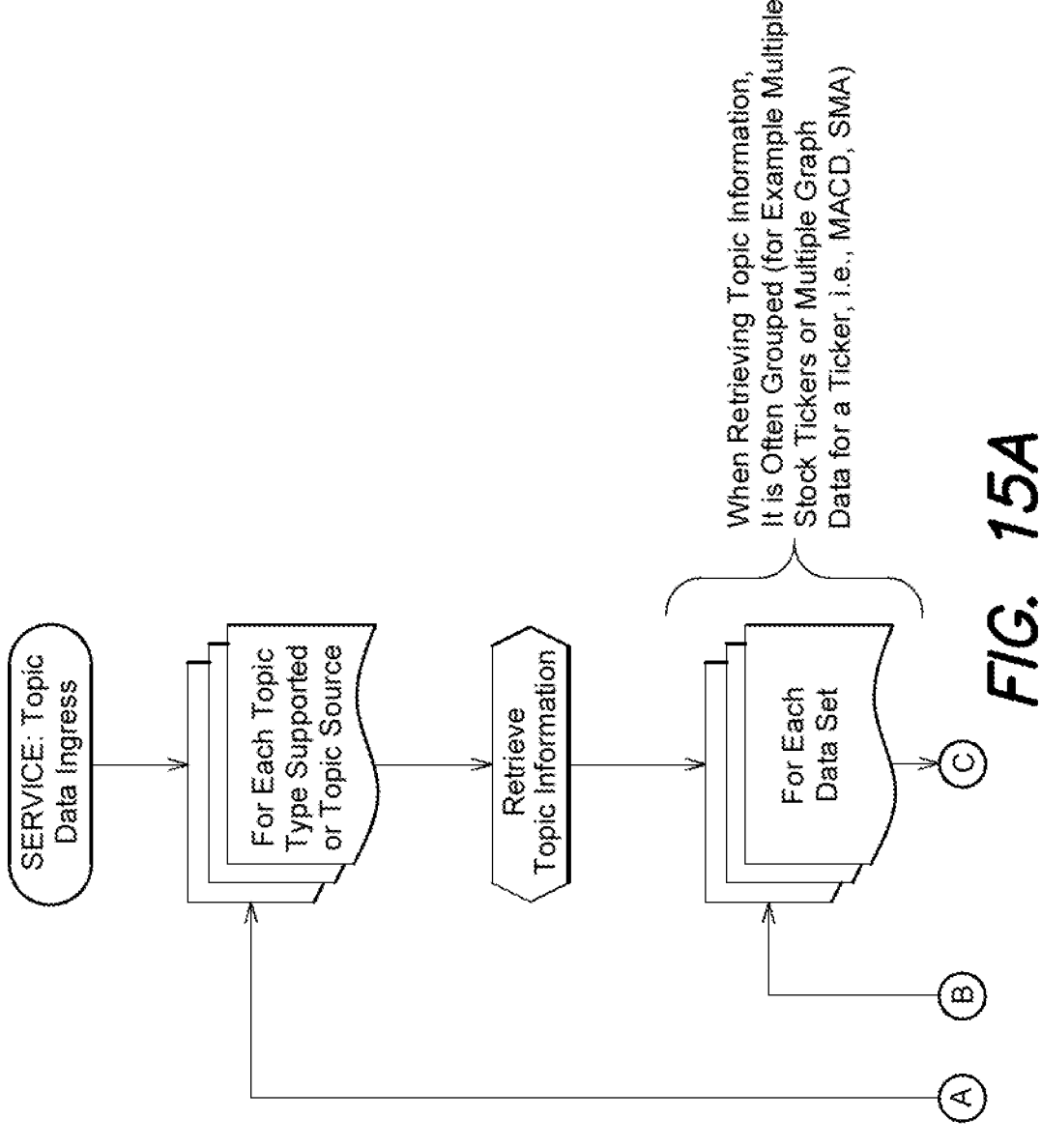
FIGS. 15A and 15B show a process flow diagram for a topic data ingress service method performed by the control server of FIGS. 10 and 11, according to some inventive embodiments.
Figure 15B:
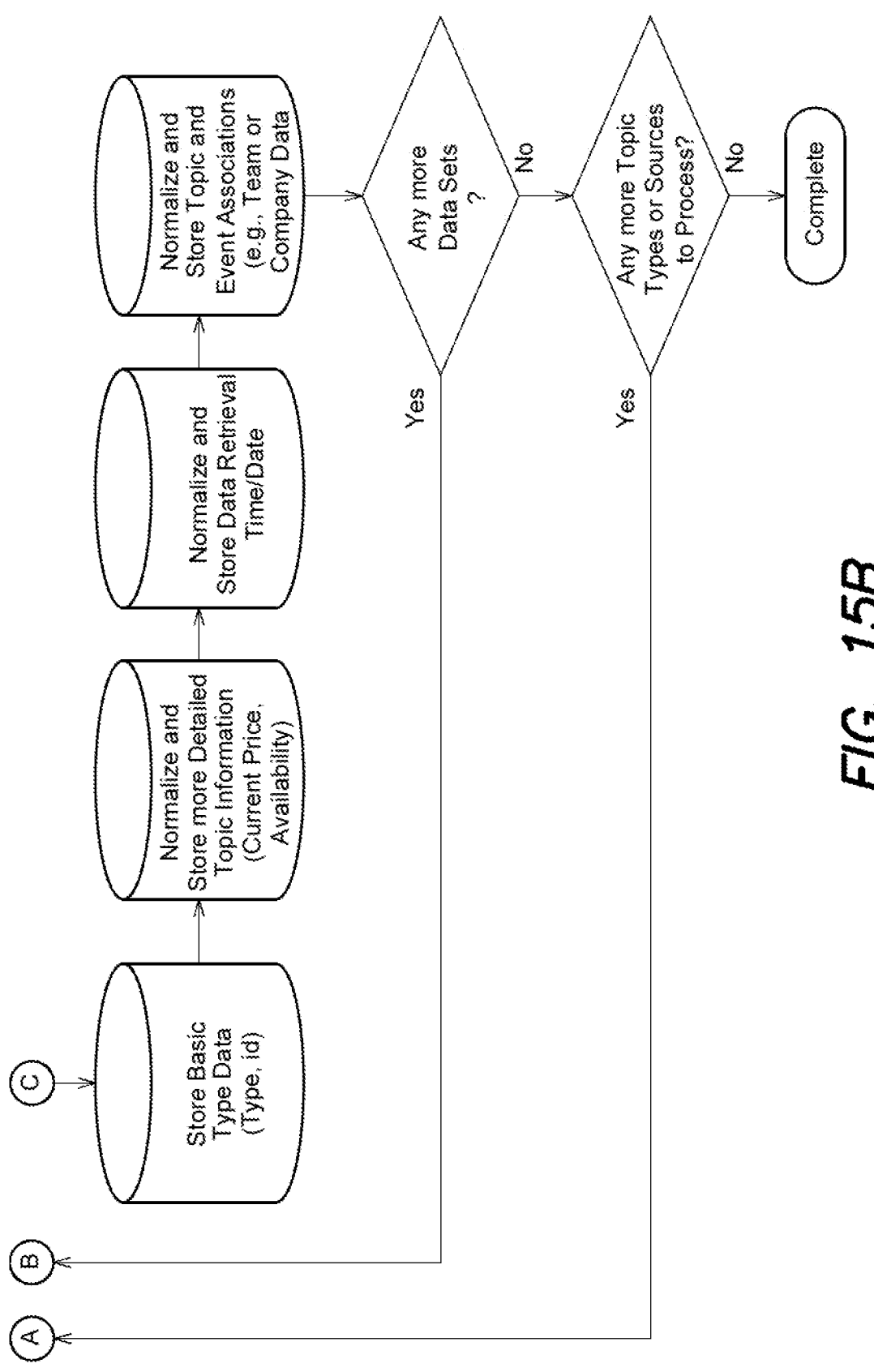
Figure 16B:
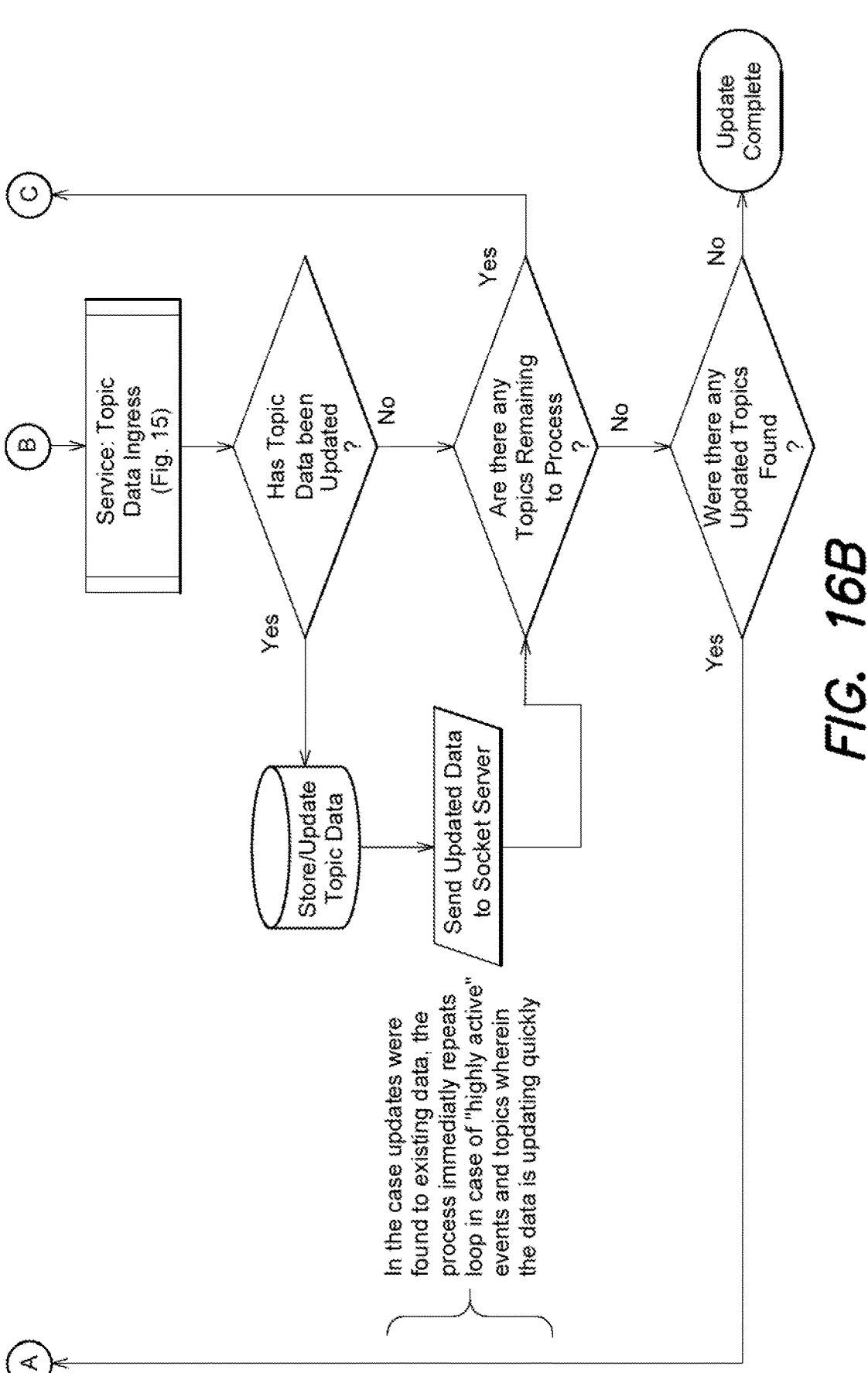

FIGS. 15A and 15B show a process flow diagram for a topic data ingress service method performed by the control server of FIGS. 10 and 11, according to some inventive embodiments, and FIGS. 16A and 16B show a process flow diagram for a topic data updates service method performed by the control server of FIGS. 10 and 11, according to some inventive embodiments.

As noted above, another significant role of the control server 500-1 relates to the collection of topic information (e.g., from external Internet providers), maintaining relevant topic information in the database 420-1, and distributing the collected topic information to viewer client devices.

As noted above, the technical challenge of displaying topic information and any updates to same in a synchronized and low-latency manner amongst multiple client devices is addressed in part by using a single control server 500-1 to gather and parse topic information. This single point of entry of topic information prevents synchronization errors inherent in network communications. Once a change in topic information has been detected (e.g., via periodic queries of the topic information provider 57), the control server provides these changes to the one or more sockets dedicated to the topic (to which multiple client devices are communicatively coupled), resulting in a single synchronized update to all client devices and thereby significantly mitigating client-by-client latency and/or synchronization issues.

In some example implementations, the control server 500-1 implements two service methods relating to topic information, namely, a topic data ingress service and a topic data monitor service. The topic data ingress service is performed with a first periodicity (e.g., once or twice a day) to maintain and update a topic list in the database 420-1. The topic data monitor service is performed with a second and more frequent periodicity (e.g., once a minute) to check for any topics for which updated information may be available (e.g., new stock prices, new articles being published, updated availability of tickets for an upcoming concert or game) and, if found, to retrieve fresh data about topic updates from the topic information provider (e.g., at an even greater frequency, for example once a second).

FIGS. 15A and 15B show a process flow diagram illustrating an topic data ingress service method performed by the control server 500-1, according to one inventive implementation. In some examples, the control server also may perform a topic data monitor service method, in tandem with a topic data ingress service, to query the topic information provider for a list of all topics that may be particularly trending in a specified window around the current time (e.g., a 48 hour window), to allow tracking of trending topics. For each trending topic, a topic clock and other topic information are updated frequently (e.g., once a second) to provide regular updates of topic information messages that are broadcast to one or more dedicated topic information sockets of the socket server(s) 600-1.

With reference to FIGS. 15A and 15B, a topic information provider is contemplated as supporting multiple different topics for furnishing topic information. For each topic, the control server retrieves the raw information provided by the topic information provider, and in some instances converts and/or compresses the raw information to provide a standardized format of essential data elements for storing in the database 420-1 and/or distribution to client devices (e.g., via broadcast of topic messages having the standardized format to one or more dedicated sockets of the socket server(s) 600-1). Examples of data elements for topic information include, but are not limited to, a text identifier for the topic, a numeric identifier for the topic (e.g., TopicID), one or more tags associated with the topic, quantized information germane to the topic, identifiers for particular personalities or things associated with or related to the topic, a date and/or time of new/updated information published about the topic, associated topics, events associated with topics, and latest news relating to a topic. In some examples, the control server further normalizes the date and/or time to a particular reference frame (e.g., converting from UTC to EST/EDT). In addition, all incoming data elements may or may not be further normalized to standardize the provided information from multiple topic information providers to facilitate consistent formatting and accessibility of data in the database 420-1.

Figure 17A:
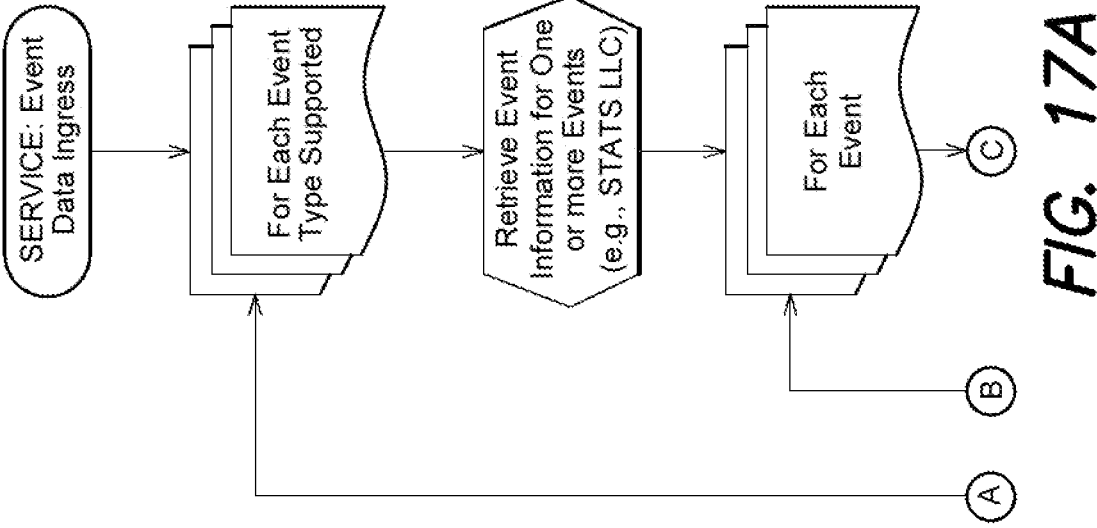
FIGS. 17A and 17B show a process flow diagram for an event data ingress service method performed by the control server of FIGS. 10 and 11, according to some inventive implementations.
Figure 17B:
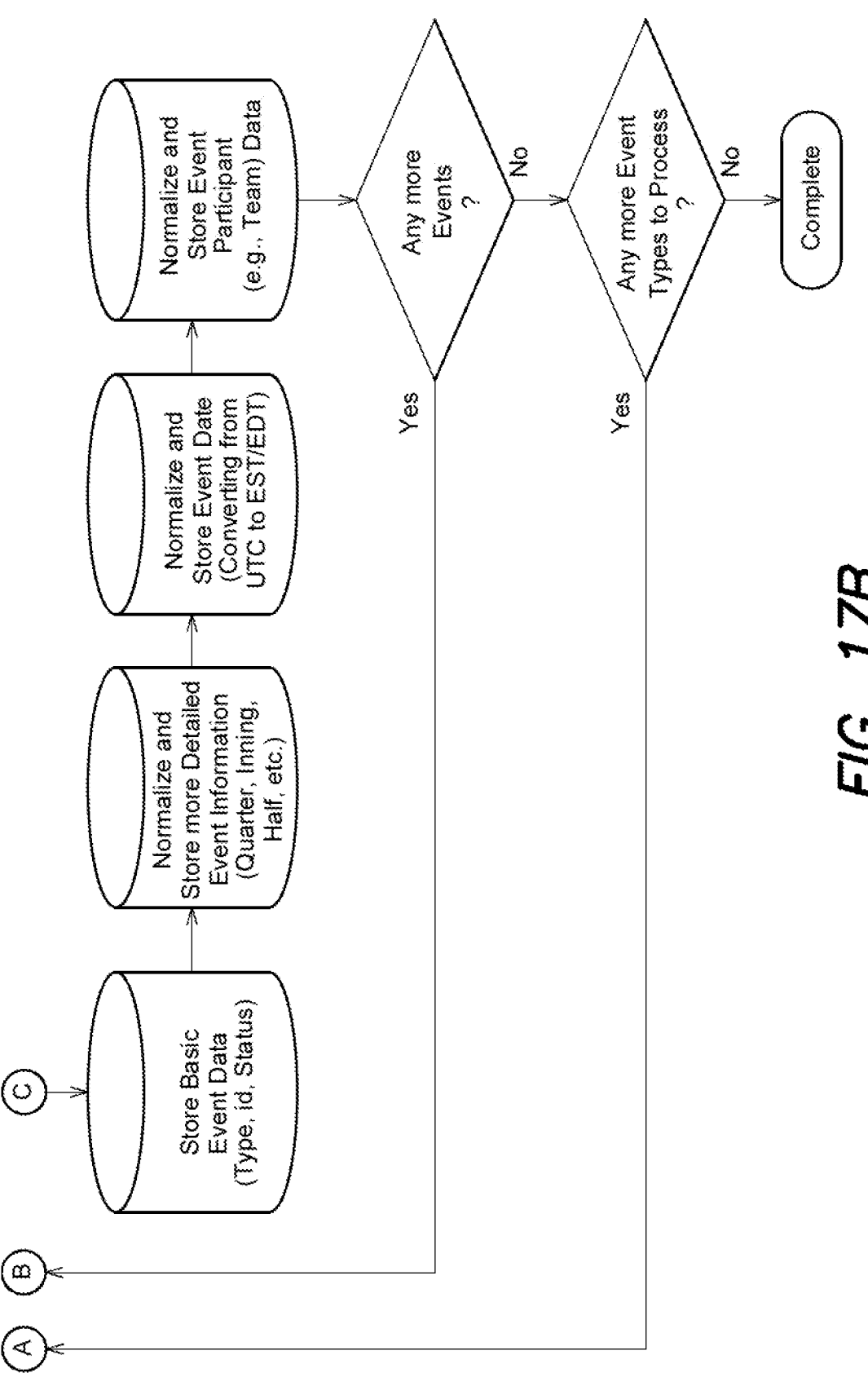

FIGS. 17A and 17B show a process flow diagram for an event data ingress service method performed by the control server of FIGS. 10 and 11, according to some inventive implementations. In these methods, an event information provider is contemplated as supporting multiple different types of events for furnishing information (various types of sporting events such as basketball, football, baseball, hockey, etc.), and providing information for each instance of an event of a given event type (e.g., information for each of multiple basketball games, each of multiple football games, each of multiple baseball games).

For each event, the control server retrieves the raw information provided by the event information provider, and in some instances converts and/or compresses the raw information to provide a standardized format of essential data elements for storing in the database 420 and/or distribution to client devices (e.g., via broadcast of event messages having the standardized format to one or more dedicated sockets of the socket server(s) 600). Examples of data elements for event information include, but are not limited to, a type of the event, an identifier for the event (EventID), a status of the event (e.g., pre-game, in-progress, final), score information for the event, team information for the event, a progress indicator or progress details for the event (e.g., quarter, period, inning, half-time; for baseball—balls, strikes, base information; for football—possession, down, yards to go; for basketball—timeouts, fouls), an event date and/or time of the event (e.g., actual or elapsed time information), and event participant data regarding participants in the event. In some examples, the control server further normalizes the event date and/or time to a particular reference frame (e.g., converting from UTC to EST/EDT).

Figure 18A:
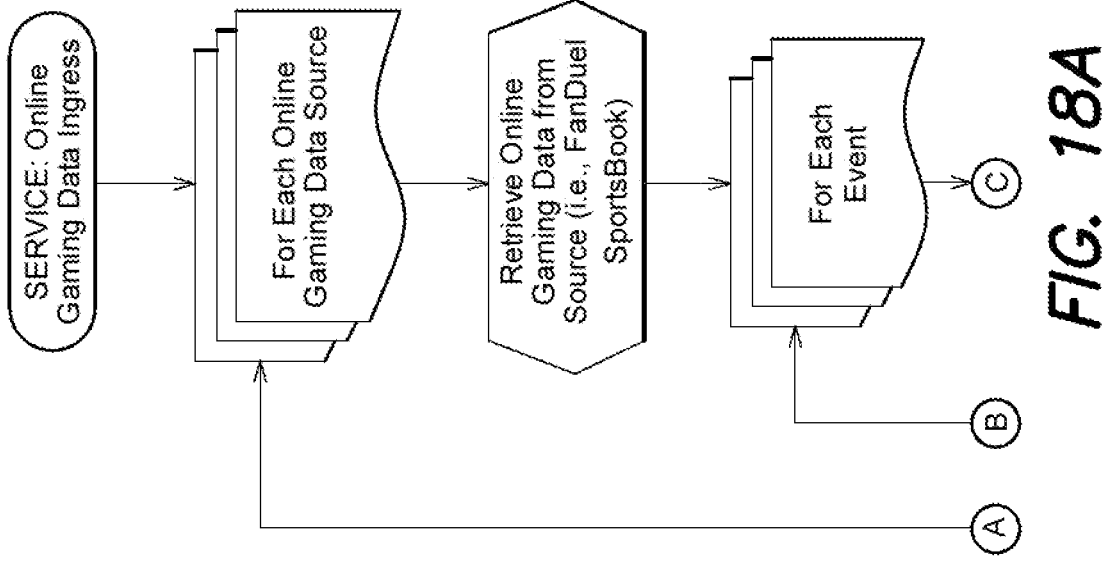
FIGS. 18A and 18B show a process flow diagram for an online gaming data ingress service method performed by the control server of FIGS. 10 and 11, according to some inventive implementations.
Figure 18B:
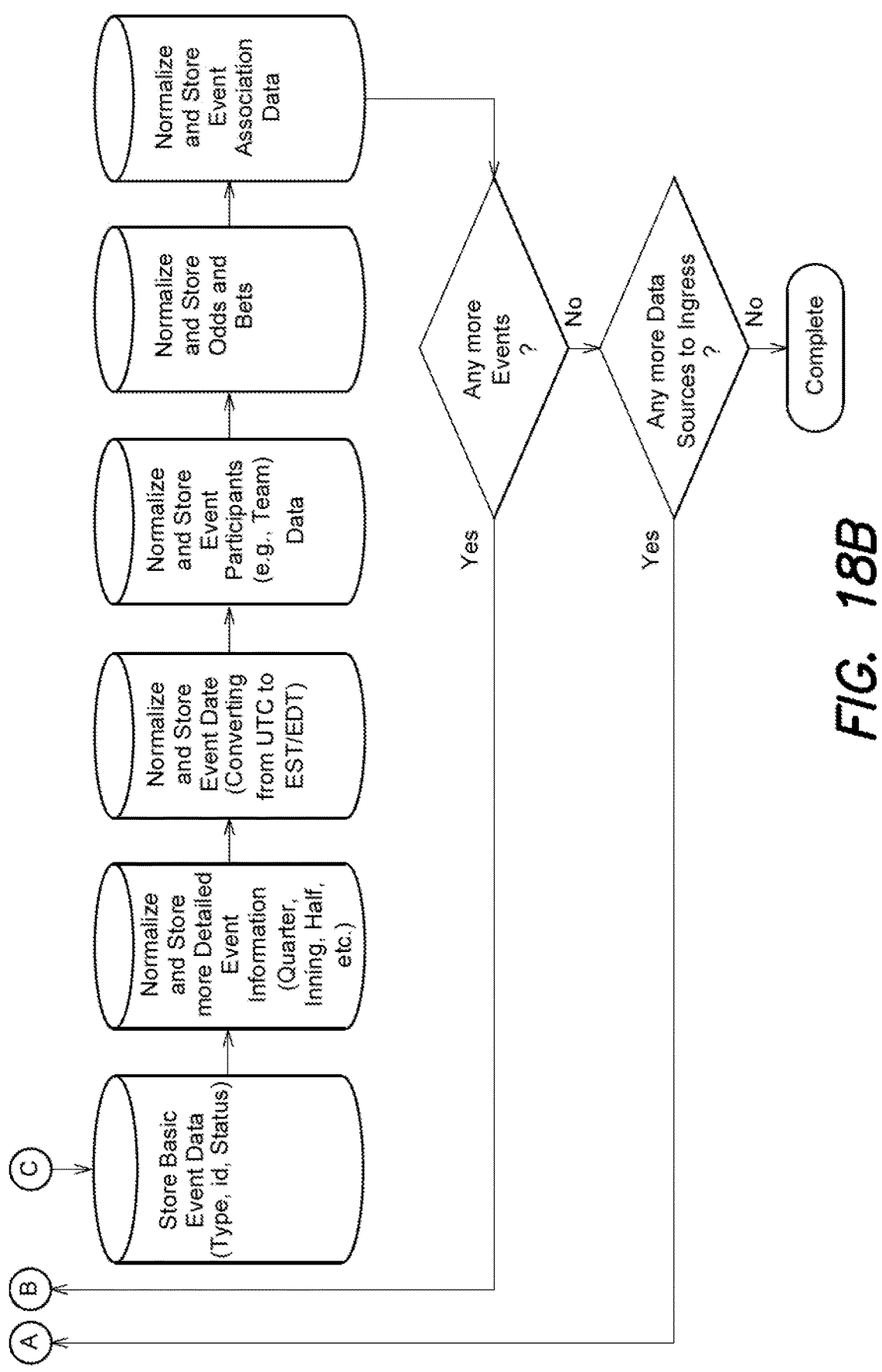
Figure 19B:
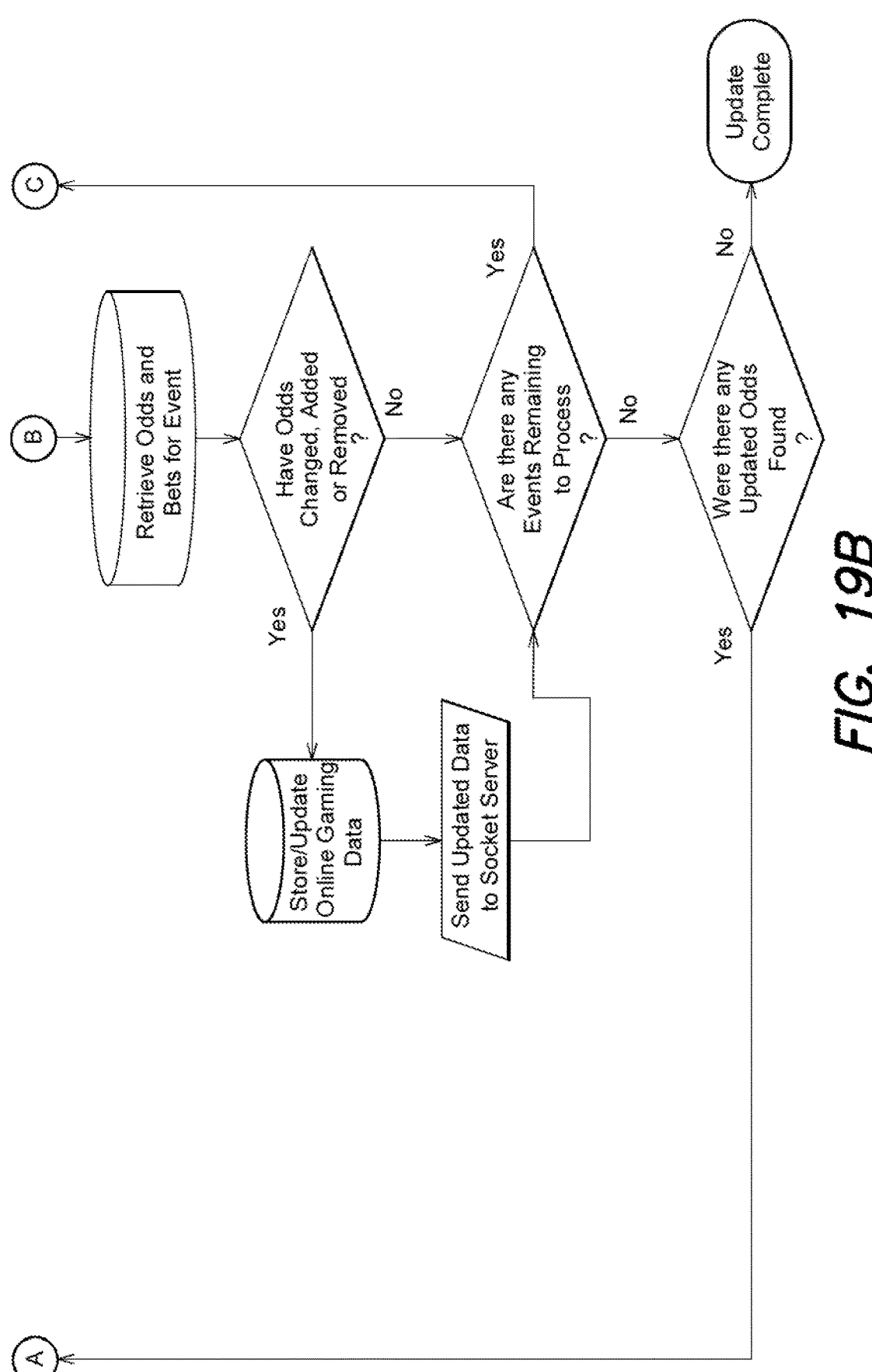

FIGS. 18A and 18B show a process flow diagram for an online gaming data ingress service method performed by the control server of FIGS. 10 and 11, according to some inventive implementations, and FIGS. 19A and 19B show a process flow diagram for an online gaming data updates service method performed by the control server of FIGS. 10 and 11, according to some inventive implementations. These methods follow similar actions as those discussed above in connection with topics and events, with some particular actions germane to betting information (e.g., retrieving odds and respective types of bets).

Figure 20:
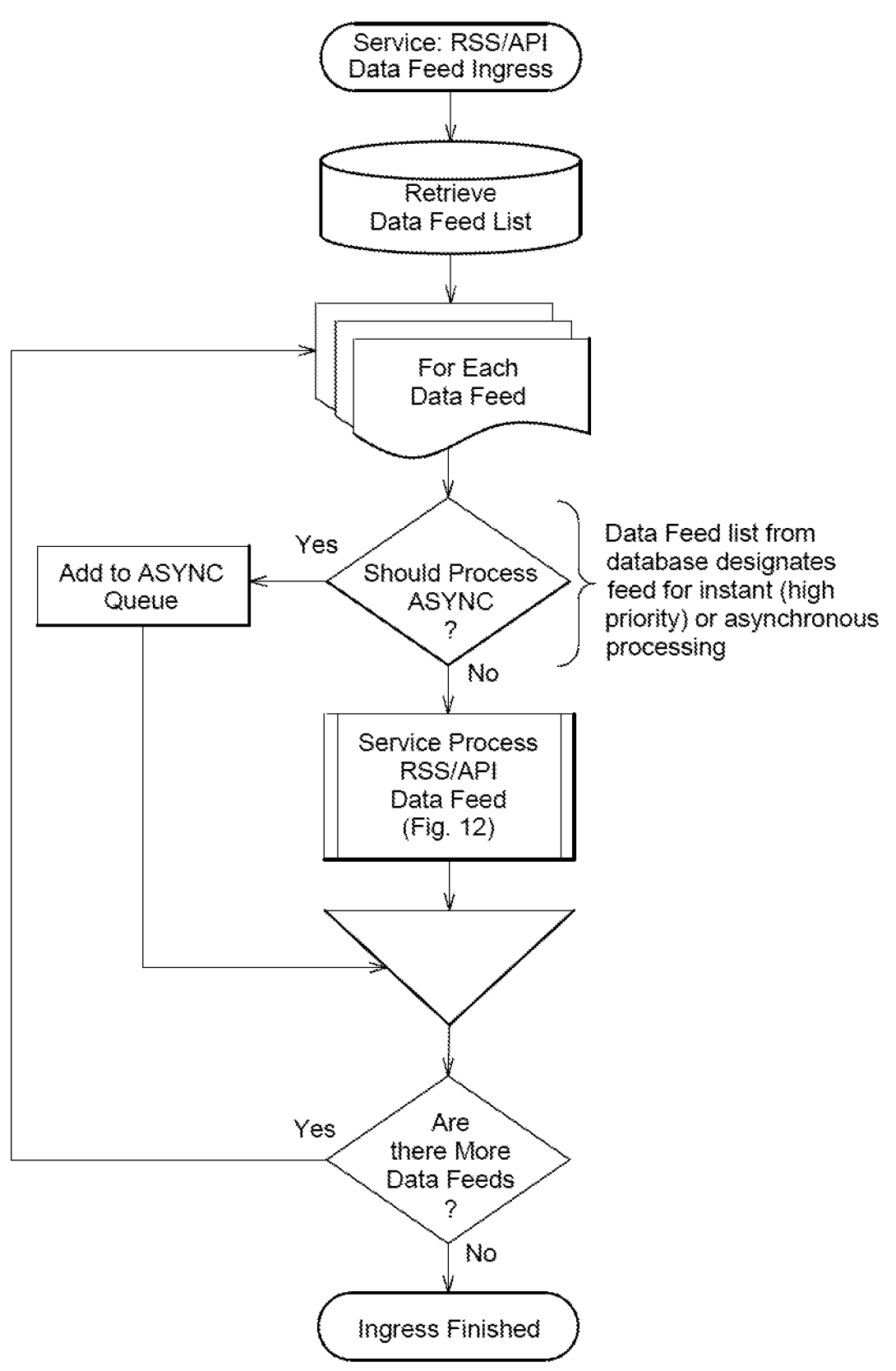
FIG. 20 shows a process flow diagram for an RSS/API data feed ingress service method performed by the control server of FIGS. 10 and 11, according to some inventive implementations.

FIG. 20 shows a process flow diagram for an RSS/API data feed ingress service method performed by the control server of FIGS. 10 and 11, according to some inventive implementations, and FIG. 22 shows a process flow diagram for an RSS/API data feed processing service method performed by the control server of FIGS. 10 and 11, according to some inventive implementations. These methods follow similar actions as those discussed above in connection with topics and events.

Figure 21:
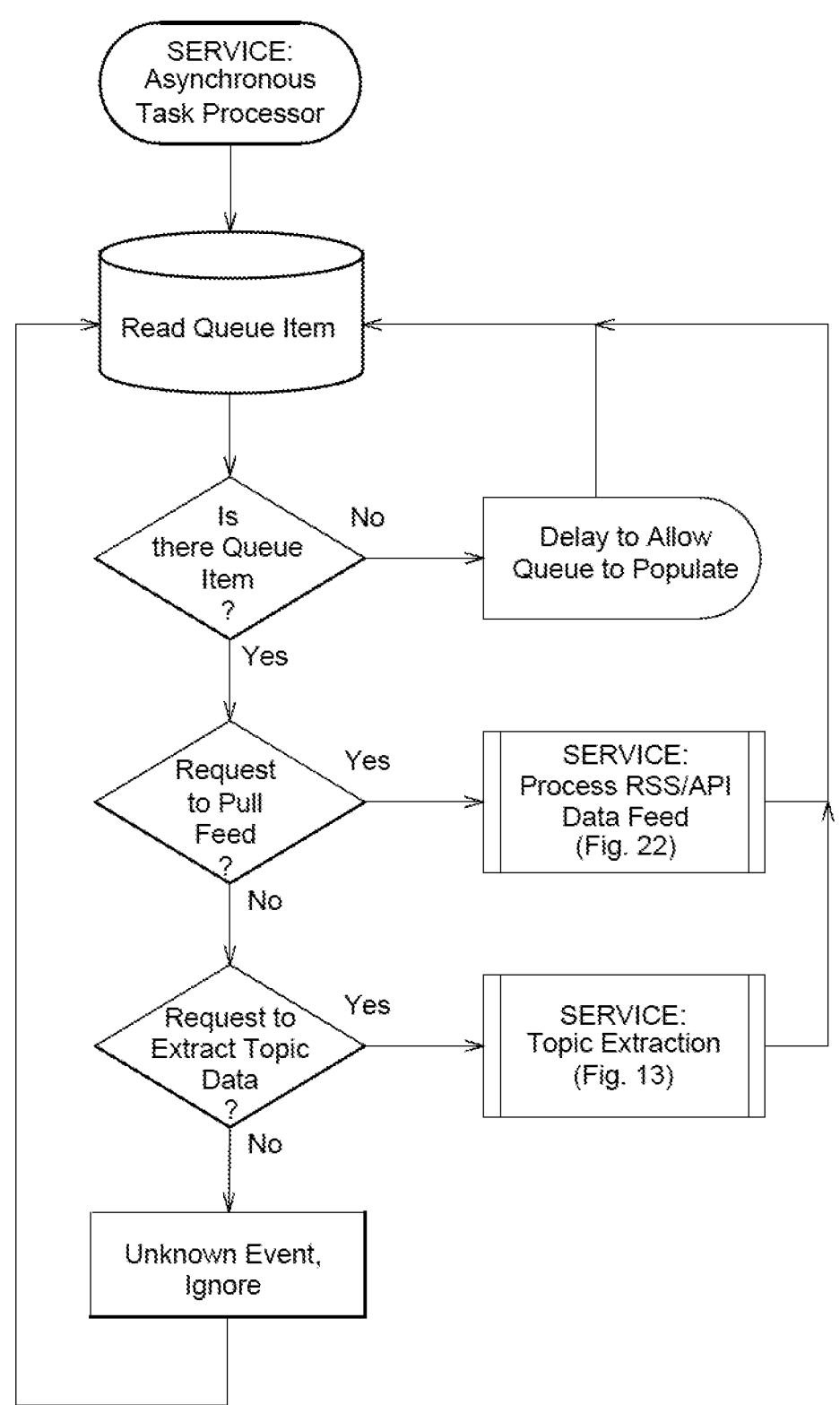
FIG. 21 shows a process flow diagram for an asynchronous task processor service method performed by the control server of FIGS. 10 and 11, according to some inventive implementations.
Figure 22:
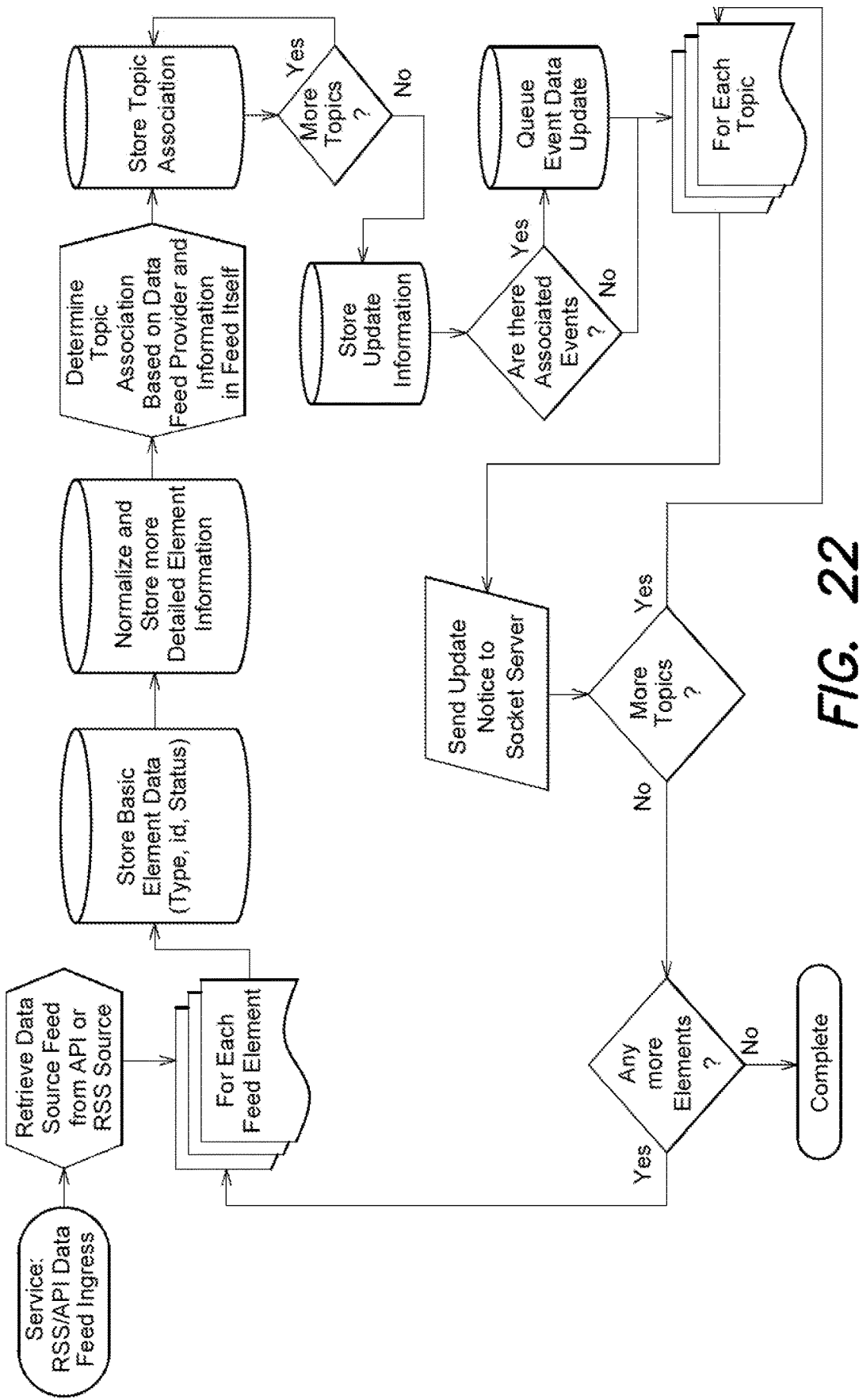
FIG. 22 shows a process flow diagram for an RSS/API data feed processing service method performed by the control server of FIGS. 10 and 11, according to some inventive implementations.

FIG. 21 shows a process flow diagram for an asynchronous task processor service method performed by the control server of FIGS. 10 and 11, according to some inventive implementations. The control server periodically reads a task or task bundle from the asynchronous queue to initiate various other actions or processes in connection with the TEP 1000-1.

VI. Website Injection Process/Application View/API or SDK Response Process

Figure 23A:
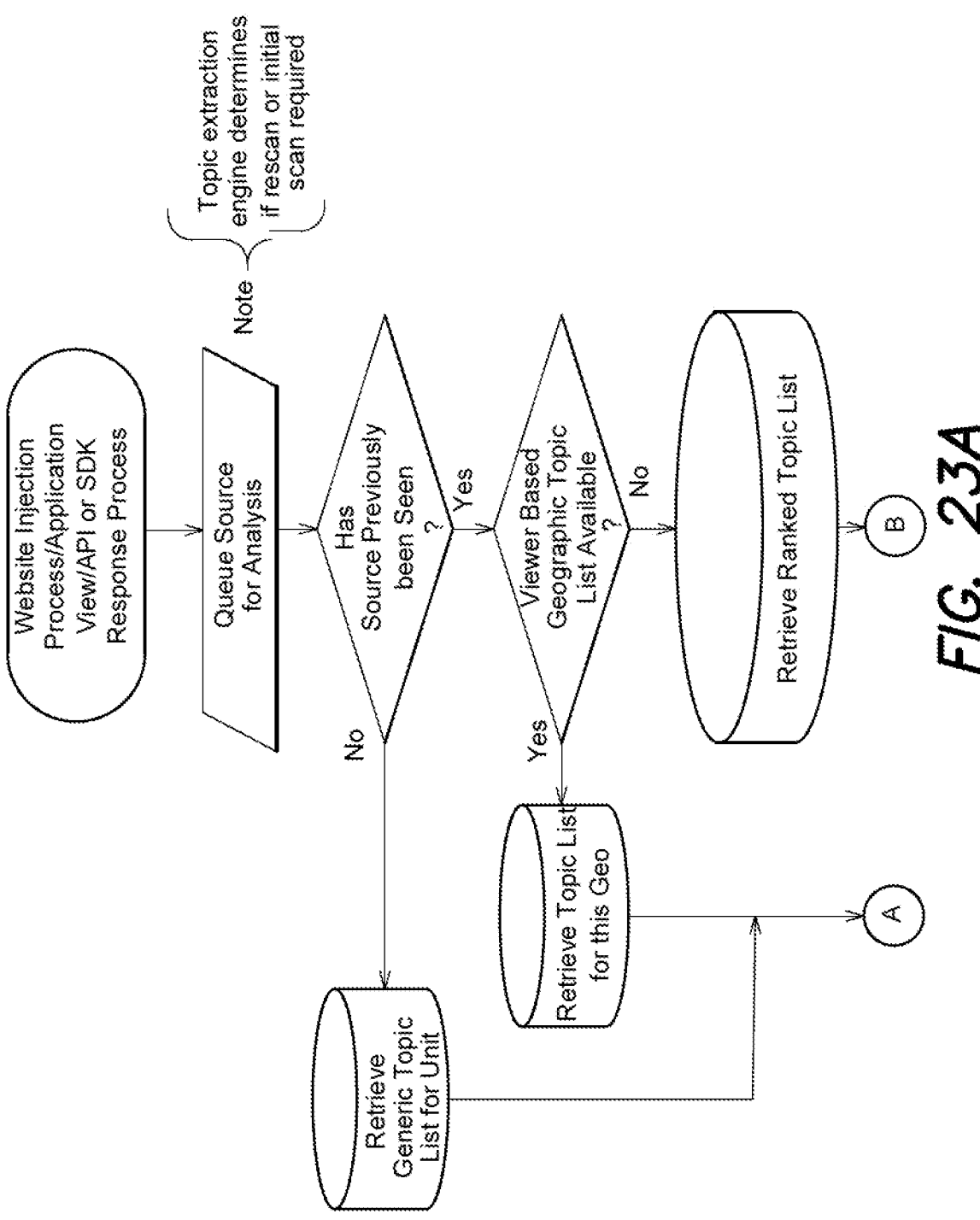
FIGS. 23A, 23B, and 23C show a process flow diagram for processing primary digital content and embedding secondary digital content in a topic extraction platform (TEP) unit in a webpage or an application view of an app, according to some inventive implementations.
Figure 23B:
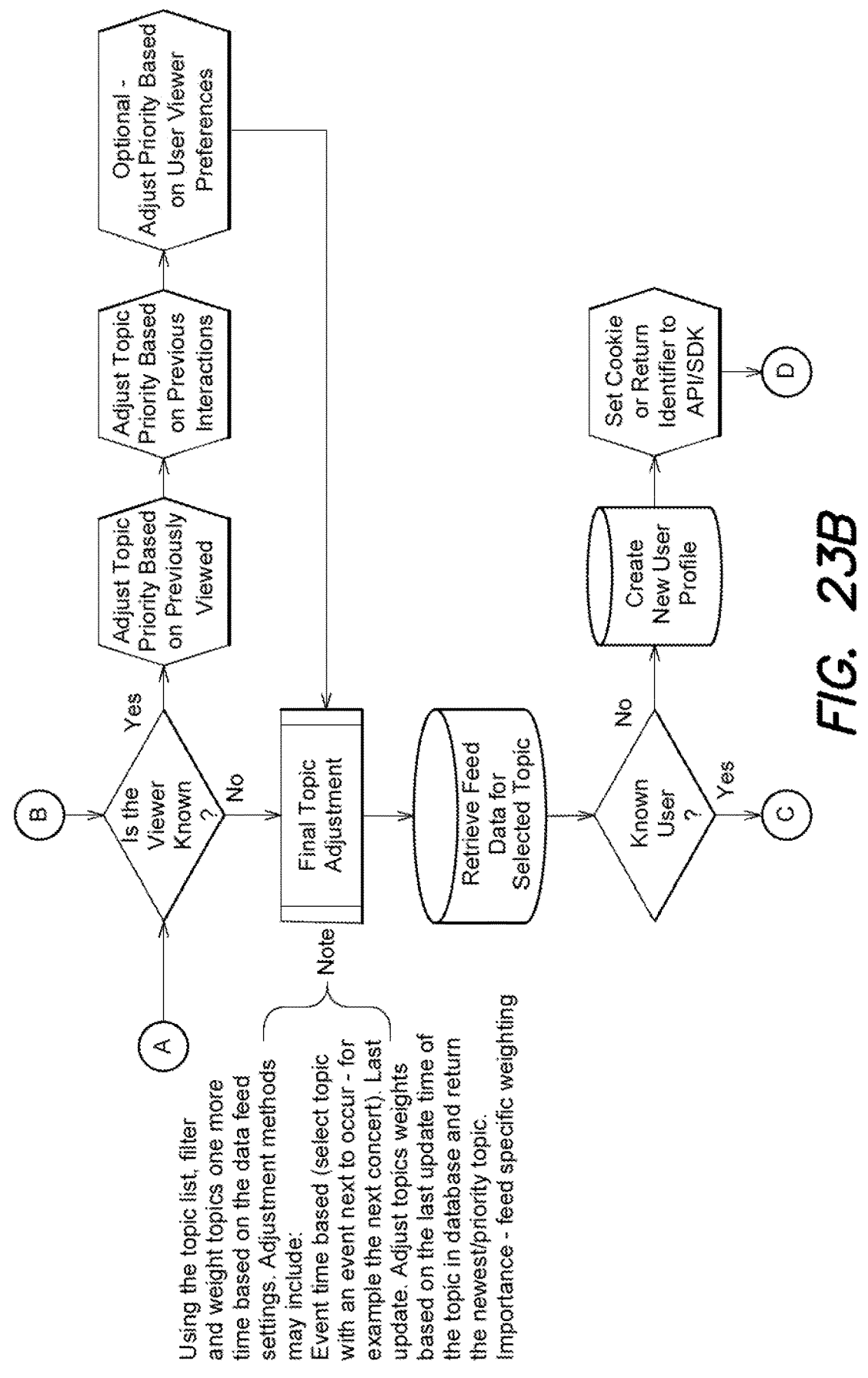
Figure 23C:
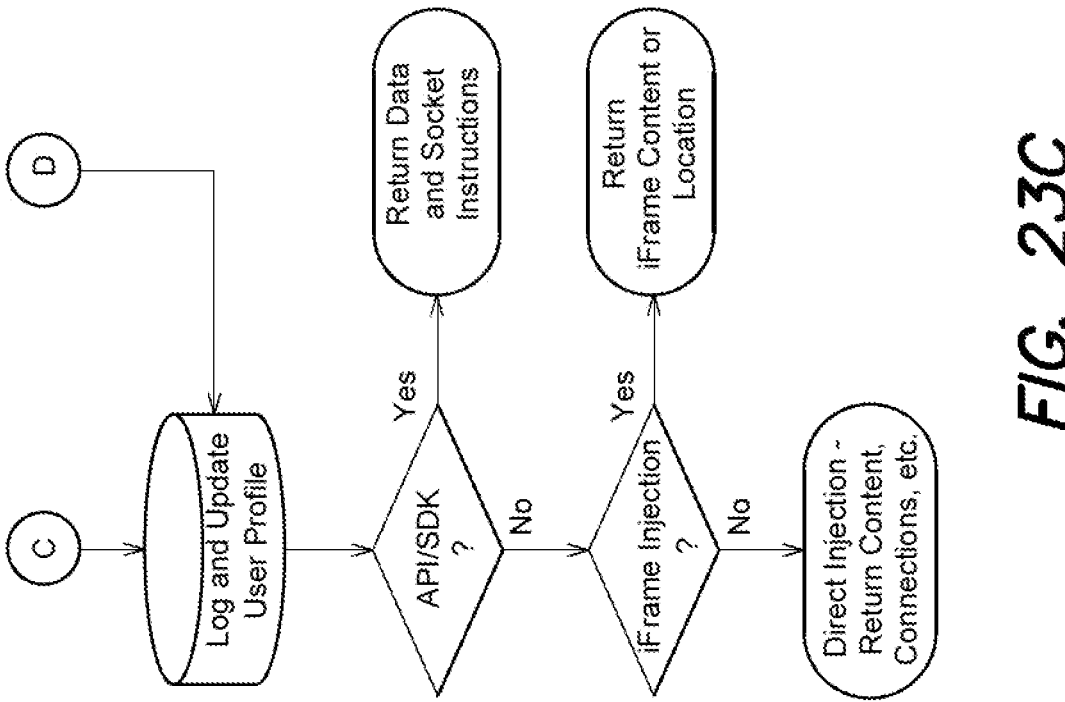

FIGS. 23A, 23B, and 23C show a process flow diagram for processing primary digital content and embedding secondary digital content in a topic extraction platform (TEP) unit in a webpage or an application view of an app, according to some inventive implementations.

This is the process where in the injected element (iframe, direct injection, API, or SDK based) is processed and displayed/returned to the viewer.

Optimizations to topic ranking may be performed based on previous viewer interaction and/or fingerprinting and any other information contained in their viewer/visitor profile.

For example, if a user has previously interreacted with the unit based on a specific topic, that topic may be given additional priority in an attempt to induce future interaction.

In addition, in some implementations, viewers may be able to customize their responses and data feed sources. For example, if a generic sporting site embeds the unit, it may allow its viewers to select the gambling data feed (ie FanDuel SportsBook, Bovada, William Hill, etc) to display topic data from.

VII. Realtime Updates Process

Figure 24A:
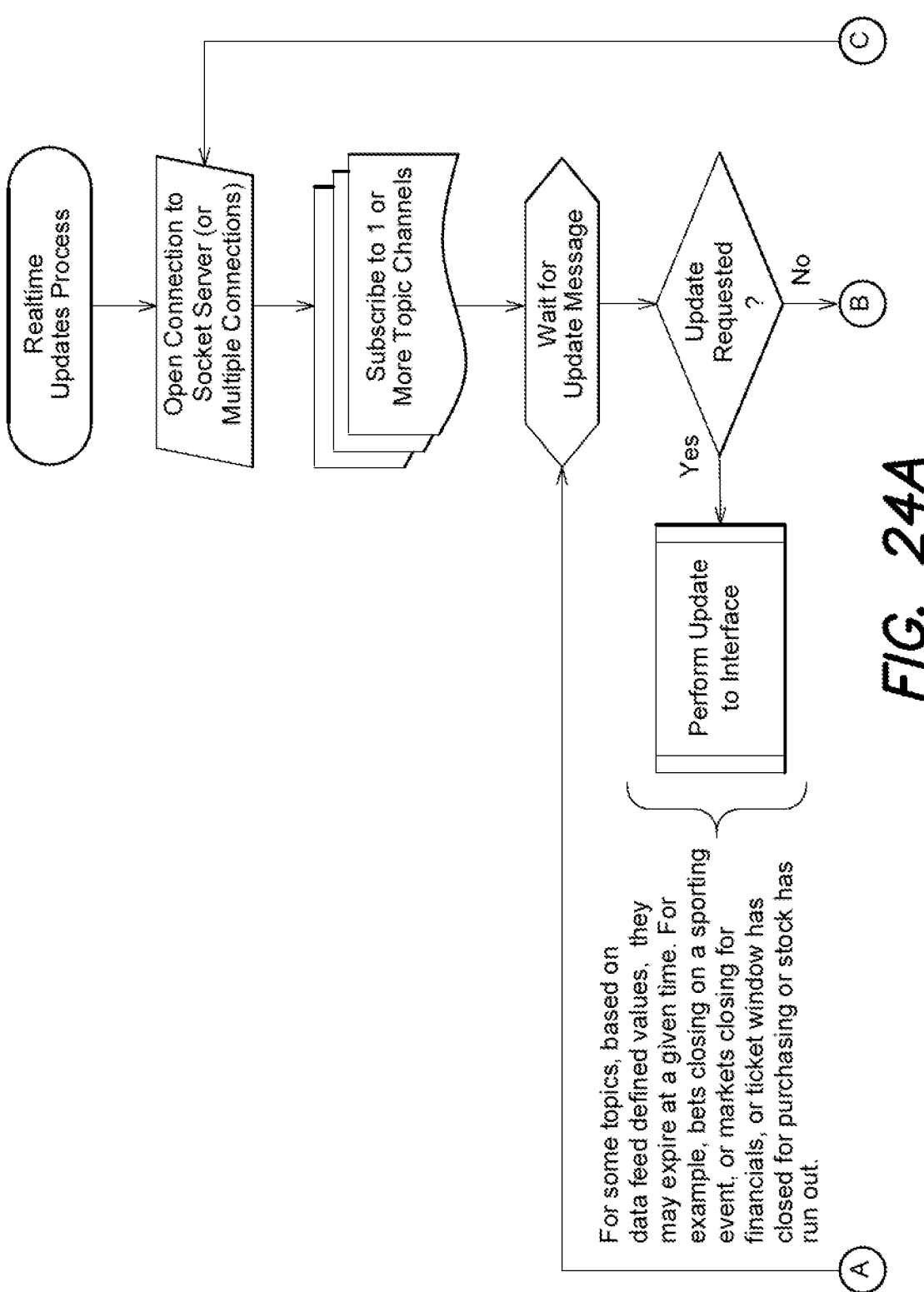
FIGS. 24A and 24B show a process flow diagram for processing updates to secondary digital content, according to some inventive implementations.
Figure 24B:
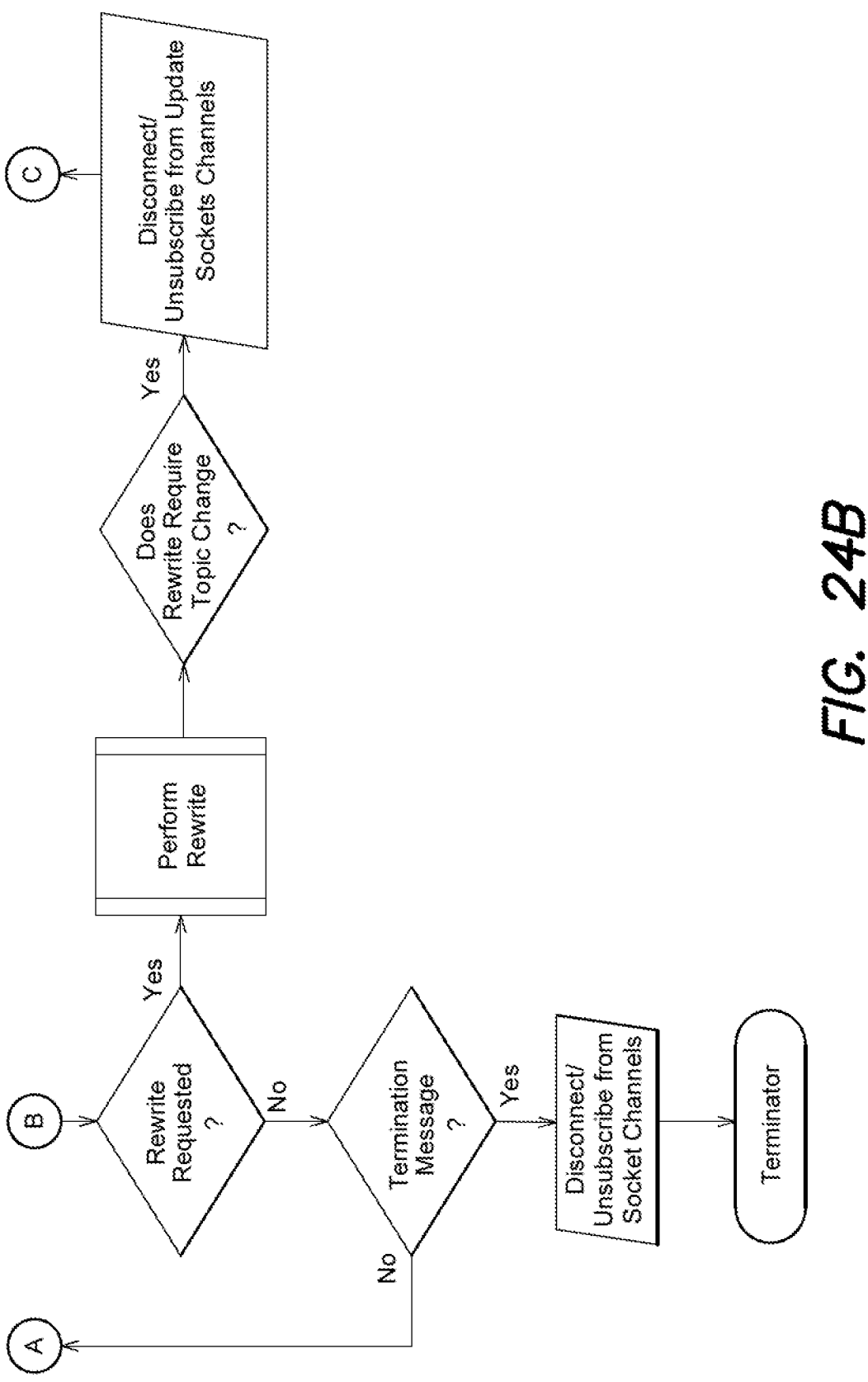

FIGS. 24A and 24B show a process flow diagram for processing updates to secondary digital content, according to some inventive implementations. Once the element has been injected, the viewer client makes a/multiple connection to the socket servers for the topic. Open socket connection(s) may include web sockets, http2.0 persistent connections. Socket connections may either be single shared socket connection with topic specific subscriptions or multiple socket connections one for each topic.

When the viewer client receives a message in the socket channel, it uses the instructions contained therein to update the injected element with the up-to-date information. For example, if a stock price has changed, the viewer will receive a message indicating the new price and will update the user interface to reflect the change or if odds have updated for a betting event.

For some topics, based on data feed defined values, they may expire at a given time. For example, bets closing on a sporting event, or markets closing for financials, or ticket window has closed for purchasing or stock has run out. In those cases, a message will be received via the socket channels to change the topic displayed. On receipt of a rewrite message, the information included will instruct the client on how to proceed with the rewrite. The socket message may include all data needed for the rewrite. The socket message may indicate that a request must be made to the server to either replace or update the element. The socket message may indicate that the update can be found via a CDN asset (html, json, or xml) and the client should retrieve this item and act accordingly.

VIII. Interaction Process

This is the process that occurs when a viewer interacts with the embedded secondary digital content.

On embedding secondary digital content in a TEP unit, the viewer client device is given a cookie or assigned an id, or both. This element is used to identify the viewer during the interaction process.

Depending on implementation, logging (e.g., to the database and/or to the viewer/visitor profile) can occur during the process of interaction or as a result of interaction. For example, if the interaction results in the viewer being redirect to a new webpage, the logging occurs during the redirection process. If the viewer is interacting with an element that results in an information change, a request is made to the API/server to trigger a logging event both to the server and the viewer/visitor profile. Logged information includes, but is not limited to: the TEP unit that contains the secondary digital content; if the viewer request came from a website, the website itself (google.com) is logged; if the viewer request came via an API request or SDK request, the parameters defined are used; if viewer request can in via application view, it's information and source urls are stored; the specific page/location that the unit is being displayed;

interaction specific information is logged, for example the URL that the viewer is being redirected to; the topic that is currently on display; source of topic information (feed) used for generation; fingerprinting information (browser, device, etc.) of the viewer; the IP address of interaction; the geographic information of the viewer.

Depending on the defined UI, data, and topic, interactions within the TEP unit may or may not result in one or more actions outside the TEP unit. Example actions that are possible include, but are not limited to, the following: redirecting the viewer to a new website; changing the topic that is currently being displayed (changing stock, changing event that online gaming/betting data reflects) or to switch to another feed source; viewer purchases something via injected element (ticket, digital good, physical good); viewer requests subscription (free or paid).

In general, the viewer is able to perform actions (API powered) that include making bets, direct purchases, and any other API back actions with or without further modifications to the secondary digital content embedded/displayed in the TEP unit.

Figure 25A:
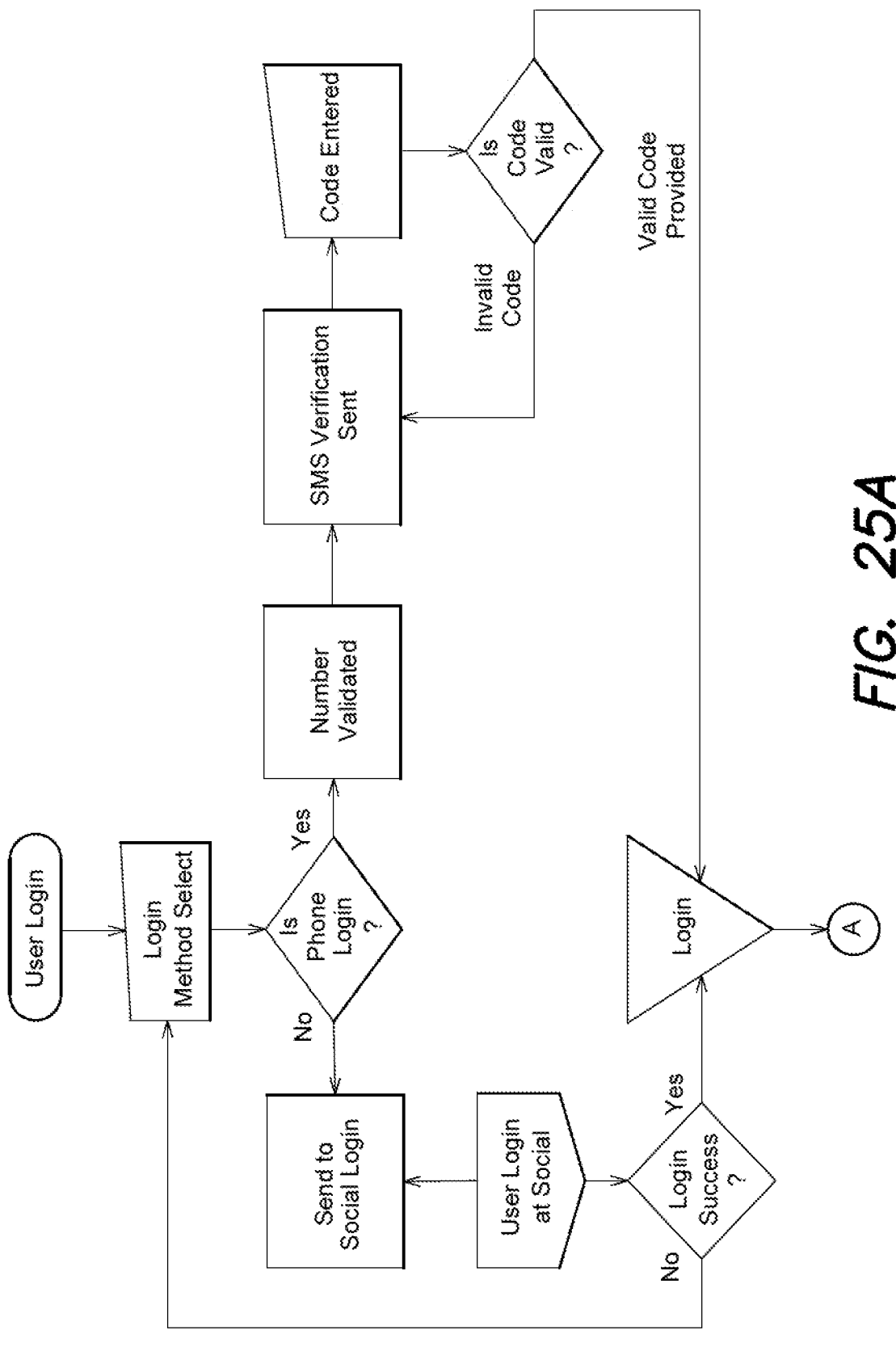
FIGS. 25A and 25B show a process flow diagram illustrating a user login process according to one inventive implementation, which in some examples may be performed via a viewer client device and facilitated by one or more web servers shown in FIG. 10.
Figure 25B:
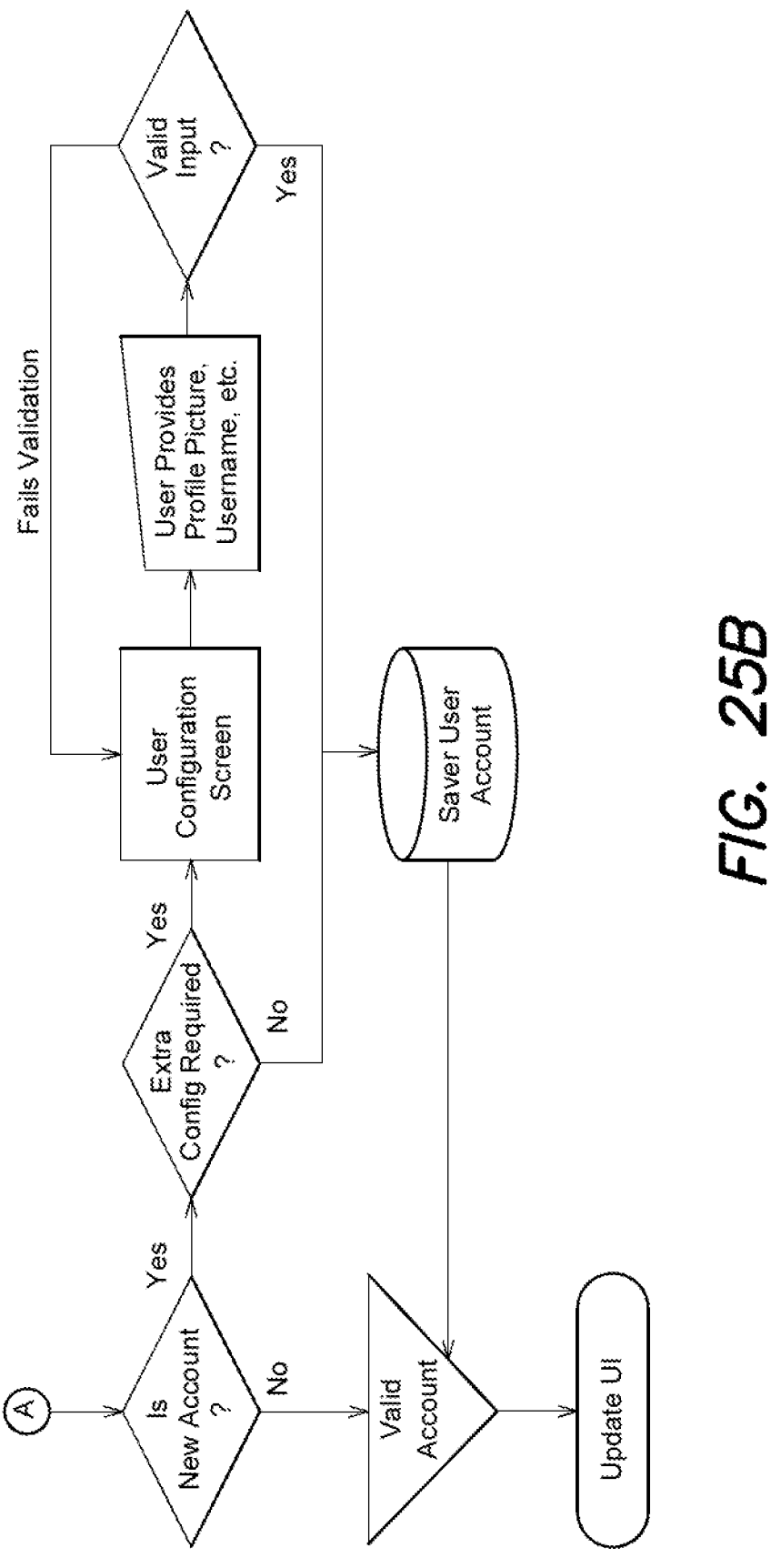

FIGS. 25A and 25B show a process flow diagram illustrating a user login process according to one inventive implementation, which in some examples may be performed via a viewer client device and facilitated by one or more web servers shown in FIG. 10.

Conclusion

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

The above-described implementations can be implemented in multiple ways. For example, implementations may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. Such computers may be interconnected by one or more networks such as Internet. The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable memory or storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various implementations of the invention discussed above. The computer readable medium or media can be transportable, such that the program or programs stored thereon can be loaded onto one or more different computers or other processors to implement various aspects of the present invention as discussed above.

Unless otherwise indicated, the terms "program" or "software" are used herein in a generic sense to refer to any type of computer code or set of computer-executable instructions that can be employed to program a computer or other processor to implement various aspects of implementations as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various implementations.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements. In some implementations, a schema-minimal storage system may be implemented in a relational database environment using key-value storage versus defined data structures.

With the foregoing in mind, each of the client devices described herein, as well as various servers and other computing devices of the broadcast/viewing servers and memory storage devices shown for example in FIGS. 2 and 3, may comprise one or more processors, one or more memory devices or systems communicatively coupled to the one or more processors (e.g., to store software code and other data), and one or more communication interfaces communicatively coupled to the one or more processors so as to implement the various specific and inventive functionality described herein.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
A) receiving a request from a viewer client device, via at least one webserver, to embed secondary digital content in a topic extraction platform (TEP) unit on a webpage or in an application view of an app displayed on the viewer client device, wherein:
the webpage or the application view of the app displayed on the viewer client device includes primary digital content; and
the secondary digital content to embed relates to a first topic present in the primary digital content;
B) transmitting to the viewer client device, via the at least one webserver, the secondary digital content for embedding in the TEP unit on the webpage or in the application view of the app displayed on the viewer client device, wherein the secondary digital content is derived from topic information retrieved via at least one control server from at least one topic information provider;
C) establishing a persistent connection with the viewer client device via a dedicated topic socket of at least one socket server coupled to the at least one control server; and
D) transmitting to the viewer client device, via the dedicated topic socket of the at least one socket server coupled to the at least one control server, updated secondary digital content derived from updated topic information retrieved via the at least one control server from the at least one topic information provider.

2. The method of claim 1, wherein:

the primary digital content includes text about at least one of a sports team, a sport player or participant, a past sporting event, or a present sporting event; and the secondary digital content includes betting information regarding an upcoming sporting event involving the sports team, the sport player or participant, the past sporting event, or the present sporting event.

3. The method of claim 1, wherein:

the primary digital content includes text mentioning a company; and the secondary digital content includes financial information regarding the company.

4. The method of claim 1, wherein:

the primary digital content includes text relating to finance, business or economics; and the secondary digital content includes performance information regarding at least one stock or stock index.

5. The method of claim 1, wherein:

the primary digital content includes text relating to at least one of an entertainment event or at least one entertainer; and the secondary digital content includes ticket information regarding the at least one entertainment event or the at least one entertainer.

6. A method, comprising:

A) transmitting a request from a viewer client device, via at least one webserver, to embed secondary digital content in a topic extraction platform (TEP) unit on a webpage or in an application view of an app displayed on the viewer client device, wherein:

the webpage or the application view of the app displayed on the viewer client device includes primary digital content; and the secondary digital content to embed relates to a first topic present in the primary digital content;

B) receiving at the viewer client device, via the at least one webserver, the secondary digital content for embedding in the TEP unit on the webpage or in the application view of the app displayed on the viewer client device, wherein the secondary digital content is derived from topic information retrieved via at least one control server from at least one topic information provider; and C) receiving at the viewer client device, via a persistent connection to a dedicated topic socket of at least one socket server coupled to the at least one control server, updated secondary digital content derived from updated topic information retrieved via the at least one control server from the at least one topic information provider.

7. The method of claim 6, wherein:

the primary digital content includes text about at least one of a sports team, a sport player or participant, a past sporting event, or a present sporting event; and the secondary digital content includes betting information regarding an upcoming sporting event involving the sports team, the sport player or participant, the past sporting event, or the present sporting event.

8. The method of claim 6, wherein:

the primary digital content includes text mentioning a company; and the secondary digital content includes financial information regarding the company.

9. The method of claim 6, wherein:

the primary digital content includes text relating to finance, business or economics; and the secondary digital content includes performance information regarding at least one stock or stock index.

10. The method of claim 6, wherein:

the primary digital content includes text relating to at least one of an entertainment event or at least one entertainer; and the secondary digital content includes ticket information regarding the at least one entertainment event or the at least one entertainer.

11. A method, comprising:

A) receiving a request from a viewer client device, via at least one webserver, to embed secondary digital content in a topic extraction platform (TEP) unit on a webpage or in an application view of an app displayed on the viewer client device, wherein:

the webpage or the application view of the app displayed on the viewer client device includes primary digital content; and the secondary digital content to embed relates to a first topic present in the primary digital content;

B) processing at least some of the primary digital content to determine a plurality of topics present in the primary digital content;

C) ranking and/or filtering the plurality of topics to determine a prioritized list of topics;

D) selecting the first topic from the prioritized list of topics;

E) retrieving from at least one topic information provider, via at least one control server, topic information relating to the first topic;

F) transmitting to the viewer client device, via the at least one webserver, the secondary digital content for embedding in the TEP unit on the webpage or in the application view of the app displayed on the viewer client device, wherein the secondary digital content is derived from the topic information retrieved via the at least one control server from the at least one topic information provider;

G) retrieving from the at least one topic information provider, via the at least one control server, updated topic information relating to the first topic;

H) establishing a persistent connection with the viewer client device via a dedicated topic socket of at least one socket server coupled to the at least one control server; and I) transmitting to the viewer client device, via the dedicated topic socket of the at least one socket server coupled to the control server, updated secondary digital content derived from the updated topic information retrieved via the at least one control server from the at least one topic information provider.

12. The method of claim 11, wherein:

the primary digital content includes text about at least one of a sports team, a sport player or participant, a past sporting event, or a present sporting event; and the secondary digital content includes betting information regarding an upcoming sporting event involving the sports team, the sport player or participant, the past sporting event, or the present sporting event.

13. The method of claim 11, wherein:

the primary digital content includes text mentioning a company; and the secondary digital content includes financial information regarding the company.

14. The method of claim 11, wherein:

the primary digital content includes text relating to finance, business or economics; and the secondary digital content includes performance information regarding at least one stock or stock index.

15. The method of claim 11, wherein:

the primary digital content includes text relating to at least one of an entertainment event or at least one entertainer; and the secondary digital content includes ticket information regarding the at least one entertainment event or the at least one entertainer.

16. A system for controlling a viewer client device to receive secondary digital content relating to at least one topic present in primary digital content displayed in a webpage or an application view on a display of the viewer client device, the system comprising:

A) a control server to periodically retrieve, via the Internet, topic information relating to the at least one topic present in the primary digital content;

B) at least one socket server communicatively coupled to the control server to:

receive from the control server the topic information; and transmit at least some of the topic information to the viewer client device via a first topic information Internet communication channel between a first topic socket of the at least one socket server and the viewer client device, wherein the first topic socket corresponds to the topic information; and C) at least one webserver communicatively coupled to the at least one socket server and the at least one control server to:

C1) receive a first request from the viewer client device to embed the secondary digital content in a topic extraction platform (TEP) unit on the webpage or in the application view on the display of the viewer client device;

C2) facilitate processing of at least some of the primary digital content to determine a plurality of topics present in the primary digital content;

C3) facilitate ranking and/or filtering the plurality of topics to determine a prioritized list of topics;

C4) facilitate selecting the first topic from the prioritized list of topics;

C5) transmit to the viewer client device the secondary digital content for embedding in the TEP unit, wherein the secondary digital content is derived from the topic information retrieved via the at least one control server from the at least one topic information provider; and C6) transmit to the viewer client device a first socket address of the first topic socket to establish the first topic information Internet communication channel to carry the topic information to provide updates to the secondary digital content.

17. The system of claim 16, wherein the at least one webserver further:

C7) receives a second request from the viewer client device, in response to at least one interaction by the viewer with at least some of the secondary digital content, for updated secondary digital content or replacement secondary digital content.

18. The system of claim 16, wherein:

the primary digital content includes text about at least one of a sports team, a sport player or participant, a past sporting event, or a present sporting event; and the secondary digital content includes betting information regarding an upcoming sporting event involving the sports team, the sport player or participant, the past sporting event, or the present sporting event.

19. The system of claim 16, wherein:

the primary digital content includes text mentioning a company; and the secondary digital content includes financial information regarding the company.

20. The system of claim 16, wherein:

the primary digital content includes text relating to finance, business or economics; and the secondary digital content includes performance information regarding at least one stock or stock index.

21. The system of claim 16, wherein:

the primary digital content includes text relating to at least one of an entertainment event or at least one entertainer; and the secondary digital content includes ticket information regarding the at least one entertainment event or the at least one entertainer.

* * * * *